(12) United States Patent
Taka et al.

(10) Patent No.: US 7,906,224 B2
(45) Date of Patent: Mar. 15, 2011

(54) ORGANIC ELECTROLUMINESCENT DEVICE, DISPLAY, AND ILLUMINATING DEVICE

(75) Inventors: Hideo Taka, Hachioji (JP); Hiroshi Kita, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 596 days.

(21) Appl. No.: 10/568,967

(22) PCT Filed: Aug. 17, 2004

(86) PCT No.: PCT/JP2004/012042
§ 371 (c)(1),
(2), (4) Date: Mar. 14, 2006

(87) PCT Pub. No.: WO2005/019374
PCT Pub. Date: Mar. 3, 2005

(65) Prior Publication Data
US 2006/0222758 A1 Oct. 5, 2006

(30) Foreign Application Priority Data

Aug. 21, 2003 (JP) ................................ 2003-297283

(51) Int. Cl.
*H01L 51/54* (2006.01)
*C09K 11/00* (2006.01)
*C07F 7/08* (2006.01)
*C08G 61/12* (2006.01)

(52) U.S. Cl. ........ 428/690; 428/917; 313/504; 313/506; 252/301.32; 257/40; 257/103; 257/E51.028; 556/431; 556/435; 528/43

(58) Field of Classification Search .................. 428/690, 428/917; 313/504, 506; 257/40, E51.044
See application file for complete search history.

(56) References Cited

U.S. PATENT DOCUMENTS

| | | | |
|---|---|---|---|
| 5,331,182 A * | 7/1994 | Takimoto et al. ............... | 257/40 |
| 6,323,355 B2 | 11/2001 | Igarashi et al. | |
| 6,558,819 B1 * | 5/2003 | Igarashi ....................... | 428/690 |
| 2001/0014752 A1 | 8/2001 | Igarashi | |
| 2002/0079835 A1 * | 6/2002 | Lee ................................ | 313/506 |
| 2002/0193532 A1 * | 12/2002 | Ikehira et al. .............. | 525/333.3 |
| 2003/0013843 A1 * | 1/2003 | Pei ................................ | 528/422 |
| 2003/0091859 A1 | 5/2003 | Cho | |
| 2003/0091862 A1 * | 5/2003 | Tokito et al. ................... | 428/690 |
| 2004/0124766 A1 * | 7/2004 | Nakagawa et al. ........... | 313/504 |
| 2007/0031698 A1 | 2/2007 | Towns et al. | |

FOREIGN PATENT DOCUMENTS

| | | |
|---|---|---|
| EP | 0 470 629 A | 2/1992 |
| EP | 1 245 659 A | 10/2002 |
| JP | 06 234968 A | 8/1994 |
| JP | 2004-185967 A * | 7/2004 |
| WO | WO 2005/017065 A1 | 2/2005 |

OTHER PUBLICATIONS

Spreitzer et al. "Soluble phenyl-substituted PPVs-new materials for highly efficient polymer LEDs." Advanced Materials. 1998, vol. 10, No. 16, pp. 1340-1343.*
English machine translation of JP 2004-185967-A.*

* cited by examiner

*Primary Examiner* — D. Lawernce Tarazano
*Assistant Examiner* — Michael H Wilson
(74) *Attorney, Agent, or Firm* — Holtz, Holtz, Goodman & Chick, PC

(57) ABSTRACT

An organic electroluminescent element comprising a cathode and an anode having therebetween at least one organic compound layer, wherein one of the organic compound layer comprises a polymer having a repeat unit represented by Formula (1) (wherein $Ar_1$ represents an arylene group which may have a substituent or a heteroarylene group having not more than two heteroatoms, which may have a substituent; and $L_1$ represents a divalent linkage group selected from a prescribed group; and $n_1$ represents an integer of not less than two).

$$*\text{---}(Ar_1\text{---}L_1)_{n1}\text{---}* \qquad \text{Formula (1)}$$

19 Claims, 3 Drawing Sheets

LIGHT

LIGHT

ORGANIC ELECTROLUMINESCENT DEVICE, DISPLAY, AND ILLUMINATING DEVICE

TECHNICAL FIELD

The present invention relates to an organic electroluminescent element (hereafter also referred to as an organic EL element), a display and an illuminator.

BACKGROUND

As an emission type electronic displaying device, an electroluminescence device (ELD) is known. Elements constituting the ELD include an inorganic electroluminescent element and an organic electroluminescent element (hereinafter referred to also as an organic EL element). Inorganic electroluminescent element has been used for a plane light source, however, a high voltage alternating current has been required to drive the element.

An organic EL element has a structure in which a light emitting layer containing a light emitting compound is arranged between a cathode and an anode, and an electron and a hole were injected into the light emitting layer and recombined to form an exciton. The element emits light, utilizing light (fluorescent light or phosphorescent light) generated by inactivation of the exciton, and the element can emit light by applying a relatively low voltage of several volts to several tens of volts. The element has a wide viewing angle and a high visuality since the element is of self light emission type. Further, the element is a thin, complete solid element, and therefore, the element is noted from the viewpoint of space saving and portability.

A practical organic EL element is required to emit light of high luminance with high efficiency at a lower power. For example, disclosed are an element exhibiting higher luminance of emitting light with longer life in which stilbene derivatives, distyrylarylene derivatives or tristyrylarylene derivatives doped with a slight amount of a fluorescent compound are employed (see Patent Document 1), an element which has an organic light emitting layer containing 8-hydroxyquinoline aluminum complex as a host compound doped with a slight amount of a fluorescent compound (see Patent Document 2), and an element which has an organic light emitting layer containing 8-hydroxyquinoline aluminum complex as a host compound doped with a quinacridone type dye (see Patent Document 3).

When light emitted through excited singlet state is used in the element disclosed in the above Patent documents, the upper limit of the external quantum efficiency ($\square$ext) is considered to be at most 5%, because the generation probability of excited species capable of emitting light is 25%, since the generation ratio of singlet excited species to triplet excited species is 1:3, and further, external light luminous efficiency is 20%.

Since an organic EL element, employing phosphorescence through the excited triplet, was reported by Princeton University (see Non-Patent Document 1), studies on materials emitting phosphorescence at room temperature have been actively carried out (see Non-Patent Document 2 and Patent Document 4).

As the upper limit of the internal quantum efficiency of the excited triplet is 100%, the luminous efficiency of the exited triplet is theoretically four times that of the excited singlet. Accordingly, light emission employing the excited triplet exhibits almost the same performance as a cold cathode tube, and can be applied to illumination.

For example, many kinds of heavy metal complexes such as iridium complexes have been synthesized and studied (see Non-Patent Document 3).

An example employing tris(2-phenylpyridine)iridium as a dopant has also been studied (see Non-Patent Document 2).

Other examples of a dopant which has been studied include, $L_2Ir$ (acac) (L represents a bidentate ligand, acac represents acetylacetone) such as $(ppy)_2Ir$ (acac) (see Non-Patent Document 4), tris(2-p-tolylpyridine)iridium $\{Ir(ptpy)_3\}$, tris(benzo-[h]-quinoline) iridium $\{Ir(bzq)_3\}$ and $Ir(bzq)_2ClP$ (Bu)$_3$ (see Non-Patent Document 5).

A hole transport material is used as a host of a phosphorescent compound in order to increase luminous efficiency (see Non-Patent Document 6).

Various kinds of electron transport materials doped with a new iridium complex are used as a host of a phosphorescent compound (see Non-Patent Document 4). High luminous efficiency has been obtained by incorporating a hole blocking layer (see Non-Patent Document 5).

As for a green light emission, an external quantum efficiency of around 20%, which is a theoretical threshold, has been obtained, however, there has been a problem in that the efficiency is notably degraded when a high luminance of light is emitted. As for other colors of light, fully enough efficiency has not been obtained, and improvement has been desired. As an example of an organic electroluminescent element emitting blue light with a high efficiency, Patent Document 5 is cited. Further, as an organic electroluminescent element for practical application in the future, desired is an organic electroluminescent element which emits light with a high efficiency and a low power consumption.

As for a phosphorescent dopant used in an organic electroluminescent element, many examples have been disclosed, for example, in Patent Documents 6, 7, 8, 9, 10 and 11. Many of these disclosures attempt to attain high efficiency of emission, high color purity and high durability, however, none of currently known phosphorescent dopant for an organic electroluminescent element exhibits fully satisfactory properties, and further improvement is desired.

On the other hand, in the fabrication of a large screen organic electroluminescent element device using low molecular weight compounds, the generally used vacuum deposition method has been known to have a problem in facilities and energy consumption, and desired have been printing methods, for example, ink-jet printing or screen-printing, or coating methods, for example, spin coating or cast coating. In the fabrication of white light emitting element, a plurality of light emitting compounds having different maximum emission wavelengths are incorporated in the emission layer, however, it is rather difficult to deposit a plurality of compounds in the same ratio in every fabrication using a vacuum deposition method, suggesting a lower yield ratio in the organic electroluminescent element production. However, when a production process of an organic electroluminescent element employing, for example, the above printing methods or coating methods using materials soluble in a solvent becomes possible, by using a solution containing the same ratio of phosphorescent dopants, the same ratio of the dopants are incorporated in each organic electroluminescent element, and white light emitting organic electroluminescent elements emitting the same color can be stably produced.

For example, known are polymer illuminants such as a polyphenylene vinylene derivative (PPV) or a polyalkyl fluorene derivative (PAF) (for example, refer to Non-Patent Documents 7, 8), and a technique in which a low molecular weight luminescent colorant is dissolved or dispersed in a polymer such as polystyrene, polymethylmethacrylate, or polyvinyl carbazole (PVK) (for example, refer to Patent Document 12 and Non-Patent Document 9).

A copolymer of vinylcarbazole and an iridium complex has been reported to serve as an excellent organic electroluminescent element (for example, refer to Non-Patent Document 10).

(Patent Document 1)
Japanese Patent No. 3093796
(Patent Document 2)
Japanese Patent Publication Open to Public Inspection (hereafter referred to as JP-A) No. 63-264692
(Patent Document 3)
JP-A No. 3-255190
(Patent Document 4)
U.S. Pat. No. 6,097,147
(Patent Document 5)
Japanese Patent Publication Open to Public Inspection (hereafter referred to as JP-A) No. 2002-100476
(Patent Document 6)
JP-A No. 2001-181616
(Patent Document 7)
JP-A No. 2001-247859
(Patent Document 8)
JP-A No. 2002-83684
(Patent Document 9)
JP-A No. 2002-175884
(Patent Document 10)
JP-A No. 2002-338588
(Patent Document 11)
JP-A No. 2003-7469
(Patent Document 12)
JP-A No. 4-212286
(Non-Patent Document 1)
M. A. Baldo et al., nature, 395, 151-154 (1998)
(Non-Patent Document 2)
M. A. Baldo et al., nature, 403(17), 750-753 (2000)
(Non-Patent Document 3)
S. Lamansky et al., J. Am. Chem. Soc., 123, 4304 (2001)
(Non-Patent Document 4)
M. E. Tompson et al., The 10th International Workshop on Inorganic and Organic Electroluminescence (EL '00, Hamamatsu)
(Non-Patent Document 5)
Moon-Jae Youn. 0 g, Tetsuo Tsutsui et al., The 10th International Workshop on Inorganic and Organic Electroluminescence (EL '00, Hamamatsu)
(Non-Patent Document 6)
Ikai et al., The 10th International Workshop on Inorganic and Organic Electroluminescence (EL '00, Hamamatsu)
(Non-Patent Document 7)
Nature, 357, 477 (1992)
(Non-Patent Document 8)
Advanced Materials, Section 4, (1992)
(Non-Patent Document 9)
Proc. 38th Applied Physics Rengo-Koenkai, 31 p -G-12 (1991)
(Non-Patent Document 10)
H15, NHK Hoso-giken Kokai-yokoushuu, pp 52-57 (2003)

However, the organic EL elements obtained so far have not been fully satisfactory in luminance, luminous efficiency, emission life and power consumption.

An object of the present invention is to provide an organic electroluminescent element exhibiting high luminance, high luminous efficiency, long emission life and low power consumption, and to provide a display and an illuminator employing the same.

SUMMARY OF THE INVENTION

The object of the present invention is achieved by the following structures.

(1) An organic electroluminescent element containing a cathode and an anode having therebetween at least one organic compound layer,
wherein one of the organic compound layer contains a polymer having a repeat unit represented by Formula (1):

$$*\!-\!(\mathrm{Ar}_1\!-\!\mathrm{L}_1)_{n1}\!-\!* \qquad \text{Formula (1)}$$

wherein $Ar_1$ represents an arylene group which may have a substituent or a heteroarylene group having not more than two heteroatoms, which may have a substituent; and $L_1$ represents a linkage group selected from Group 1; and $n_1$ represents an integer of not less than two:

Group 1

$$*\!-\!O\!-\!* \quad *\!-\!S\!-\!* \quad *\!-\!Se\!-\!* \quad *\!-\!Te\!-\!* \quad *\!-\!\overset{R_1}{\underset{|}{P}}\!-\!*$$

$$*\!-\!\overset{R_2}{\underset{|}{B}}\!-\!* \quad *\!-\!\overset{R_3\;R_4}{\underset{\mathrm{Si}}{\diagdown\!\diagup}}\!-\!* \quad *\!-\!\overset{R_5\;R_6}{\underset{\mathrm{Ge}}{\diagdown\!\diagup}}\!-\!*$$

wherein $R_1$-$R_6$ each independently represent an alkyl group or an aryl group, provided that $R_3$ and $R_4$, or $R_5$ and $R_6$ may be joined to form a ring.

(2) The organic electroluminescent element of Item (1), wherein a number of rings of $Ar_1$ in Formula (1) is not more than 5.

(3) An organic electroluminescent element containing a cathode and an anode having therebetween at least one organic compound layer,
wherein one of the organic compound layer contains a polymer having one of repeat units represented by Formula (2):

$$*\!-\!(\mathrm{Ar}_2\!-\!\mathrm{L}_2)_{n2}\!-\!* \qquad \text{Formula (2)}$$
$$\underset{\mathrm{X}}{\overset{|}{\underset{|}{\mathrm{L}_3}}}$$

wherein $Ar_2$ represents an arylene group which may have a substituent or a heteroarylene group having not more than two heteroatoms, which may have a substituent; $L_2$ represents a linkage group selected from Group 2; and $L_3$ represents a single bond or a linkage group selected from Group 3; X represents one of a hole transport group, an electron transport group, a fluorescent group and a phosphorescent group; and $n_2$ represents an integer of not less than two:

Group 2

$$*\!-\!O\!-\!* \quad *\!-\!S\!-\!* \quad *\!-\!Se\!-\!* \quad *\!-\!Te\!-\!* \quad *\!-\!\overset{R_1}{\underset{|}{P}}\!-\!*$$

$$*\!-\!\overset{R_2}{\underset{|}{B}}\!-\!* \quad *\!-\!\overset{R_3\;R_4}{\underset{\mathrm{Si}}{\diagdown\!\diagup}}\!-\!* \quad *\!-\!\overset{R_5\;R_6}{\underset{\mathrm{Ge}}{\diagdown\!\diagup}}\!-\!*$$

-continued

Group 3

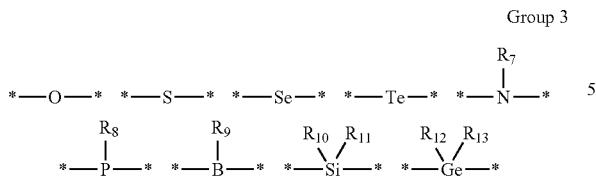

wherein $R_1$-$R_6$ each independently represent an alkyl group or an aryl group, provided that $R_3$ and $R_4$, or $R_5$ and $R_6$ may be joined to form a ring, and $R_7$-$R_{13}$ each independently represent an alkyl group or an aryl group, provided that $R_{10}$ and $R_{11}$, or $R_{12}$ and $R_{13}$ may be joined to form a ring.

(4) The organic electroluminescent element of Item (3), wherein a number of rings of $Ar_2$ in Formula (2) is not more than 5.

(5) The organic electroluminescent element of Item (3) or Item (4), wherein the hole transport group includes a substructure represented by Formula (3) or Formula (4):

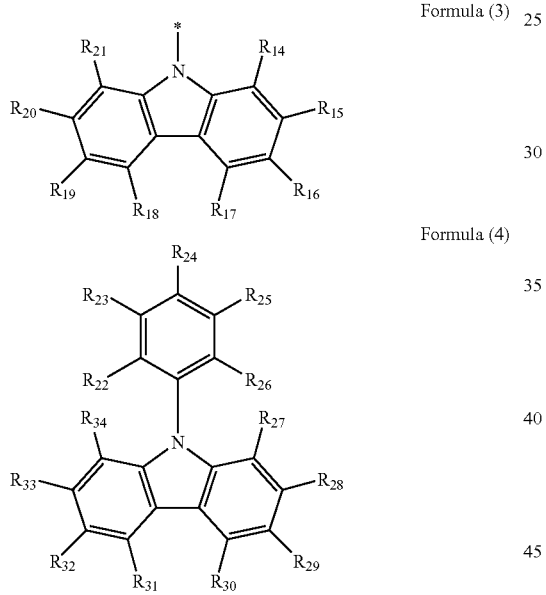

Formula (3)

Formula (4)

wherein in Formula (3), $R_{14}$-$R_{21}$ each independently represent a hydrogen atom, an alkyl group or a cycloalkyl group, provided that adjacent groups of $R_{14}$-$R_{21}$ may be joined to form a ring; and in Formula (4), $R_{22}$-$R_{30}$ each independently represent a hydrogen atom, an alkyl group or a cycloalkyl group, and $R_{31}$-$R_{34}$ each independently represent a hydrogen atom, a single bond, an alkyl group or a cycloalkyl group, provided that one of $R_{31}$-$R_{34}$ represents a single bond, and that adjacent groups of $R_{22}$-$R_{34}$ may be joined to form a ring.

(6) The organic electroluminescent element of any one of Items (3) to (5), wherein the phosphorescent group contains an organometal complex.

(7) The organic electroluminescent element of Item (6), wherein the organometal complex contains a substructure represented by one of Formulas (5) to (8):

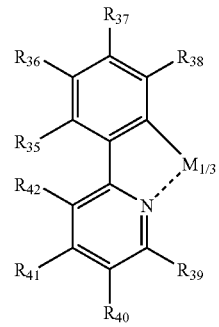

Formula (5)

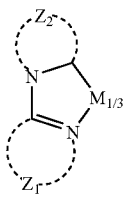

Formula (6)

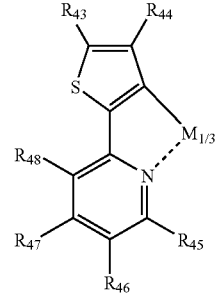

Formula (7)

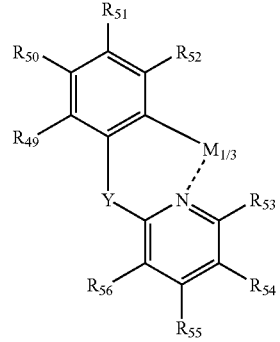

Formula (8)

wherein in Formula (5), $R_{35}$-$R_{42}$ each independently represent a hydrogen atom, a single bond or a substituent, provided that adjacent groups of $R_{35}$-$R_{42}$ may be joined to form a ring, and M represents a metal atom;

in Formula (6), $Z_1$ and $Z_2$ each independently represent a group of atoms necessary to form an aromatic ring together with a carbon atom and a nitrogen atom, and M represents a metal atom;

in Formula (7), $R_{43}$-$R_{48}$ each independently represent a hydrogen atom, a single bond or a substituent, provided that adjacent groups of $R_{43}$-$R_{48}$ may be joined to form a ring, and M represents a metal atom; and in Formula (8), Y represents a divalent linkage group, $R_{49}$-$R_{56}$ each independently represent a hydrogen atom, a single bond or a substituent, provided that adjacent groups of $R_{49}$-$R_{56}$ may be joined to form a ring, and M represents a metal atom.

(8) The organic electroluminescent element of Item (3), wherein one of the repeat units represented by Formula (2) is further represented by Formula (21):

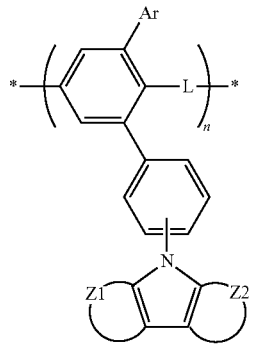

Formula (21)

wherein Ar represents an arylene group which may have a substituent or a heteroarylene group which may have a substituent; $Z_1$ and $Z_2$ each represent a 6-membered aromatic ring containing a group of atoms of carbon, hydrogen or nitrogen, provided that $Z_1$ and $Z_2$ may be different.

(9) An organic electroluminescent element containing a cathode and an anode having therebetween at least one organic compound layer,
wherein one of the organic compound layer contains a copolymer represented by Formula (22):

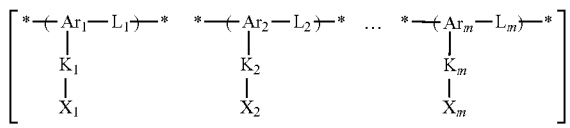

Formula (22)

wherein $Ar_1$ to $Ar_m$ each represent an arylene group which may have a substituent or a heteroarylene group which may have a substituent; m represents an integer of not less than two; $Ar_1$ to $Ar_m$ may be the same or may be different; the heteroarylene group contains not more than two heteroatoms; $K_1$ to $K_m$ each represent a single bond or a linkage group selected from Group 3; and $X_1$ to $X_m$ each represent a hole transport group, an electron transport group or a phosphorescent group:

Group 3

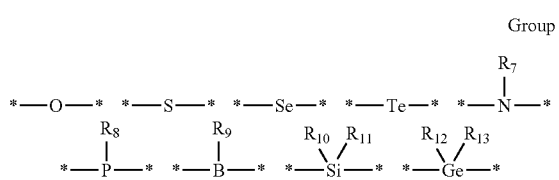

wherein $R_7$-$R_{13}$ each independently represent an alkyl group or an aryl group, provided that $R_{10}$ and $R_{11}$, or $R_{12}$ and $R_{13}$ may be joined to form a ring.

(10) An organic electroluminescent element containing a cathode and an anode having therebetween at least one organic compound layer,
wherein one of the organic compound layer contains a mixture of two or more polymers each represented by Formulas (1), (2), (21) or (22):

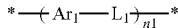

Formula (1)

wherein $Ar_1$ represents an arylene group which may have a substituent or a heteroarylene group having not more than two heteroatoms, which may have a substituent; and $L_1$ represents a linkage group selected from Group 1; and $n_1$ represents an integer of not less than two:

Group 1

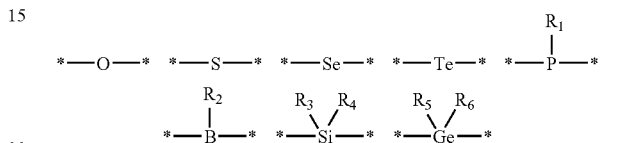

wherein $R_1$-$R_6$ each independently represent an alkyl group or an aryl group, provided that $R_3$ and $R_4$, or $R_5$ and $R_6$ may be joined to form a ring, Formula (2)

wherein $Ar_2$ represents an arylene group which may have a substituent or a heteroarylene group having not more than two heteroatoms, which may have a substituent; $L_2$ represents a linkage group selected from Group 2; and $L_3$ represents a single bond or a linkage group selected from Group 3; X represents one of a hole transport group, an electron transport group, a fluorescent group and a phosphorescent group; and $n_2$ represents an integer of not less than two:

Group 2

Group (3)

wherein $R_1$-$R_6$ each independently represent an alkyl group or an aryl group, provided that $R_3$ and $R_4$, or $R_5$ and $R_6$ may be joined to form a ring, and $R_7$-$R_{13}$ each independently represent an alkyl group or an aryl group, provided that $R_{10}$ and $R_{11}$, or $R_{12}$ and $R_{13}$ may be joined to form a ring, Formula (21)

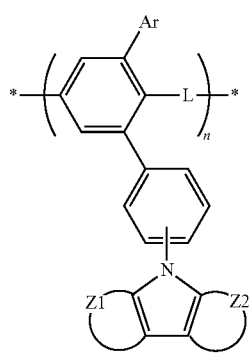

wherein Ar represents an arylene group which may have a substituent or a heteroarylene group which may have a substituent; $Z_1$ and $Z_2$ each represent a 6-membered aromatic ring containing a group of atoms of carbon, hydrogen or nitrogen, provided that $Z_1$ and $Z_2$ may be different, and Formula (22)

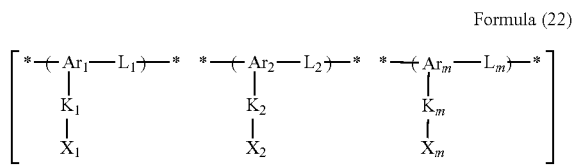

wherein $Ar_1$ to $Ar_m$ each represent an arylene group which may have a substituent or a heteroarylene group which may have a substituent; m represents an integer of not less than two; $Ar_1$ to $Ar_m$ may be the same or may be different; the heteroarylene group contains not more than two heteroatoms; $K_1$ to $K_m$ each represent a single bond or a linkage group selected from above Group 3; and $X_1$ to $X_m$ each represent a hole transport group, an electron transport group or a phosphorescent group.

(11) The organic electroluminescent element of any one of Items (1) to (10), wherein the organic electroluminescent element emits white light.
(12) A display equipped with the organic electroluminescent element of any one of Items (1) to (11).
(13) An illuminator equipped with the organic electroluminescent element of any one of Items (1) to (11).
(14) A display equipped with the illuminator of Item (13) and a liquid crystal cell as a display means.

DESCRIPTION OF THE PREFERRED EMBODIMENTS

Figure 1:
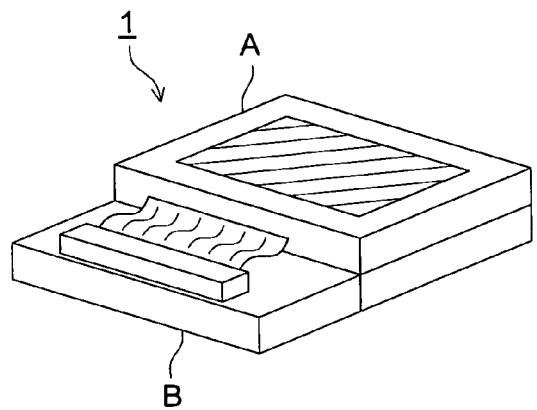
FIG. 1 is a schematic illustration of an example of a display employing an organic EL element.

Hereafter, the present invention will be described in more detail.

The present inventors have found that an organic electroluminescent element containing a cathode and an anode having therebetween at least one organic compound layer, wherein one of the organic compound layer contains a polymer having a repeat unit represented by Formula (1) exhibits high luminance, high luminous efficiency, long emission life and reduced driving power consumption.

In Formula (1), $Ar_1$ represents an arylene group which may have a substituent or a heteroarylene group having not more than two heteroatoms, which may have a substituent; and $L_1$ represents a linkage group selected from above Group 1; and $n_1$ represents an integer of not less than two In the above-mentioned Group 1, $R_1$-$R_6$ each independently represent an alkyl group or an aryl group, provided that $R_3$ and $R_4$, or $R_5$ and $R_6$, may be joined to form a ring.

Among the linkage groups of Group 1, the linkage groups linked by an O atom, a S atom, a Se atom and a Si atom are specifically preferable to obtain the effect of the present invention, and most preferable are those linked by an O atom and a S atom.

Examples of linkage groups of Group 1 will be shown below, however, the present invention is not limited thereto.

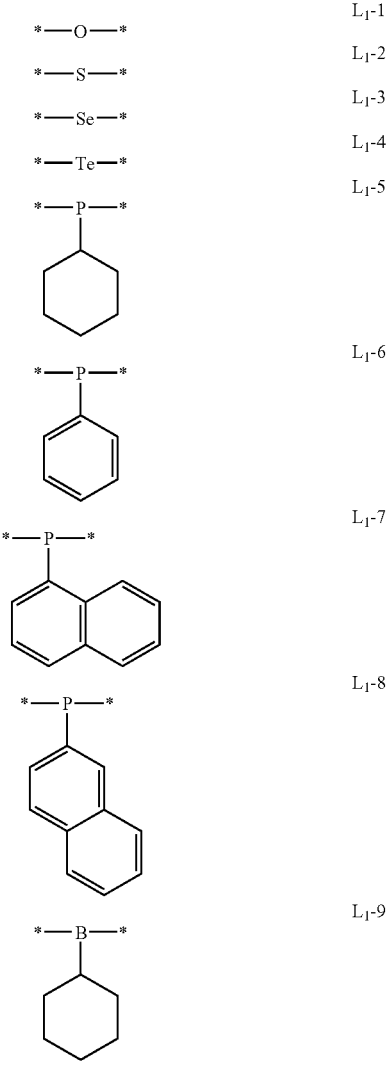

-continued
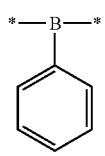
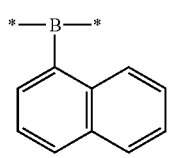
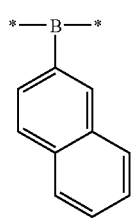
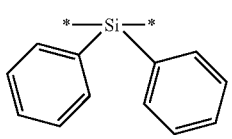
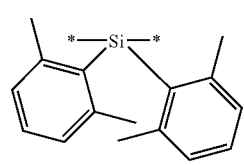
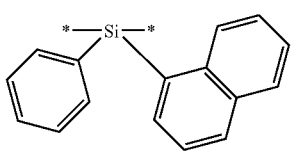
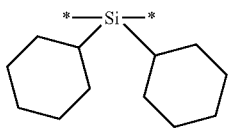
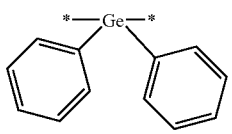
-continued
L$_1$-10
L$_1$-11
L$_1$-12
L$_1$-13
L$_1$-14
L$_1$-15
L$_1$-16
L$_1$-17
L$_1$-18
L$_1$-19
L$_1$-20
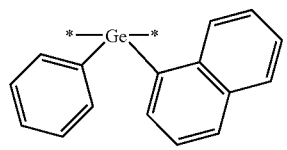
Examples of Ar$_1$ of the above mentioned Formula (1) will be shown below, however, the present invention is not limited thereto.
Ar-1
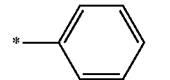
Ar-2
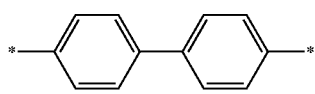
Ar-3
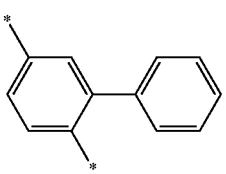
Ar-4
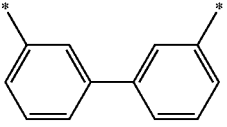
Ar-5
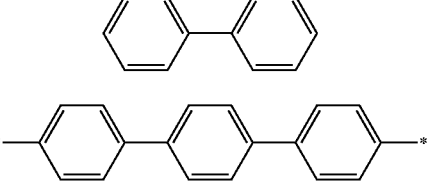
Ar-6
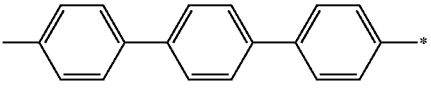
Ar-7
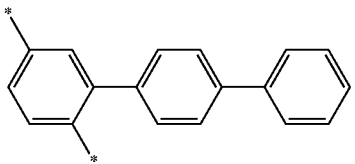
Ar-8
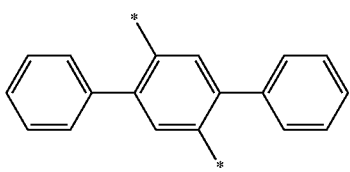
Ar-9

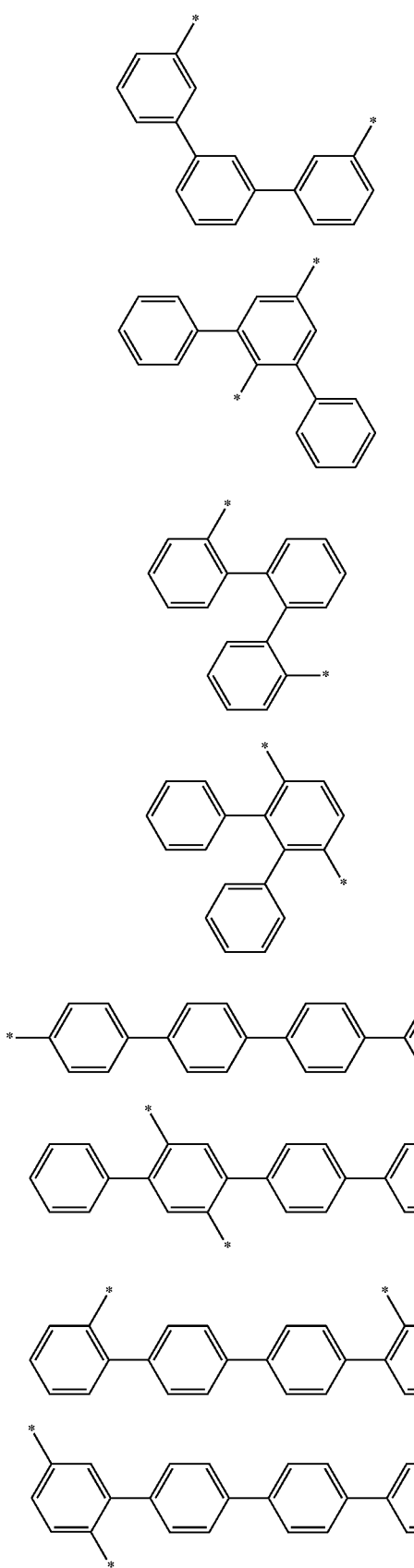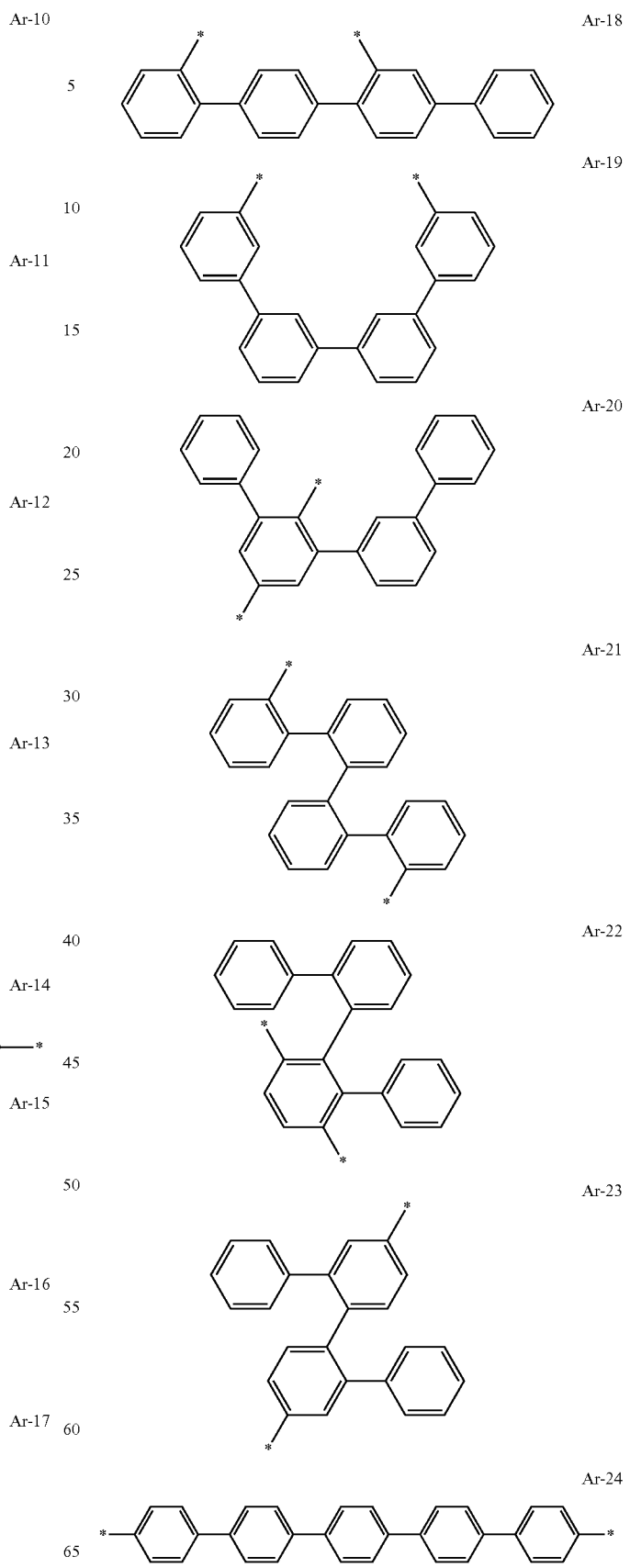

Ar-25
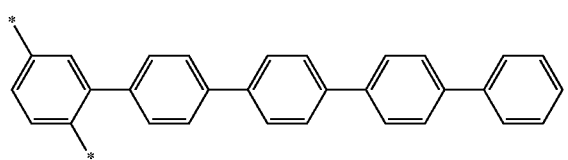
Ar-26
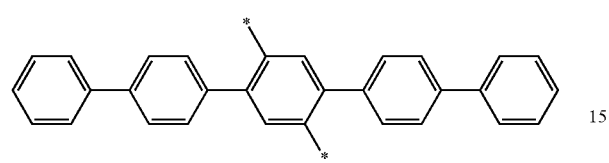
Ar-27
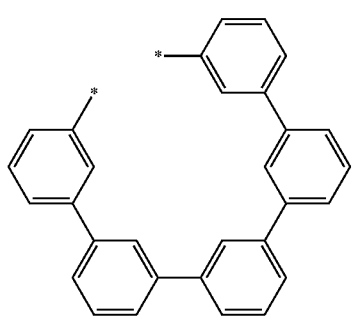
Ar-28
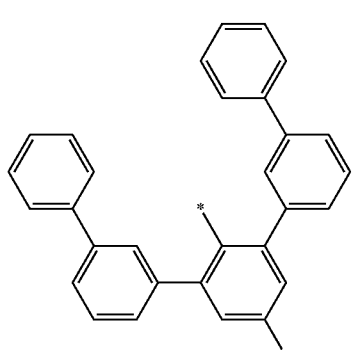
Ar-29
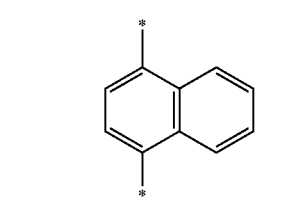
Ar-30
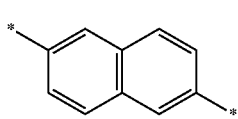
Ar-31
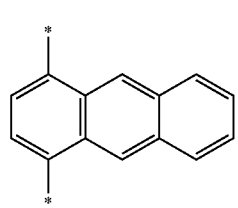
Ar-32
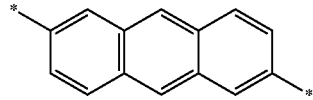
Ar-33
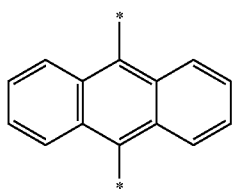
Ar-34
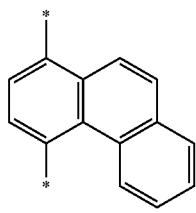
Ar-35
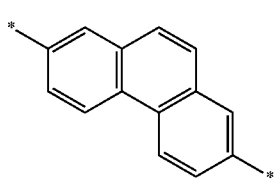
Ar-36
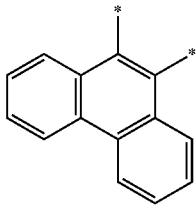
Ar-37
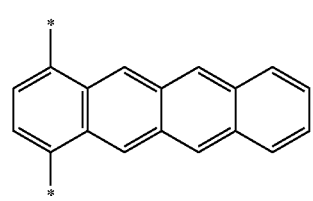
Ar-38
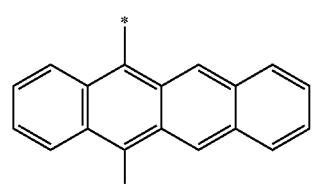
Ar-39
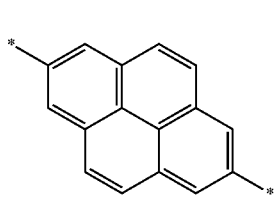

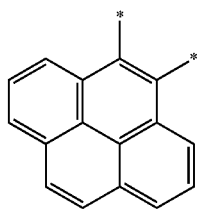 Ar-40
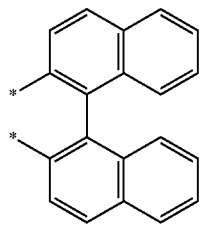 Ar-41
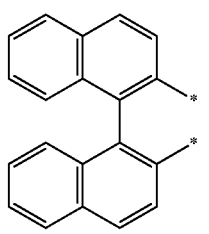 Ar-42
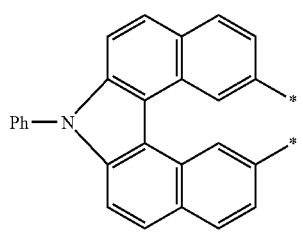 Ar-43
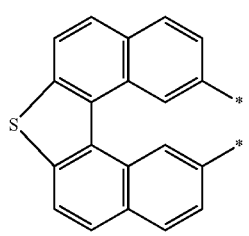 Ar-44
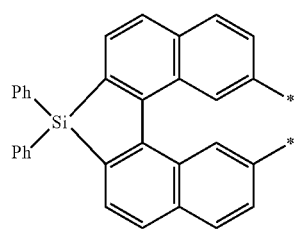 Ar-45
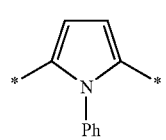 Ar-46
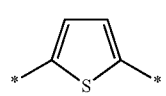 Ar-47
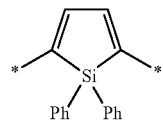 Ar-48
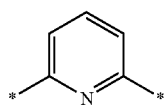 Ar-49
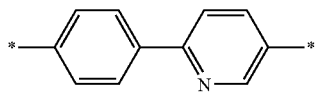 Ar-50
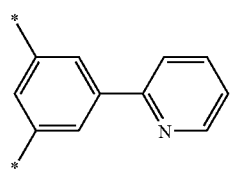 Ar-51
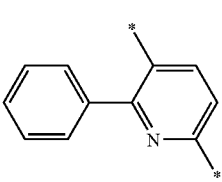 Ar-52
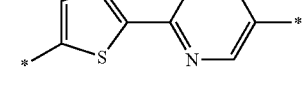 Ar-53
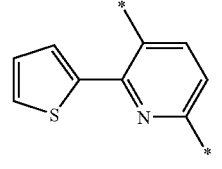 Ar-54
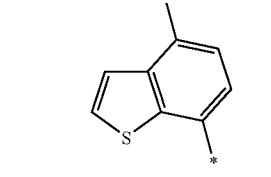 Ar-55
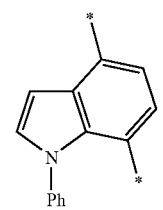 Ar-56
Ar-57

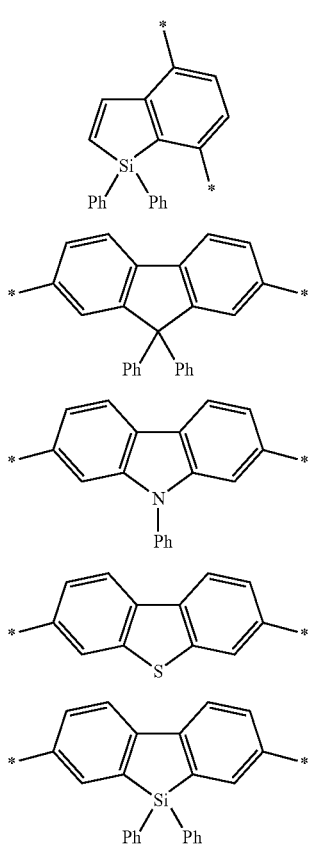

Ar-58

Ar-59

Ar-60

Ar-61

Ar-62

Formula (1) preferably contains not more than 5 rings represented by $Ar_1$, whereby higher luminance, higher luminous efficiency, longer emission life and more reduced driving power consumption are attained.

In the present invention, a number of rings is represented as follows: the number of rings of one aromatic ring or a hetero aromatic ring is designated as 1, and the number of rings of an arylene group having n aromatic rings or a heteroarylene group having n hetero aromatic rings is designated as n. As for a condensed ring, the number of rings represents the number of condensed rings, and the number of rings of a condensed ring having n rings is designated as n. For example, for Ar-3 to Ar-6, Ar-29, Ar-30, Ar-50 to Ar-58, the number of rings is 2; for Ar-7 to Ar-13, Ar-31 to Ar-36 and Ar-59 to Ar-62, the number of rings is 3; for Ar-14 to Ar-23 and Ar-37 to Ar-42, the number of rings is 4; and for Ar-24 to Ar-28 and Ar-43 to Ar-45, the number of rings is 5.

The structures of both ends of a polymer containing at least one of the repeat units represented by above Formula (1) are not specifically limited in the present invention, however, preferably, the both ends are capped with a hydrogen atom, an alkyl group or an aryl group which may have a substituent. In view of the function as an organic EL element, the both ends are more preferably capped with a hole blocking group, a phosphorescent group or a luminescent group, which will be described later.

As a hole blocking group, employable is a material having an ability to convey electrons while blocking positive holes (or merely referred to as "holes"), whereby the probability of recombination of electrons and positive holes is increased, namely, having a function to convey electrons while having notably low ability to convey holes. Examples of a hole blocking group include groups having a substructure of, for example, a styryl compound, a triazole derivative, a phenanthroline derivative, an oxydiazole derivative, and a triaryl borane derivative. Specifically, usable are the electron transport groups which will be described below.

Examples of a polymer containing at least one of the repeat units represented by above Formula (1) include polymers formed in combination of the above described compounds, however, preferable examples of a polymer containing at least one of the repeat units represented by above Formula (1) will be shown below, however, the embodiments of the present invention is not limited thereto:

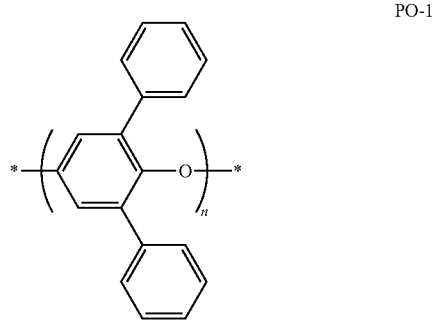

PO-1

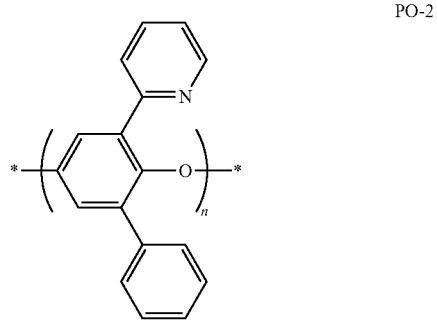

PO-2

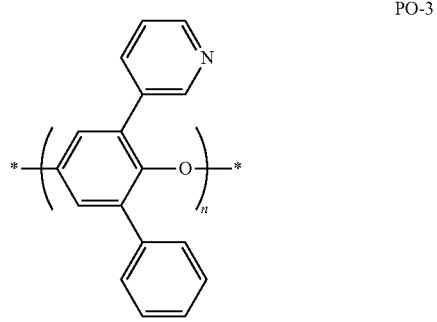

PO-3

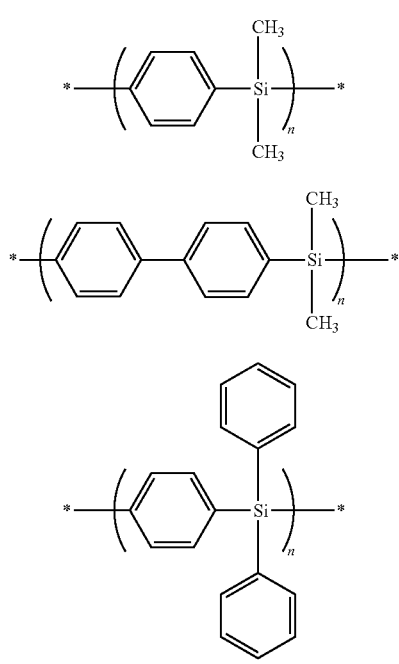
PO-4
PO-5
PO-6
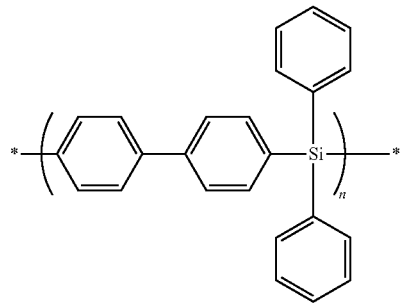
PO-7
Hereafter, ppy represents the following formula:
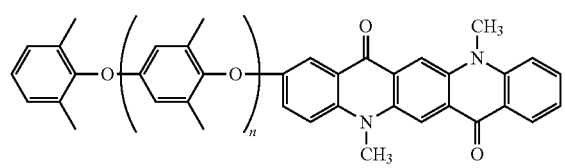
Poly-1
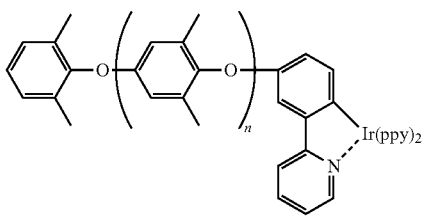
Poly-2
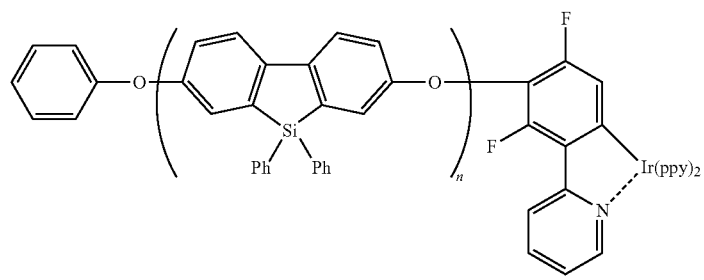
Poly-3

-continued
Poly-4
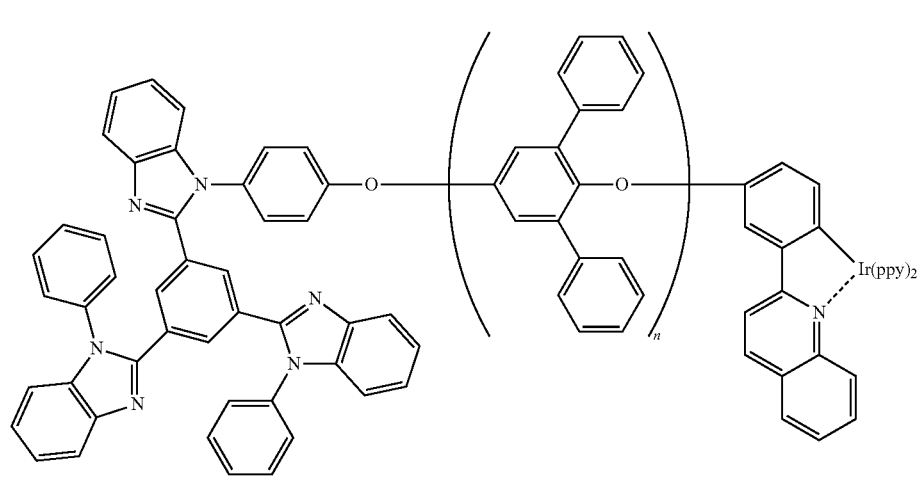
Poly-5
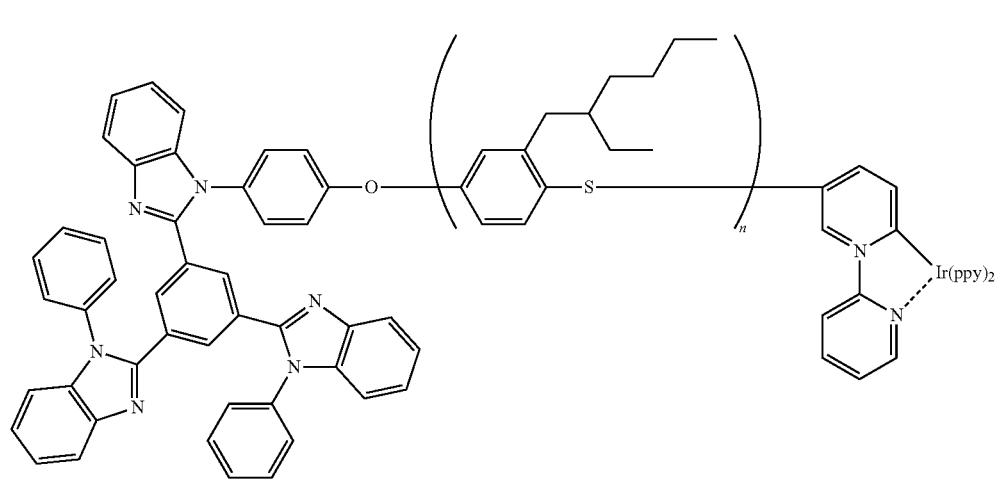
Poly-6
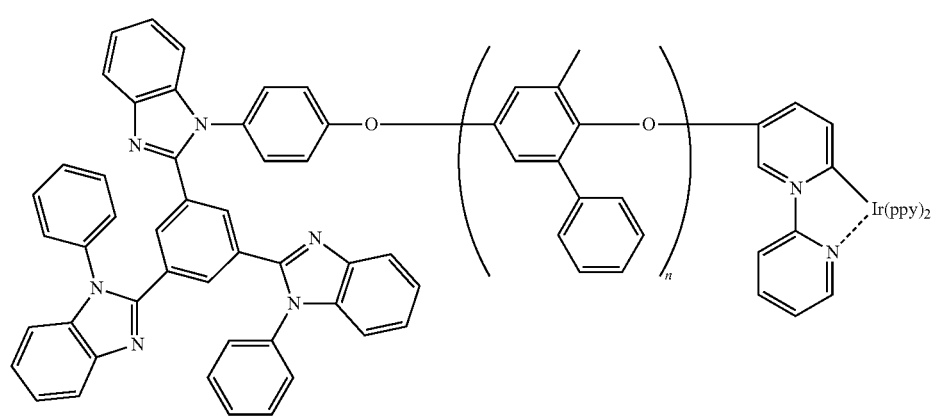

-continued
Poly-7
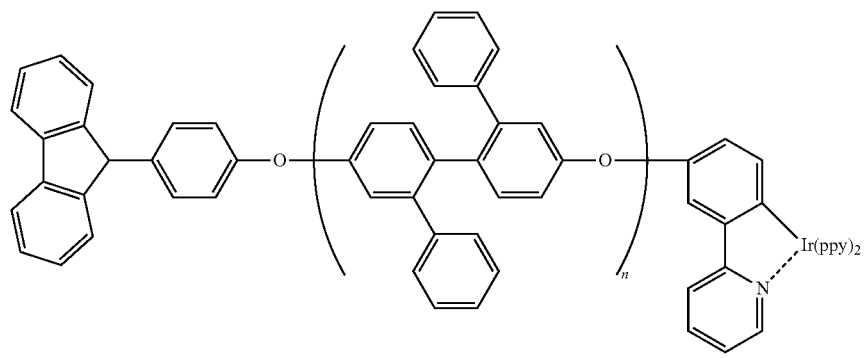
Poly-8
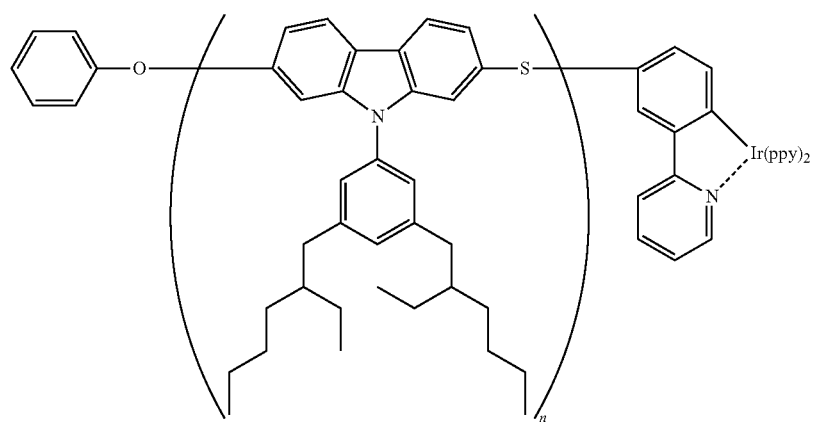
Poly-9
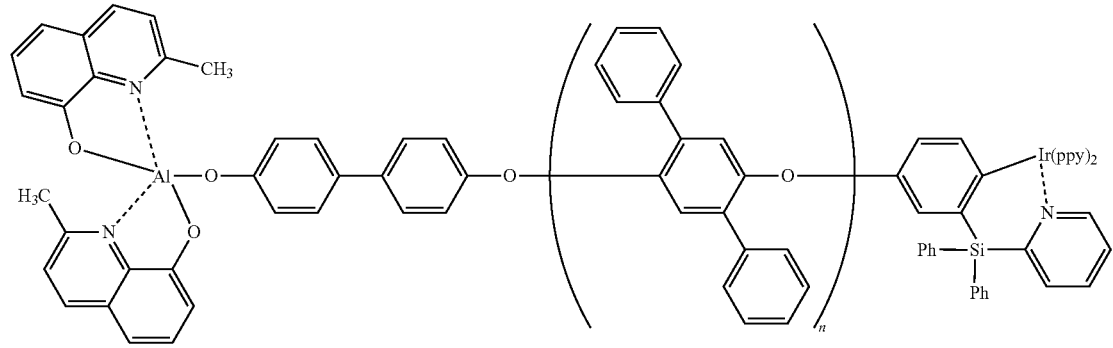
Poly-10
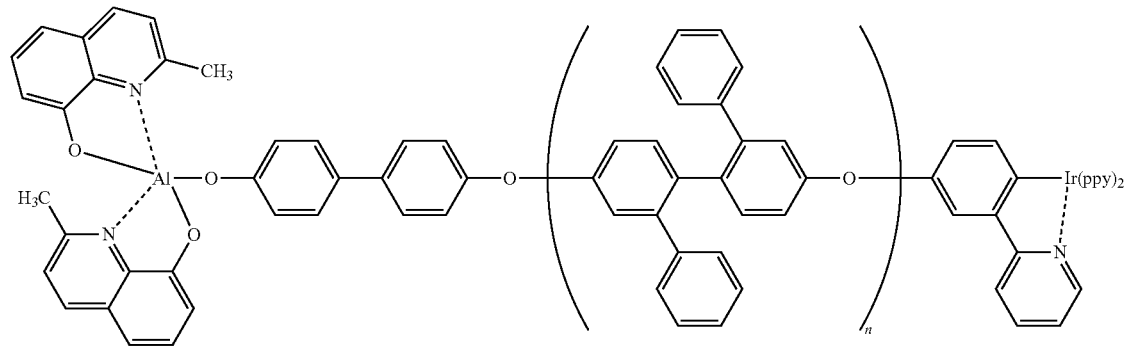

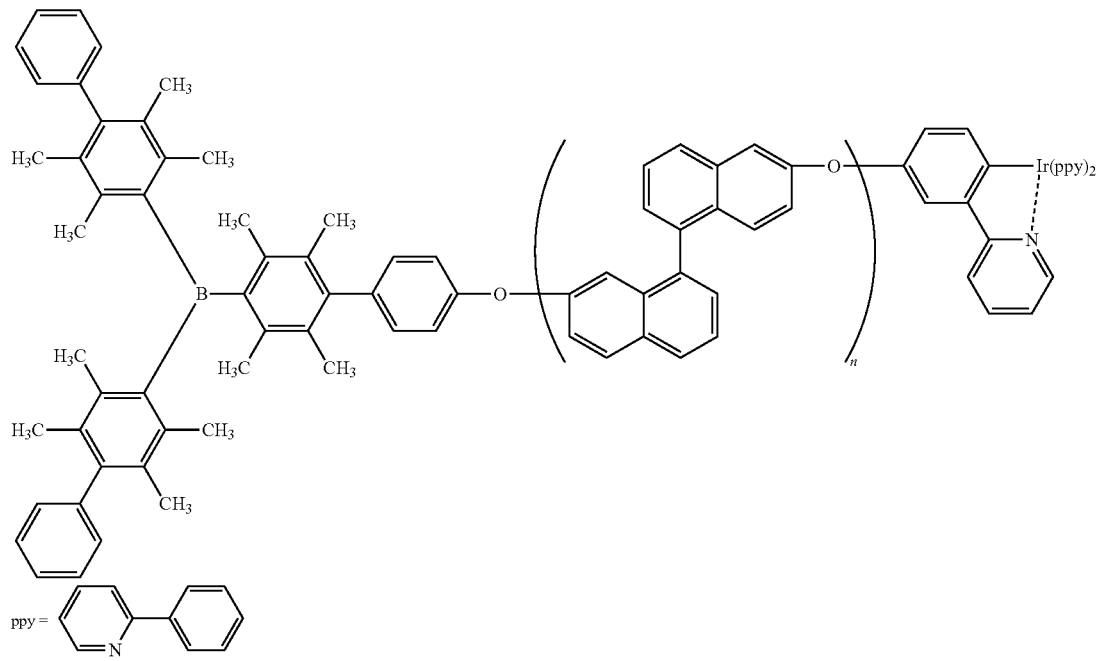

Poly-11

A polymer containing at least one of the repeat units represented by above Formula (1) may be contained in any organic compound layer existing between the cathode and the anode, however, it is preferably contained in the emitting layer, whereby higher luminance, higher luminous efficiency, longer emission life and more reduced driving power consumption are attained.

The present inventors have found that an organic electroluminescent element containing a cathode and an anode having therebetween at least one organic compound layer, wherein one of the organic compound layer contains a polymer having a repeat unit represented by Formula (2) exhibits high luminance, high luminous efficiency, long emission life and reduced driving power consumption.

In the above described Formula (2), $Ar_2$ represents an arylene group which may have a substituent or a heteroarylene group which may have a substituent; the number of heteroatoms in the heteroarylene group is not more than two; $L_2$ represents a linkage group selected from the above described Group 1; and $L_3$ represents a single bond or a linkage group selected from Group 2; X represents one of a hole transport group, an electron transport group, a fluorescent group and a phosphorescent group; and $n_2$ represents an integer of not less than two.

In the above mentioned Group 2, $R_7$-$R_{13}$ each independently represent an alkyl group or an aryl group, provided that $R_{10}$ and $R_{11}$, or $R_{12}$ and $R_{13}$ may be joined to form a ring.

Among the linkage groups of Group 2, the linkage groups linked by an O atom, a S atom, a Se atom and a Si atom are specifically preferable to obtain the effect of the present invention, and most preferable are those linked by an O atom and a S atom.

Examples of linkage groups of Group 2 will be shown below, however, the present invention is not limited thereto.

$*\!-\!\!\mathrm{O}\!-\!*$    $L_2$-1

$*\!-\!\!\mathrm{S}\!-\!*$    $L_2$-2

$*\!-\!\!\mathrm{Se}\!-\!*$    $L_2$-3

$*\!-\!\!\mathrm{Te}\!-\!*$    $L_2$-4

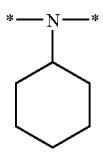 $L_2$-5

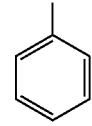 $L_2$-6

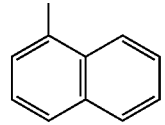 $L_2$-7

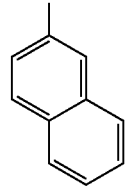 $L_2$-8

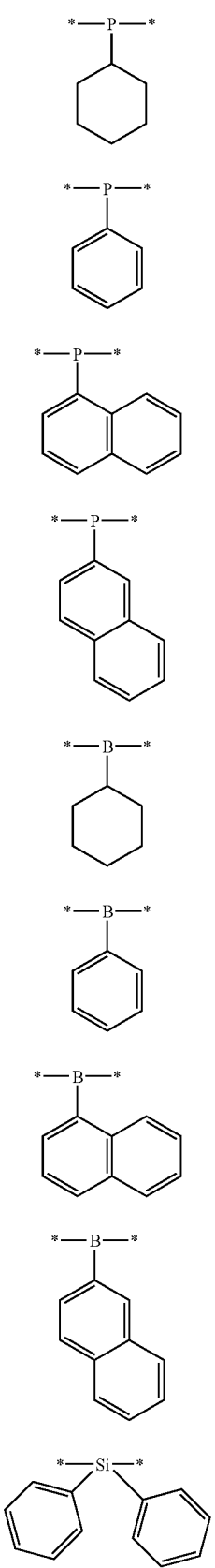
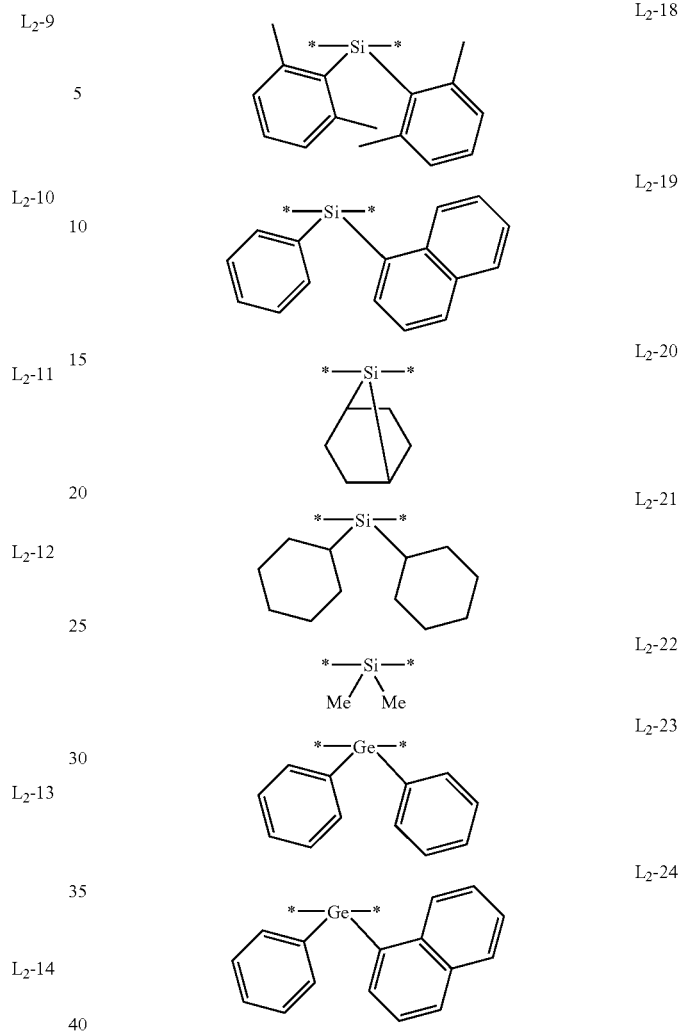

The number of rings of $Ar_2$ in the above Formula (2) is preferably not more than 5, whereby higher luminance, higher luminous efficiency, longer emission life and more reduced driving power consumption are attained.

As examples of $Ar_2$ of the above described Formula (2), the above mentioned examples for $Ar_1$ of Formula (1) are cited, however, the present invention is not limited thereto.

A hole transport group represents a group containing a substructure which has a function to convey positive holes. In a broad sense, a hole injection group and an electron blocking group are also included in the hole transport group. The hole transport group is not specifically limited in the present invention, and usable is a group having a substructure of a known material which has been commonly used for a hole injection-transport material, or a material used in a hole injection layer or in a hole transport layer of EL elements.

A hole transport group represents a group having a function of injection or transportation of holes, or a function of electron blocking, and may be an organic compound or an inorganic compound. Examples include groups having a substructure of, for example, a triazole derivative, an oxydiazole derivative, an imidazole derivative, a polyarylalkane derivative, a pyrazoline derivative, a pyrazolone derivative, a phenylenediamine derivative, an arylamine derivative, an amino substituted chalcone derivative, an oxazole derivative, a styrylanthracene derivative, a fluorenone derivative, a hydrazone derivative, a stilbene derivative, a silazane derivative and an aniline-containing copolymer. More preferable is a group having a substructure of a triarylamine derivative or a carbazole derivative.

A phenyl group may be cited as a typical example of an aryl group which forms a triarylamine derivative, however, other examples include aromatic hydrocarbon residues such as a naphthyl group, an anthryl group, an azulenyl group, and a fluorenyl group; hetero aromatic residues such as a furyl group, a thienyl group, a pyridyl group and an imidazolyl group, which may form a condensed hetero aromatic residue via condensation with another aromatic ring. Examples of a preferable aryl group which form the triarylamine portion includes: a phenyl group, a naphthyl group, a fluorenyl group and a thienyl group.

In the present invention, the hole transport group preferably contains a carbazole derivative, and specifically preferably contains a group having a substructure represented by the above mentioned Formula (3) or Formula (4), whereby higher luminance, higher luminous efficiency, longer emission life and more reduced driving power consumption are attained.

In above mentioned Formula (3), $R_{14}$-$R_{21}$ each independently represent a hydrogen atom, an alkyl group or a cycloalkyl group, provided that adjacent groups of $R_{14}$-$R_{21}$ may be joined to form a ring.

In above mentioned Formula (4), $R_{22}$-$R_{30}$ each independently represent a hydrogen atom, an alkyl group or a cycloalkyl group, and $R_{31}$-$R_{34}$ each independently represent a hydrogen atom, a single bond, an alkyl group or a cycloalkyl group, provided that one of $R_{31}$-$R_{34}$ represents a single bond, and that adjacent groups of $R_{22}$-$R_{34}$ may be joined to form a ring.

Examples of a substructure having a hole transport function are shown below (one part of these substructures serves as a bond), however the embodiments of the present invention are not limited thereto.

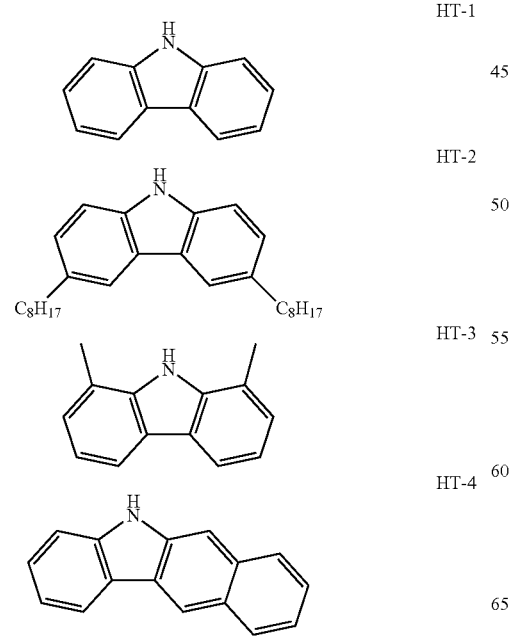

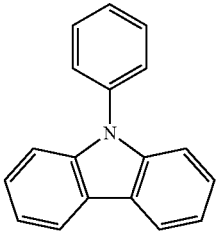

HT-5

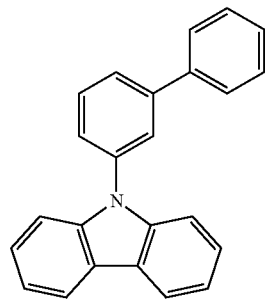

HT-6

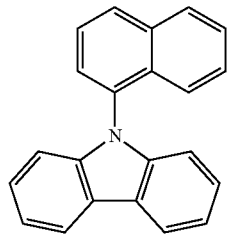

HT-7

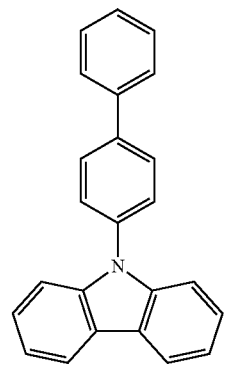

HT-8

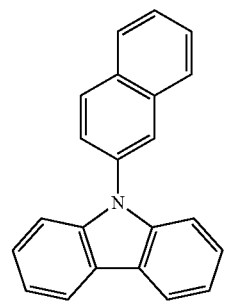

HT-9

-continued

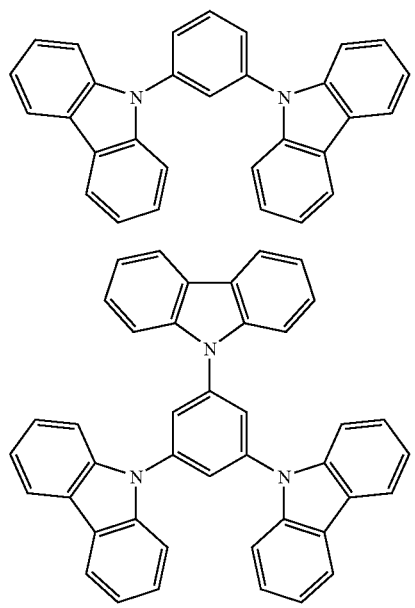

HT-10

HT-11

An electron transport group represents a group having a function to convey electrons. In a broad sense, an electron injection group and a hole blocking group are also included in the electron transport group. The electron transport group may have a function to convey electrons injected from the cathode to the emitting layer, and a group having a substructure which has been commonly used as an electron transport layer are employable.

Examples of an electron transprt group include groups having a substructure of, for example: a triarylborane derivative, a nitro-substituted fluorene derivative, a diphenylquinone derivative, a thiopyran dioxide derivative, carbodiimide, a fluolenylidenemethane derivative, an anthraquinodimethane derivative, an anthron derivative and an oxydiazole derivative. Also, usable as an electron transport group include, for example: a thiadiazole derivative obtained by replacing an oxygen atom of the oxydiazole ring of an oxydiazole derivative with a sulfur atom; and a group having a substructure of a quinoxaline derivative which has a quinoxqline ring known as an electron withdrawing group.

Further, examples of a group usable as an electron transport group include groups containing a substructure of: metal complexes of 8-quinolinol derivative, for example, tris(8-quinolinol)alminum (Alq), tris(5,7-dichloro-8-quinolinol) alminum, tris(5,7-dibromo-8-quinolinol)alminum, tris(2-methyl-8-quinolinol)alminum, tris(5-methyl-8-quinolinol) aluminum and bis(8-quinolinol)zinc (Znq); and metal complexes in which the central metal atom of the above metal complexes is replaced with, for example, In, Mg, Cu, Ca, Sn, Ga, or Pb. In addition, examples of a group usable as an electron transport group include groups having a substructure of, for example: metal free phthalocyanine, metal phthalocyanine, or those phthalocyanines of with ends are substituted with an alkyl group or an sulfonic acid group.

Preferable examples of an electron transport group include: groups having a substructure of a triarylborane derivative or a heteroaromatic ring containing nitrogen. As a hetero aromatic ring containing nitrogen, more preferable are those having two or more hetero atoms, of which examples include: a pyrazine ring, a pyrimidine ring, a phenanthroline ring, a pyridoindole ring, a dipyridopyrrole ring, a diazafluorene ring, a phenathiazin ring, a thiazole ring, and condensed aromatic residues in which the above mentioned rings are further condensed with other aromatic rings; and hydrocarbon residues replaced with an electron withdrawing group (for example, a pentafluorophenyl group and 2,4,6-tricyanophenyl group). Specifically preferable are, for example, a pentafluorophenyl group, a triarylborane residue, a pyridoindole ring, a thiazole ring and a condensed aromitic residue having a substructure of one of the above groups. Thereby higher luminous efficiency is attained.

A phenyl group may be cited as a typical example of an aryl group which forms a triaryborane derivative, however, other examples include aromatic hydrocarbon residues such as a naphthyl group, an anthryl group, an azulenyl group, and a fluorenyl group; and hetero aromatic residues such as a furyl group, a thienyl group, a pyridyl group and an imidazolyl group, each of which may form a condensed hetero aromatic residue via condensation with another aromatic ring.

The triarylborane derivative tends to be unstable because of the electron deficiency in nature, and the atom in the aryl group adjacent to the atom which is directly bonded to the boron atom is often introduced with a substituent for stabilization, example of which include: trimesitylborane in which a methyl group is introduced into the benzene ring combined with the boron atom, and tris(diisopropyl)borane introduced with an isopropyl group. When a triarylborane structure is contained as a ligand, the aryl group bonded to the boron atom is preferably introduced with a substituent at the atom adjacent to the atom directly bonded to the boron atom. Examples of the substituent include: a methyl group, a fluoromethyl group, a trifluoromethyl group and an isopropyl group.

Examples of a substructure having an electron transport function are shown below (one part of each substructure serves as a bond). An electron transport group means a group having one of these substructures, however the embodiments of the present invention are not limited thereto.

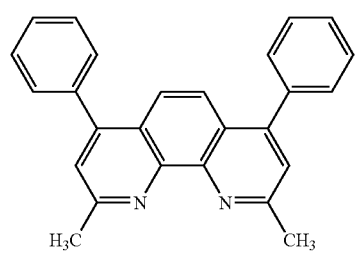

ET-1

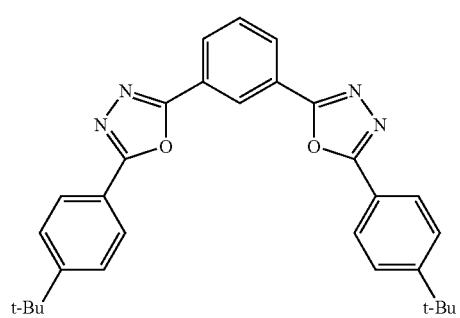

ET-2

-continued
ET-3
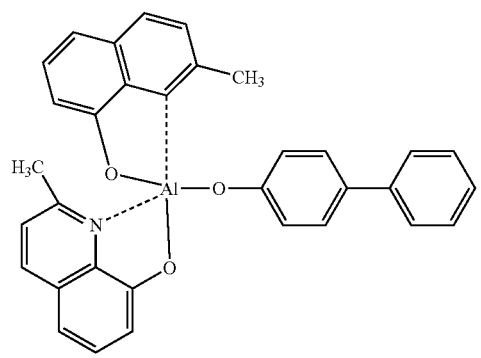
ET-4
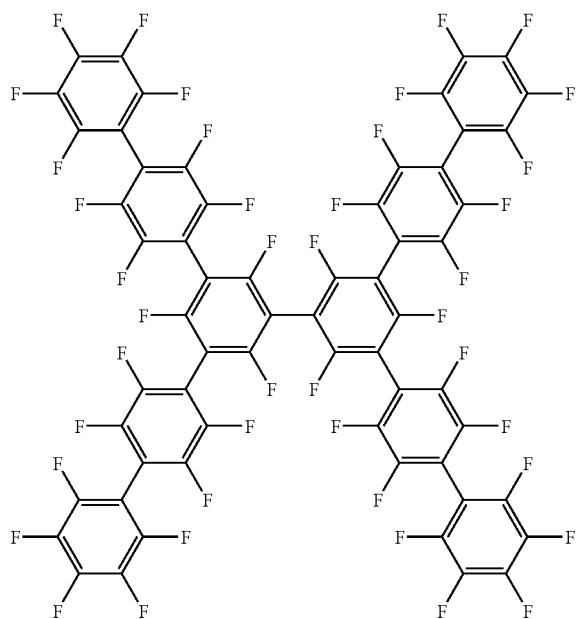
ET-5
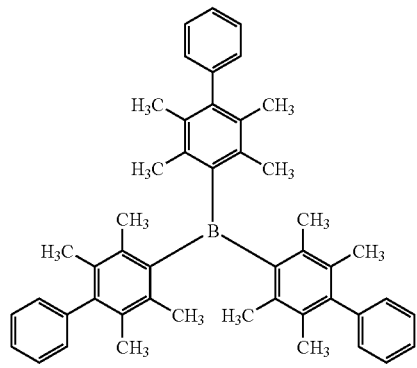
ET-6
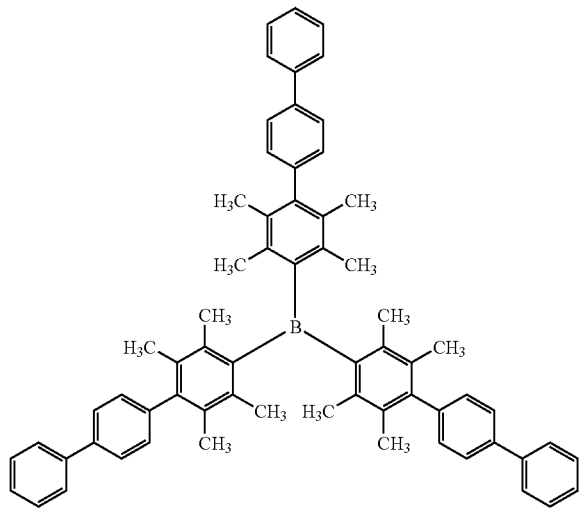
ET-7
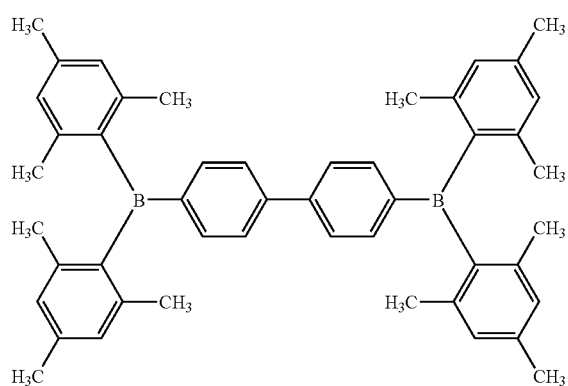
ET-8
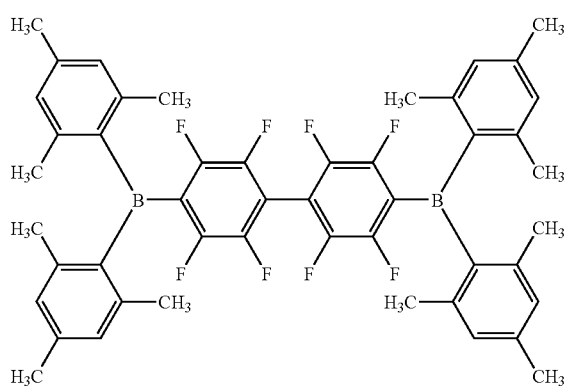

-continued
ET-9
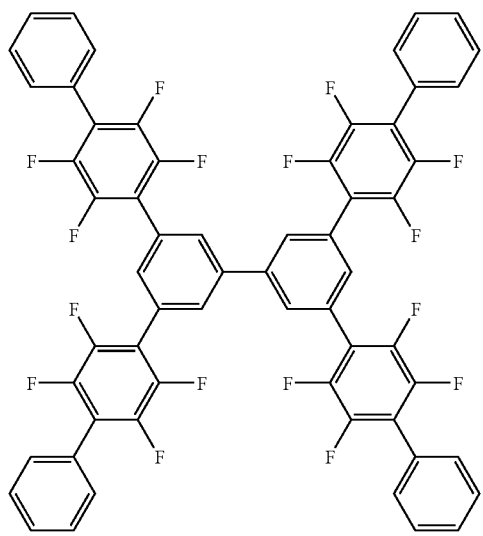
ET-10
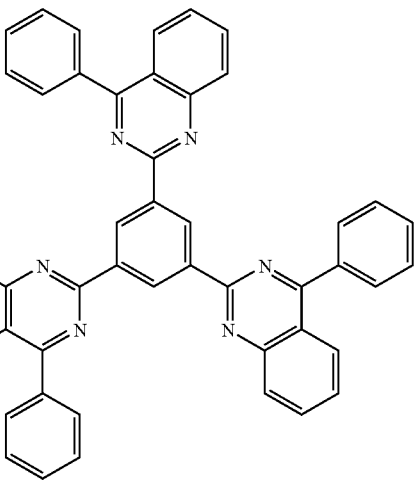
ET-11
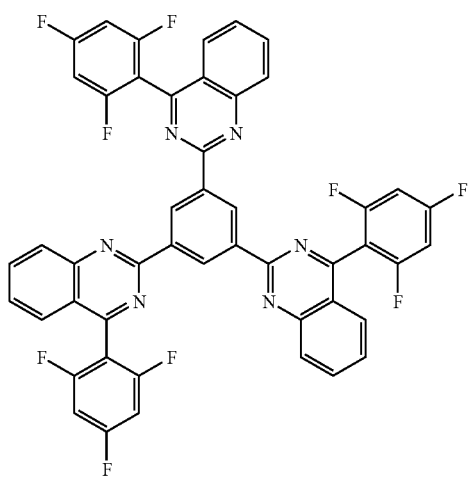
ET-12
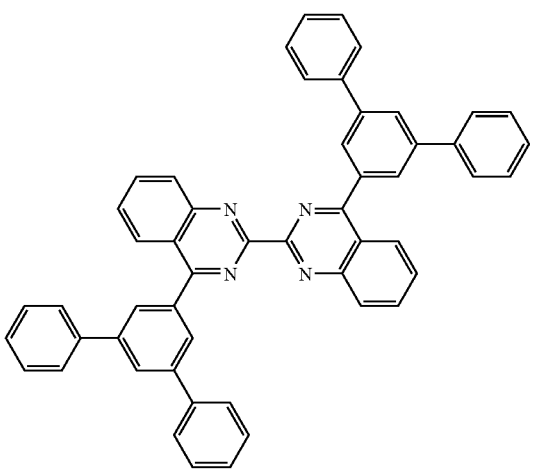
ET-13
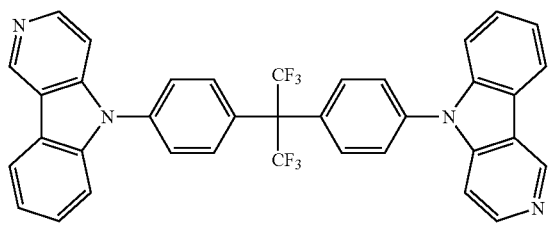
ET-14
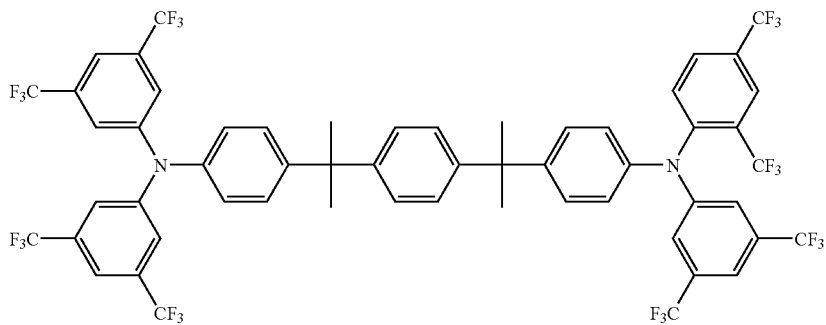

A fluorescent group is a group which has a substructure of an organic fluorescent molecule exhibiting a high fluorescent quantum yield in a liquid state or a fluorescent rare earth metal complex. Herein, the fluorescent quantum yield is preferably 10% or more and more preferably 30% or more. Examples of an organic fluorescent molecule exhibiting a high fluorescent quantum yield include: a coumarin dye, a pyrane dye, a cyanine dye, a chloconium dye, a squalenium dye, an oxobenzanthracene dye, a fluoresceine dye, a rhodamine dye, a pyrylium dye, a perylene dye, a stilbene dye and a polythiophene dye. The group having one of these substructures is usable as a fluorescent group.

Examples of a fluorescent substructure are shown below (one part of each substructure serves as a bond). An fluorescent group means a group having one of these substructures, however, the embodiments of the present invention are not limited thereto.

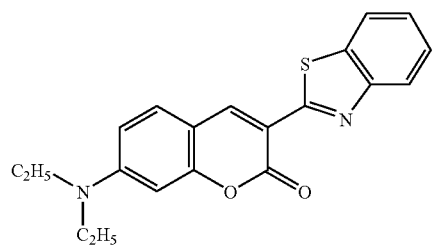
E-1

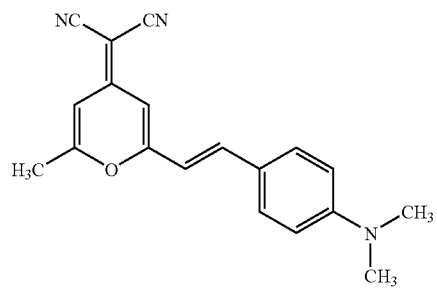
E-2

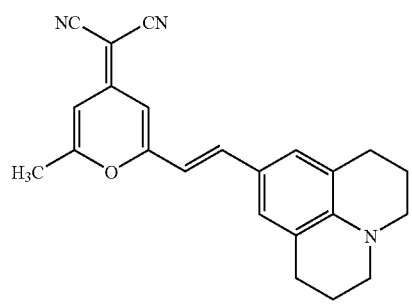
E-3

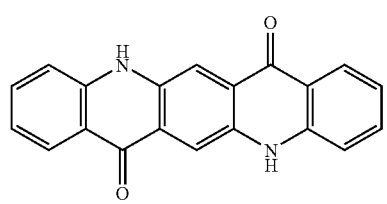
E-4

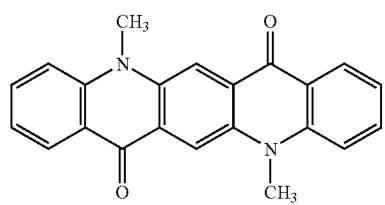
E-5

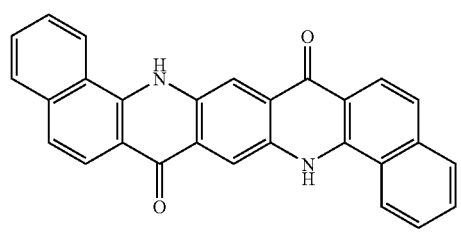
E-6

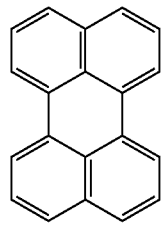
E-7

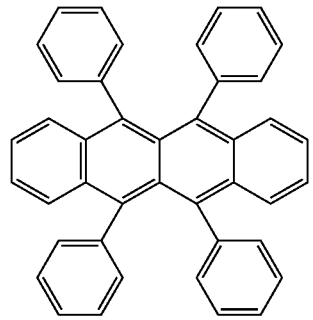
E-8

-continued
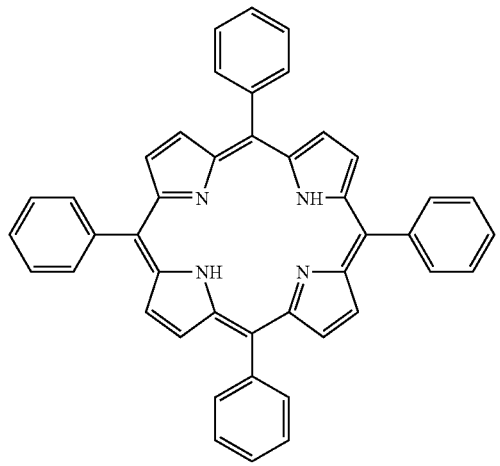
E-9
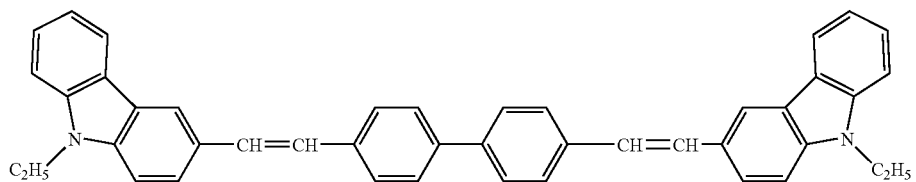
E-10
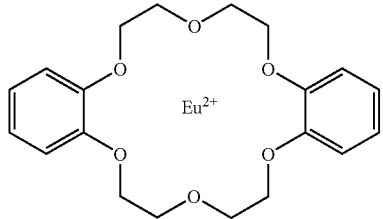
E-11
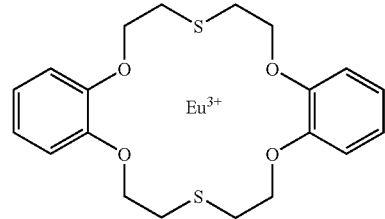
E-12
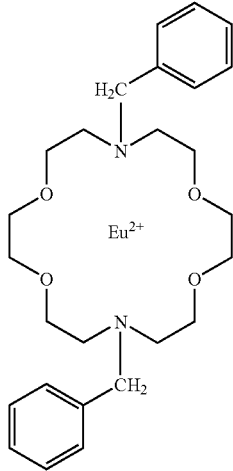
E-13
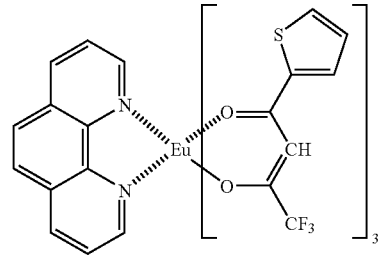
E-14
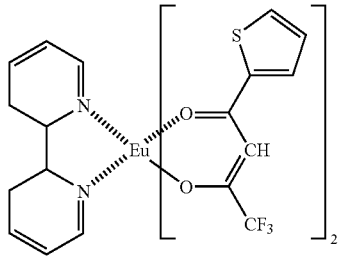
E-15
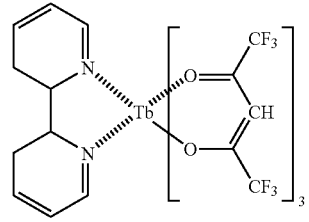
E-16

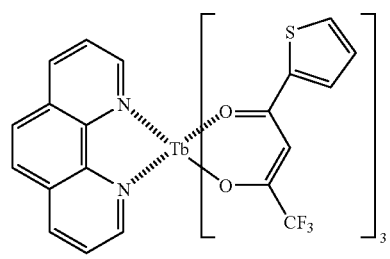
E-17

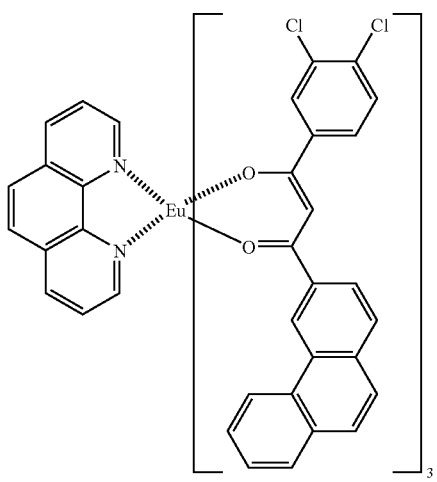
E-18

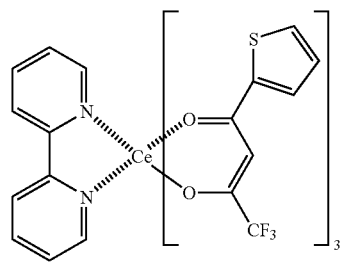
E-19

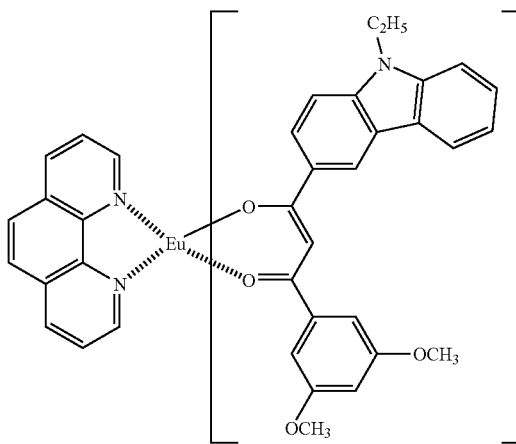
E-20

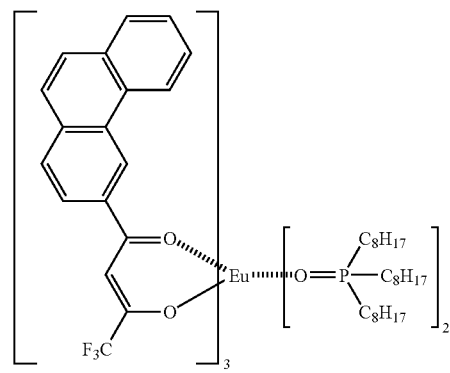
E-21

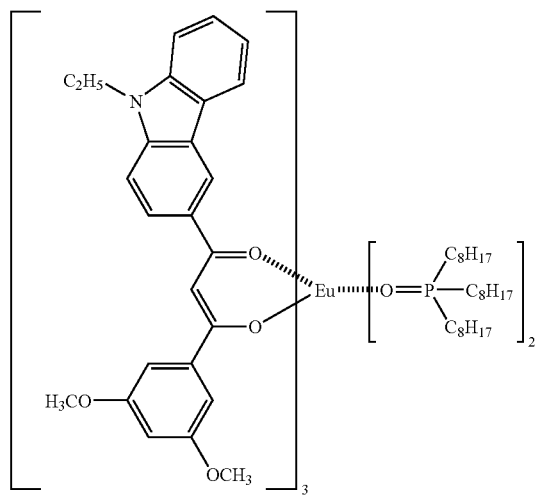
E-22

A phosphorescent group is a group which has a substructure exhibiting light emission from an excited triplet, of which phosphorescent quantum yield is 0.001 or more at 25° C. The phosphorescent quantum yield is preferably 0.01 or more and more preferably 0.1 or more. A phosphorescence quantum yield is preferably 0.1 or more more preferably 0.01 or more.

The phosphorescent quantum yield can be measured according to a method described in the fourth edition "Jikken Kagaku Koza 7", Bunko II, page 398 (1992) published by Maruzen. The phosphorescent quantum yield in a solution can be measured employing various kinds of solvents. The phosphorescent compound used in the present invention is a compound, in which the phosphorescent quantum yield measured employing any one of the solvents falls within the above-described range.

The phosphorescent group is preferably a group containing an organometallic complex, whereby higher luminance, higher luminous efficiency, longer emission life and more reduced driving power consumption are attained.

The organometallic complex preferably has a substructure represented by one of above mentioned Formulas (5) to (8), whereby higher luminance, higher luminous efficiency, longer emission life and more reduced driving power consumption are attained.

In Formula (5), $R_{35}$-$R_{42}$ each independently represent a hydrogen atom, a single bond or a substituent, provided that adjacent groups of $R_{35}$-$R_{42}$ may be joined to form a ring, and M represents a metal atom.

In Formula (6), $Z_1$ and $Z_2$ each independently represent a group of atoms necessary to form an aromatic ring together with a carbon atom and a nitrogen atom, and M represents a metal atom.

In Formula (7), $R_{43}$-$R_{48}$ each independently represent a hydrogen atom, a single bond or a substituent, provided that adjacent groups of $R_{43}$-$R_{48}$ may be joined to form a ring, and M represents a metal atom.

In Formula (8), Y represents a divalent linkage group, $R_{49}$-$R_{56}$ each independently represent a hydrogen atom, a single bond or a substituent, provided that adjacent groups of $R_{49}$-$R_{56}$ may be joined to form a ring, and M represents a metal atom.

In Formulas (5)-(8), M is preferably one of an iridium atom, a palladium atom, a platinum atom, a rhodium atom, a ruthenium atom or an osmium atom, whereby higher luminance, higher luminous efficiency, longer emission life and more reduced driving power consumption are attained.

The organometallic complex of the present invention preferably contains a metal of Group 8 in the periodic table of the elements, and more preferably it is an iridium compound, an osmium compound, a platinum compound (a platinum complex compound), a rhodium compound, a palladium compound, a ruthenium compound, or a rare earth complex. Of these, specifically preferable is an iridium compound. Thereby, higher luminance, higher luminous efficiency, longer emission life and more reduced-driving power consumption are attained.

Examples of a phosphorescent substructure are shown below (one part of each substructure serves as a bond). An phosphorescent group means a group having one of these substructures, however, the embodiments of the present invention are not limited thereto.

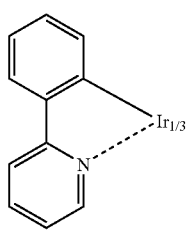

P-1

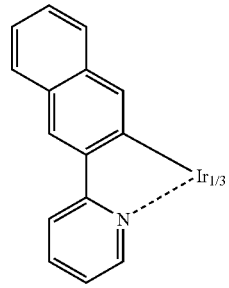

P-2

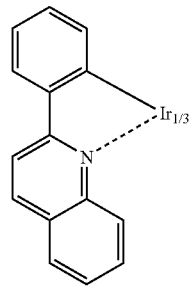

P-3

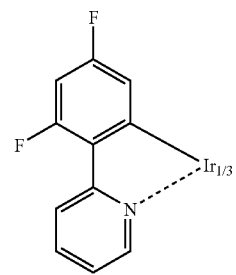

P-4

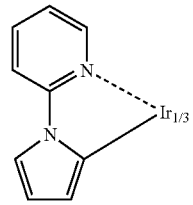

P-5

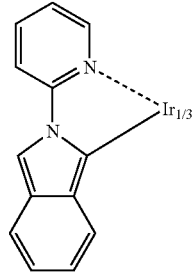

P-6

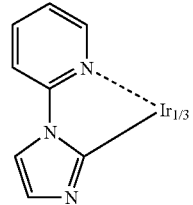

P-7

P-8

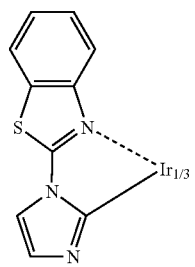

P-9

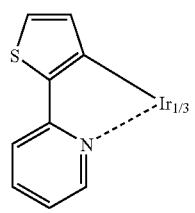

P-10

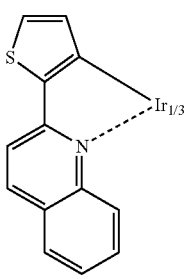

P-11

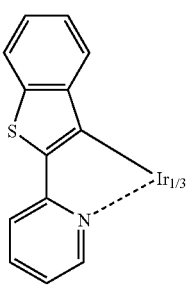

P-12

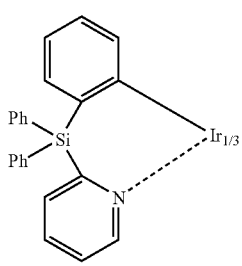

P-13

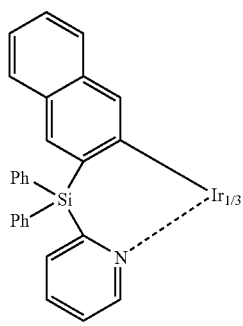

P-14

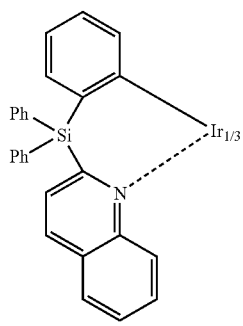

P-15

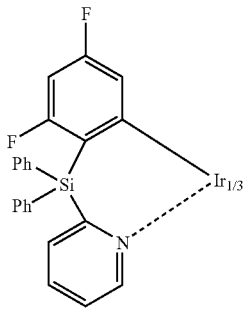

The structures of both ends of a polymer containing at least one of the repeat units represented by above Formula (2) are not specifically limited in the present invention, however, preferably, the both ends are capped with a hydrogen atom, an alkyl group or an aryl group which may have a substituent. In view of the function as an organic EL element, the both ends are more preferably capped with a hole blocking group, a fluorescent group or a phosphorescent group, which will be described later.

Examples of a polymer which contains at least one of the repeat units represented by Formula (2) include the polymers formed in combination of the above described examples, however, examples of a specifically preferable polymer containing at least one of the repeat units represented by Formula (2) are shown below, however, the present invention is not limited thereto.

PO-8
PO-9
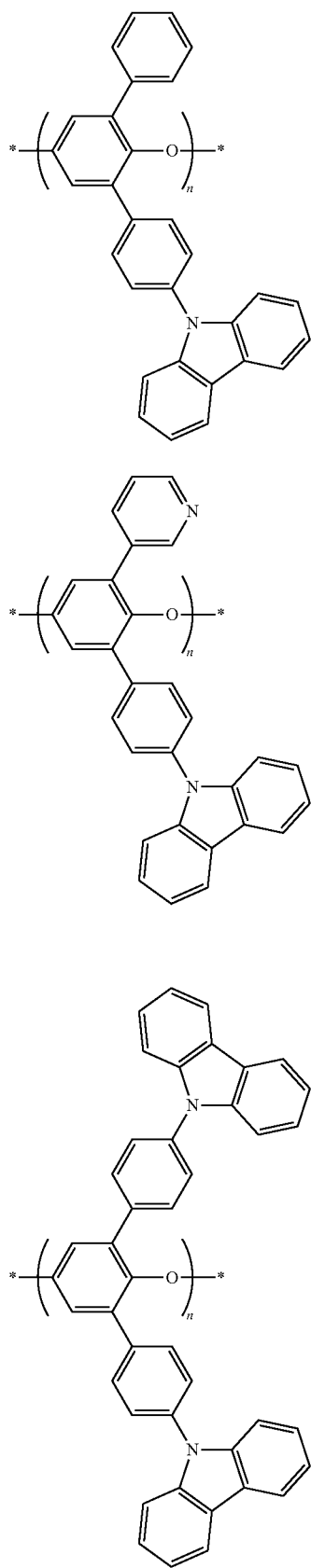
PO-10
PO-11
PO-12
PO-13
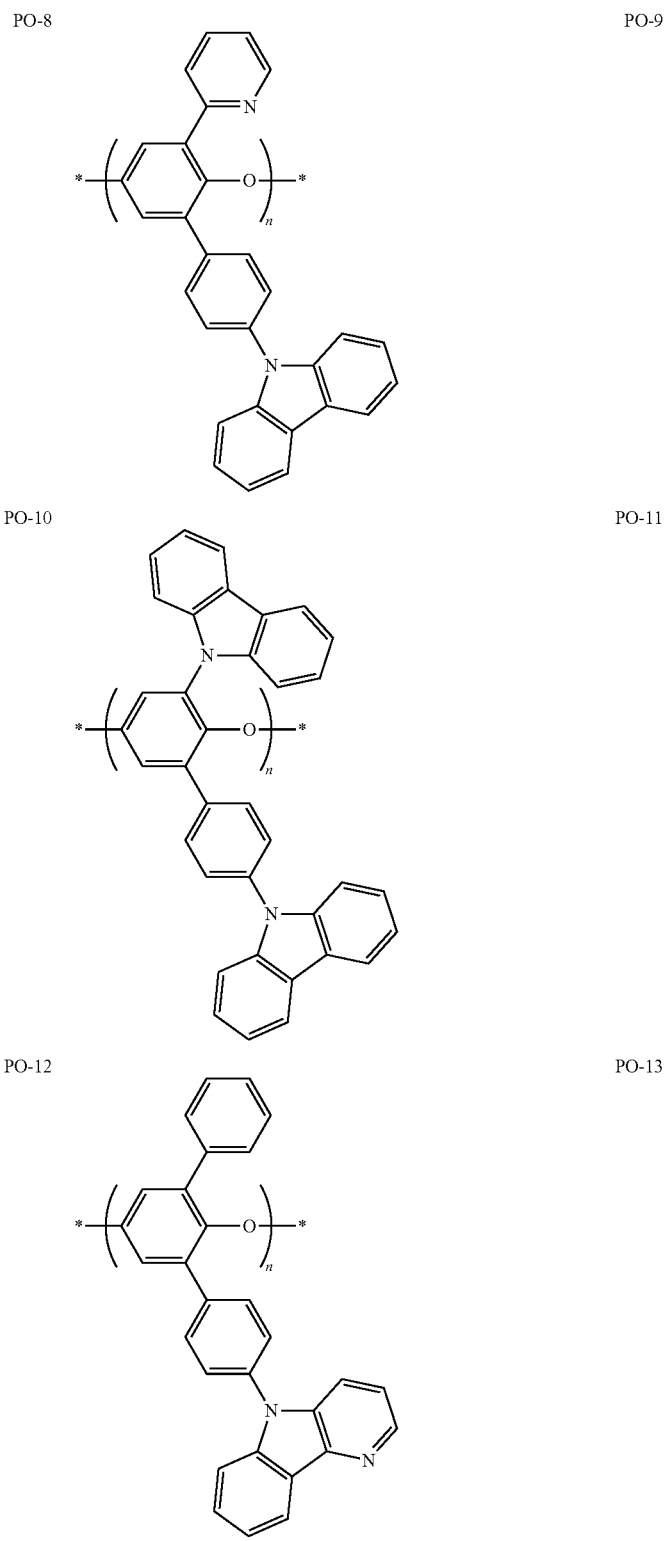

-continued
PO-14
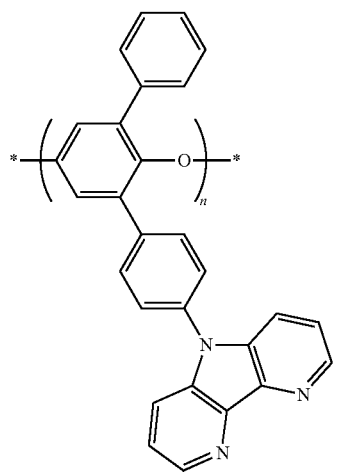
PO-15
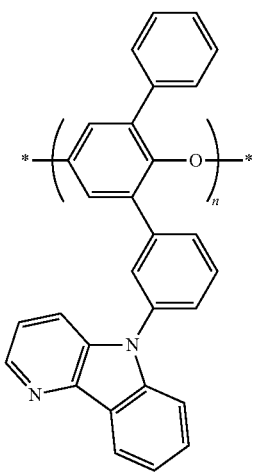
PO-16
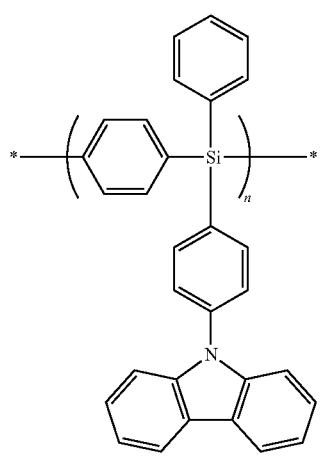
PO-17
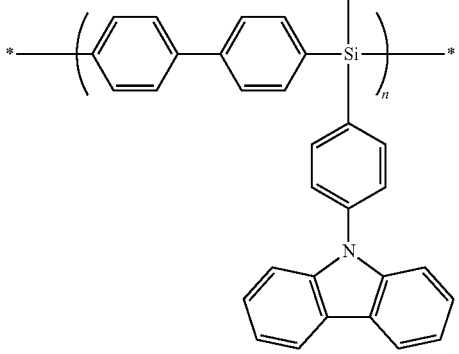
Poly-12
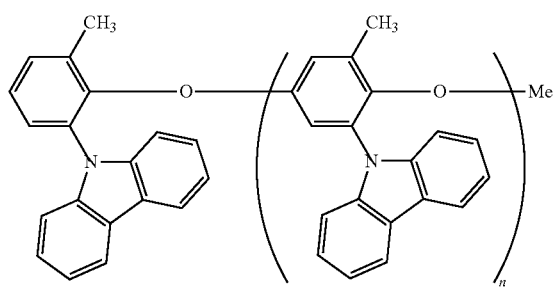
Poly-13
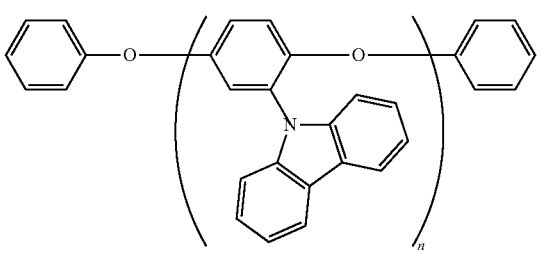
Poly-14
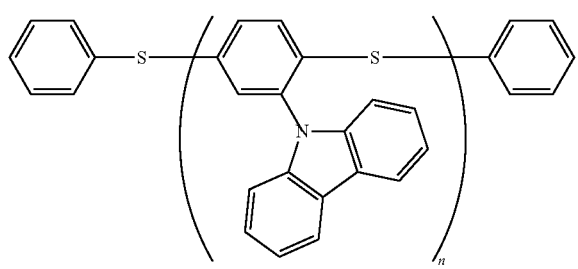
Poly-15
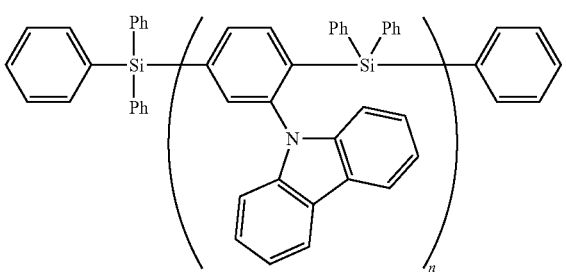

-continued
Poly-16
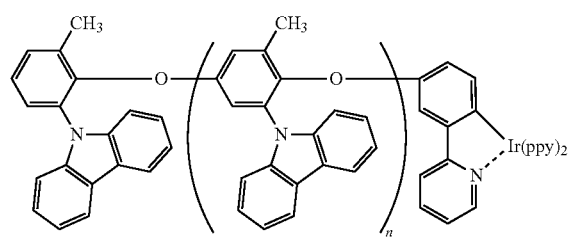
Poly-17
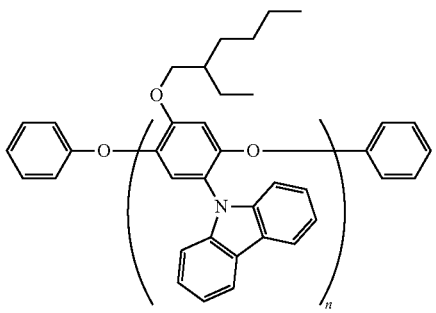
Poly-18
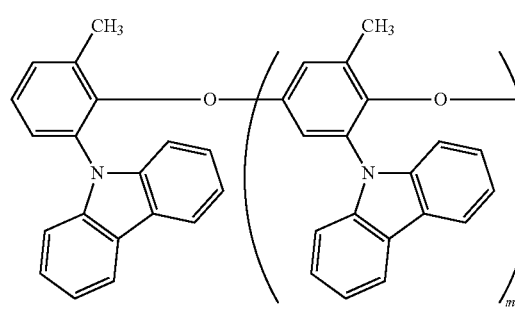
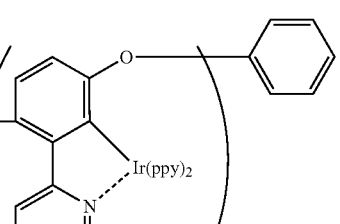
Poly-19
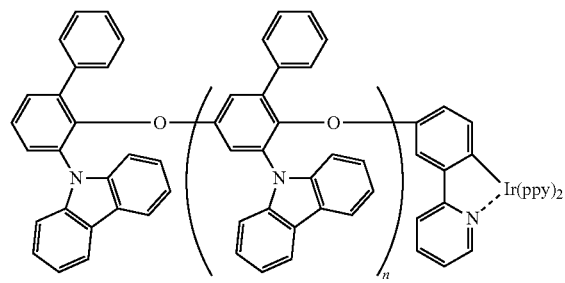
Poly-20
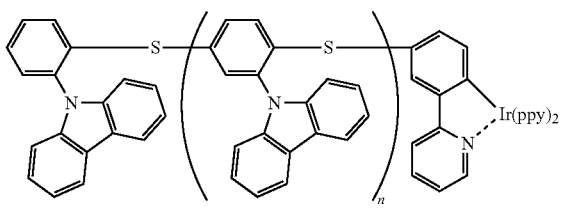
Poly-21
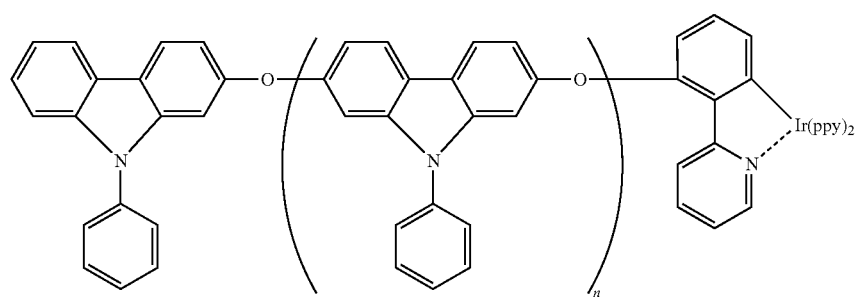
Poly-22
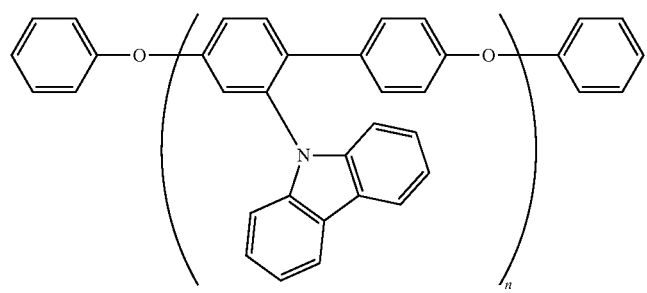

-continued
Poly-23
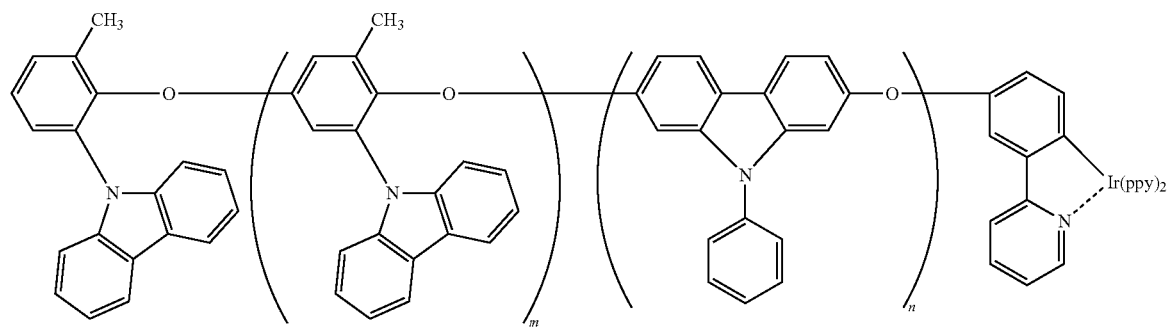
Poly-24
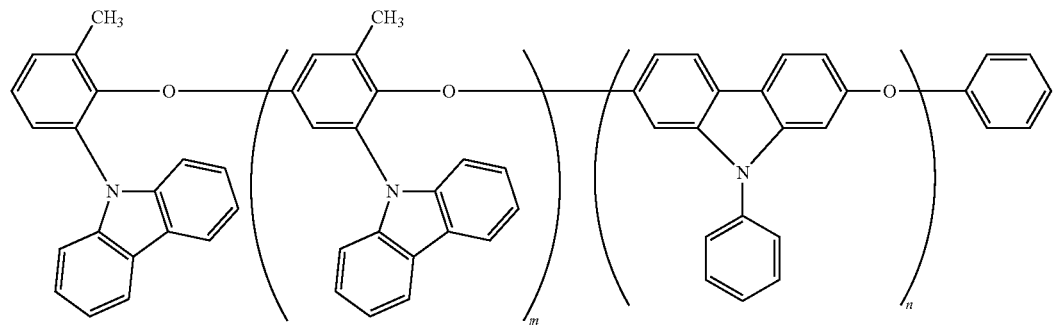
Poly-25
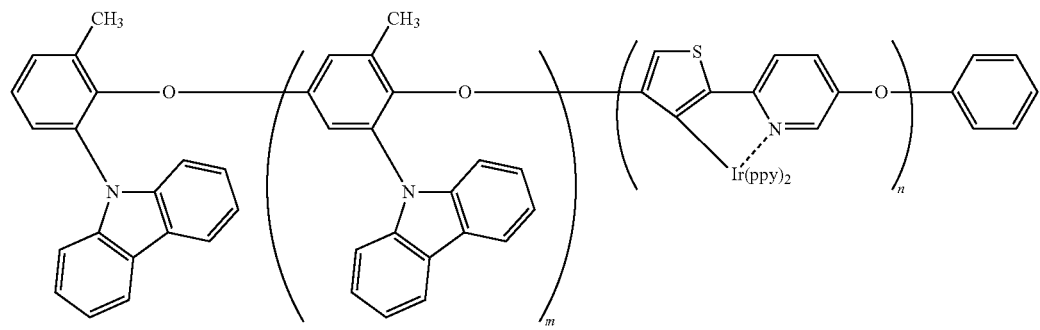
Poly-26
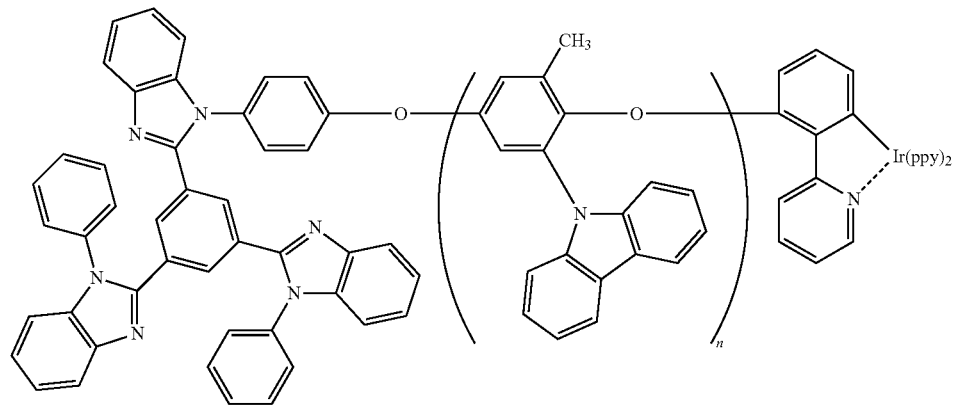

Poly-27
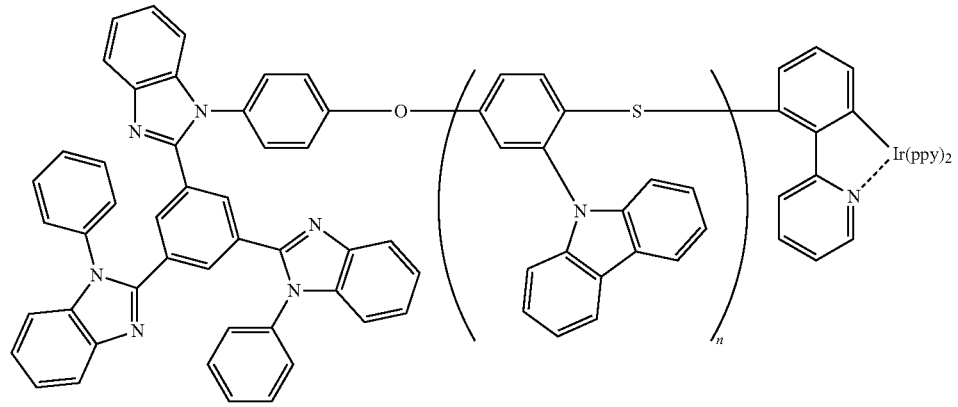
Poly-28
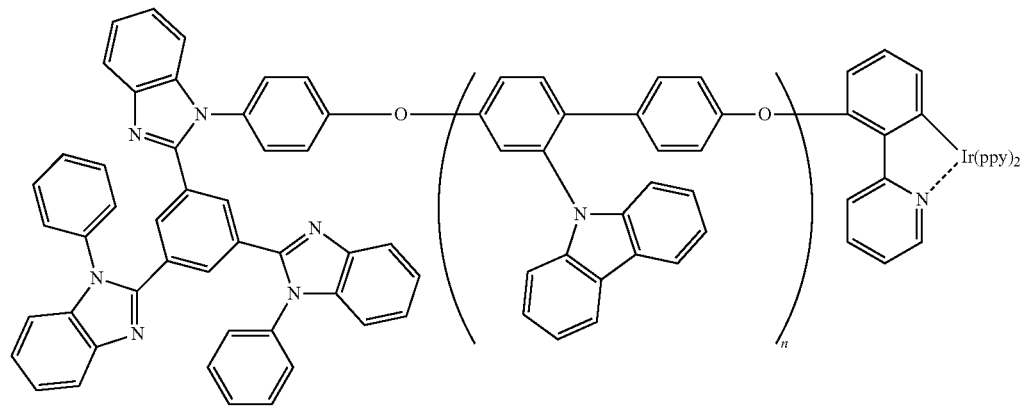
Poly-29
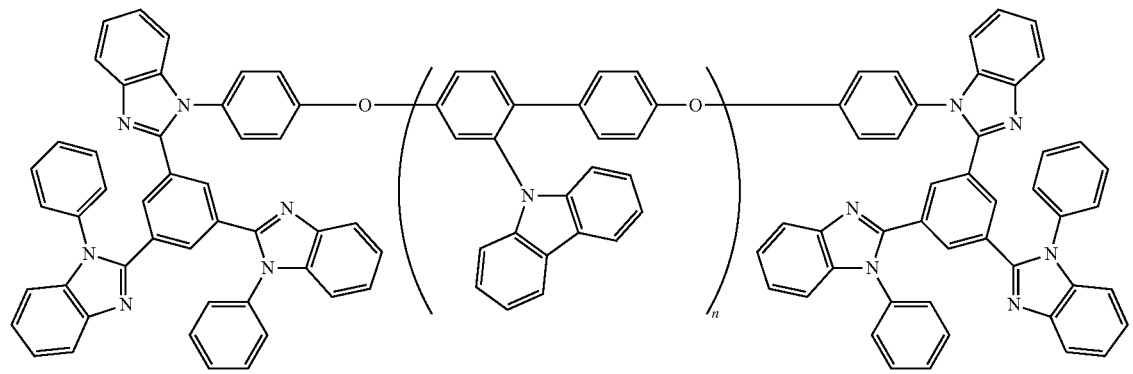
Poly-30
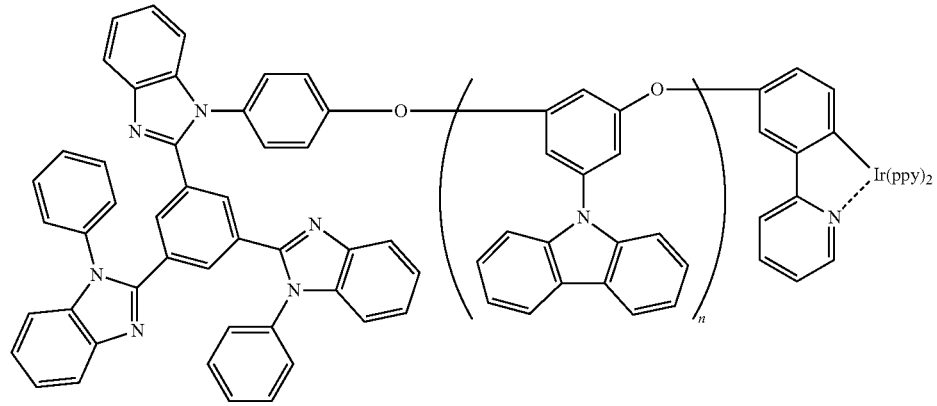

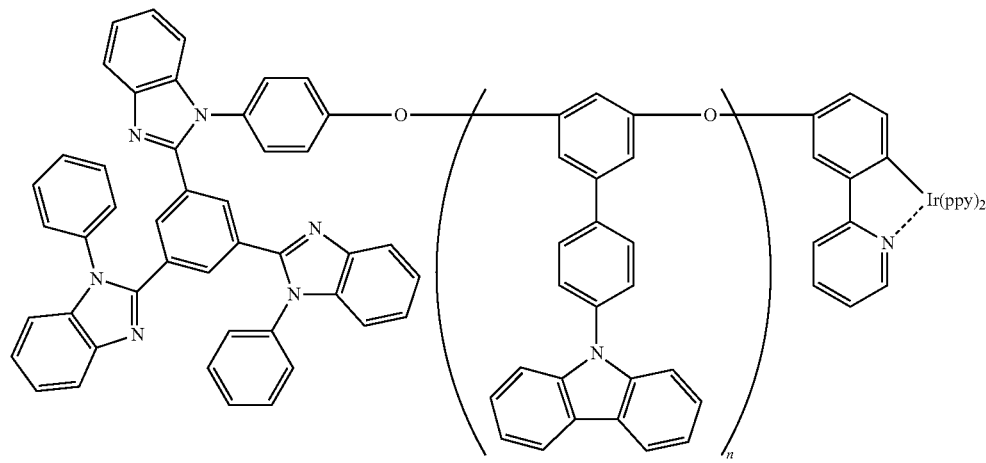
Poly-31
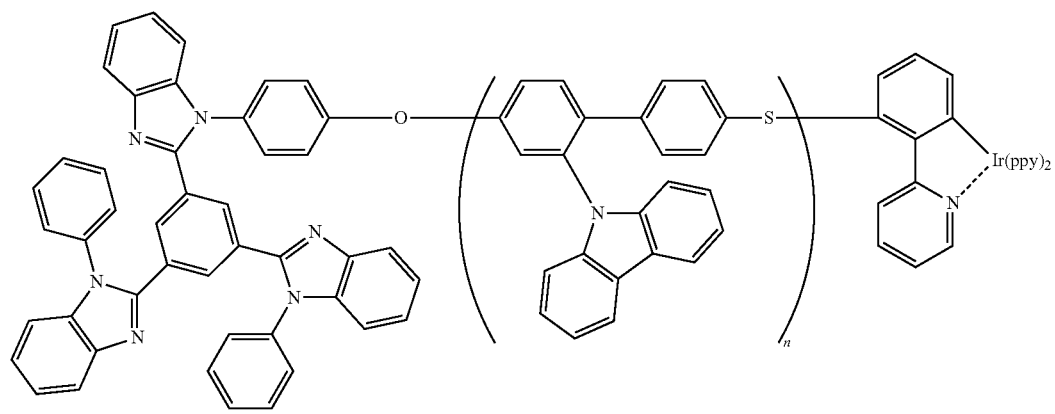
Poly-32
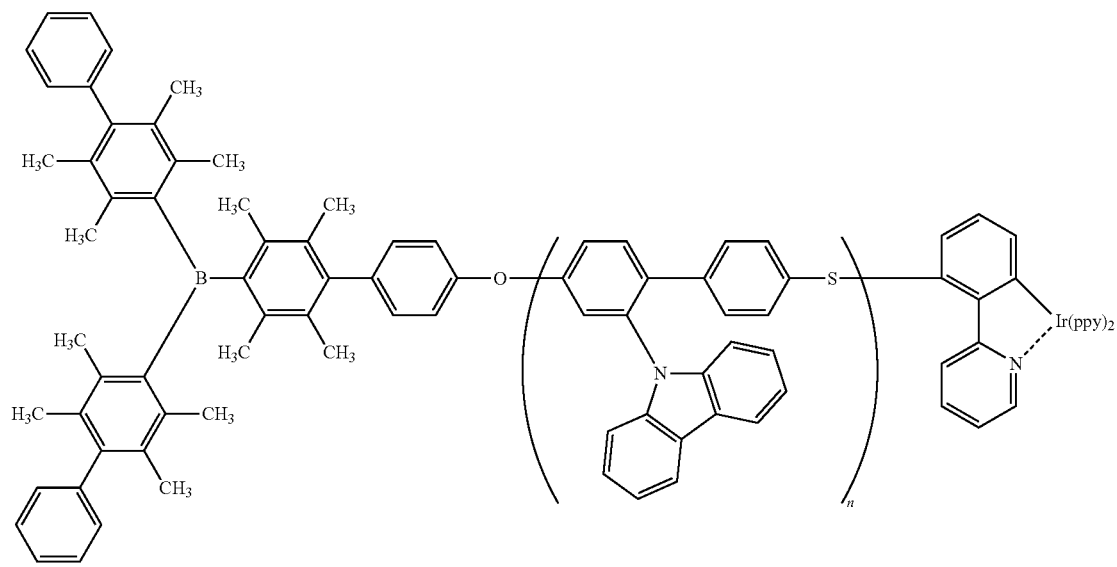
Poly-33

-continued
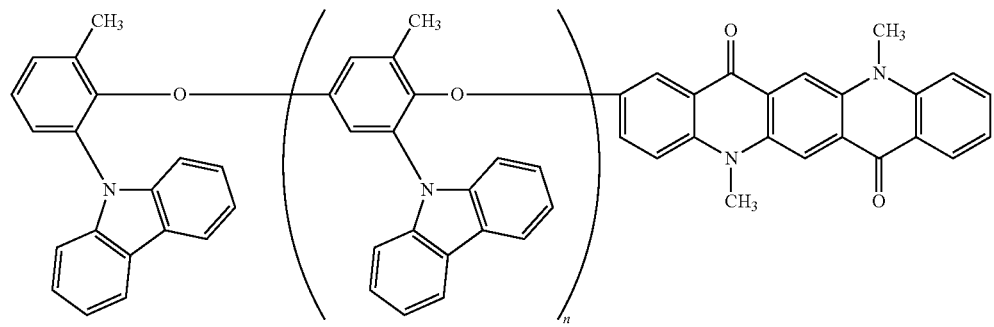
Poly-34
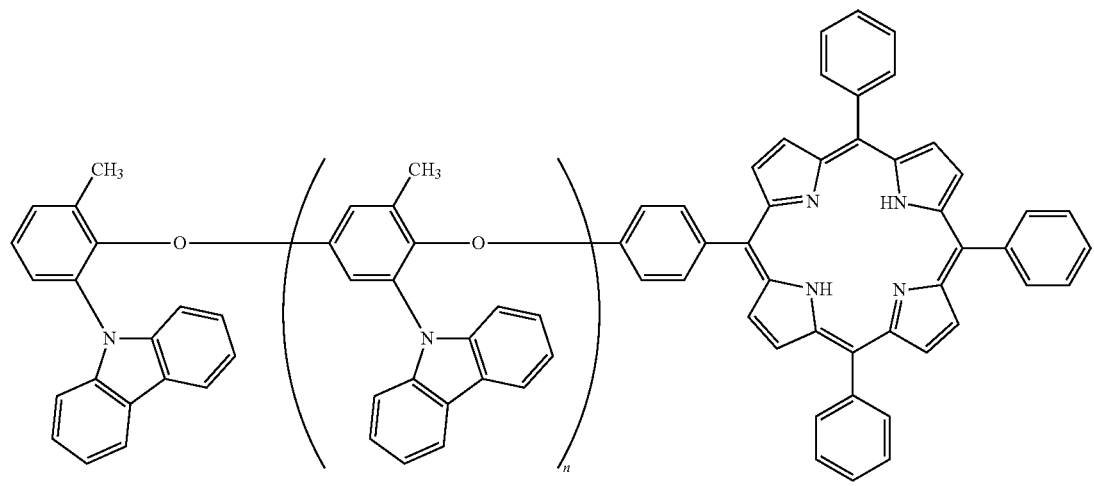
Poly-35
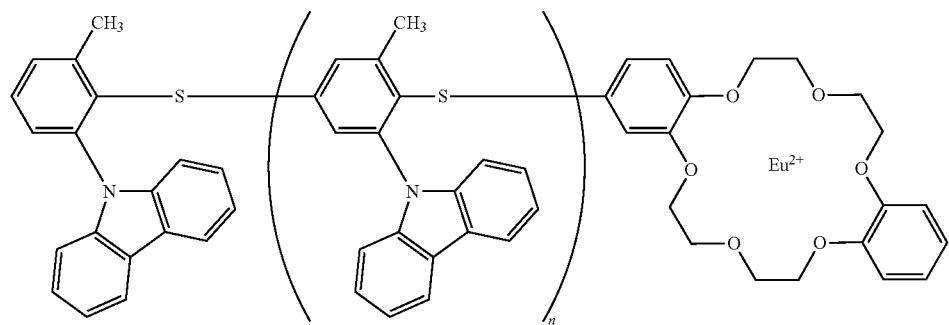
Poly-36
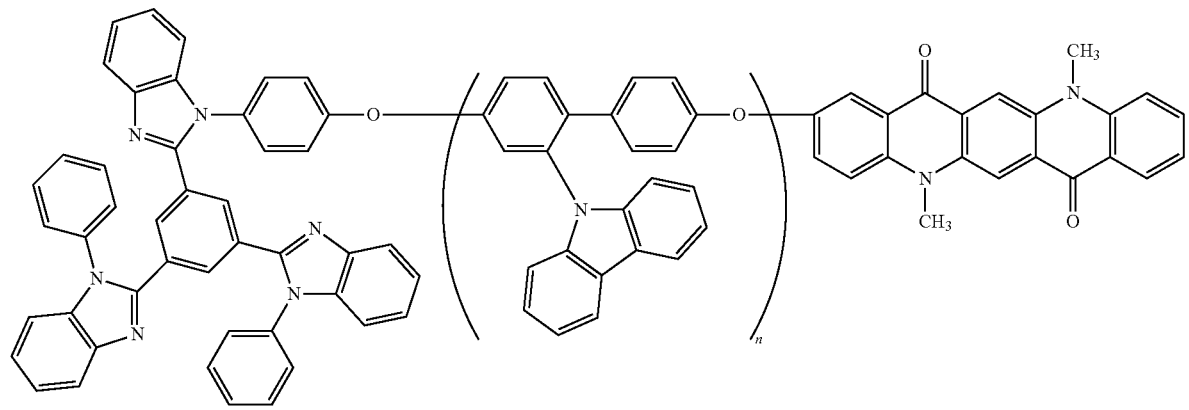
Poly-37

Poly-38
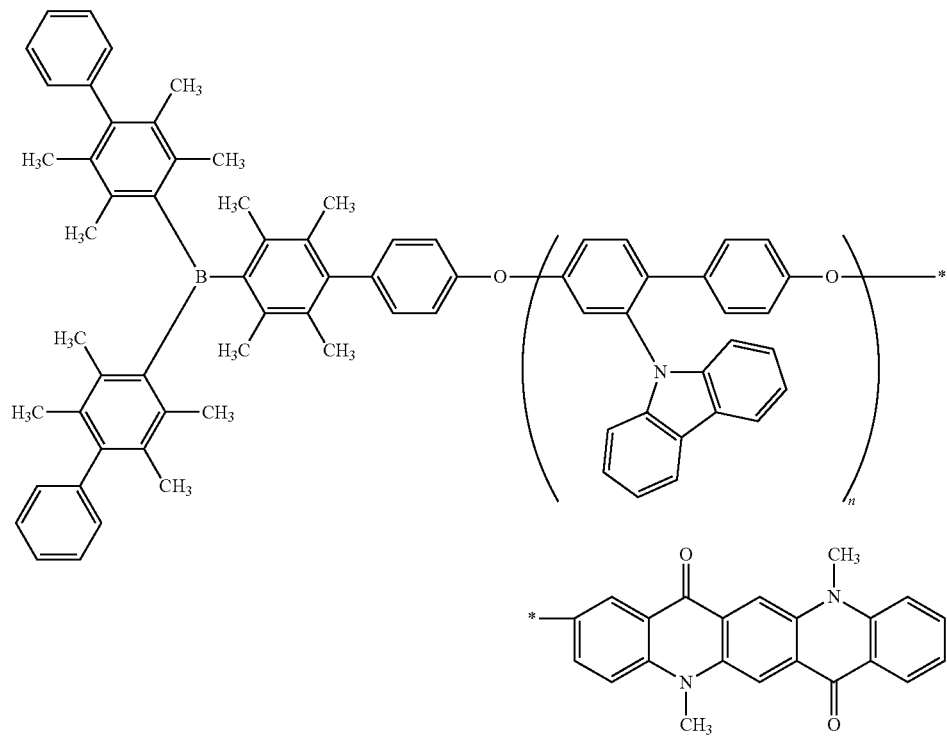
Poly-39
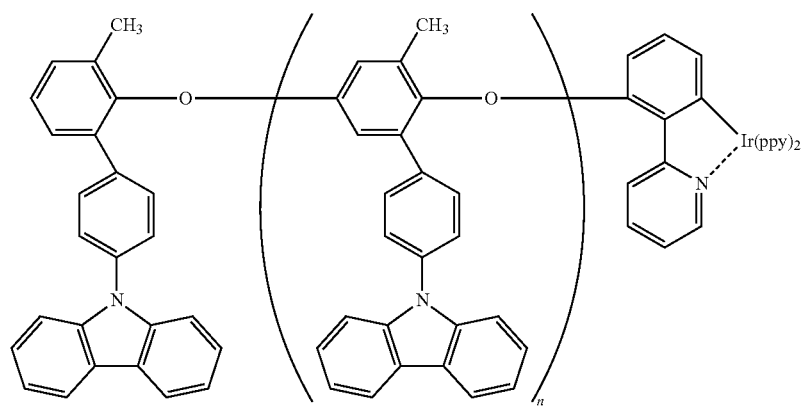
Poly-40
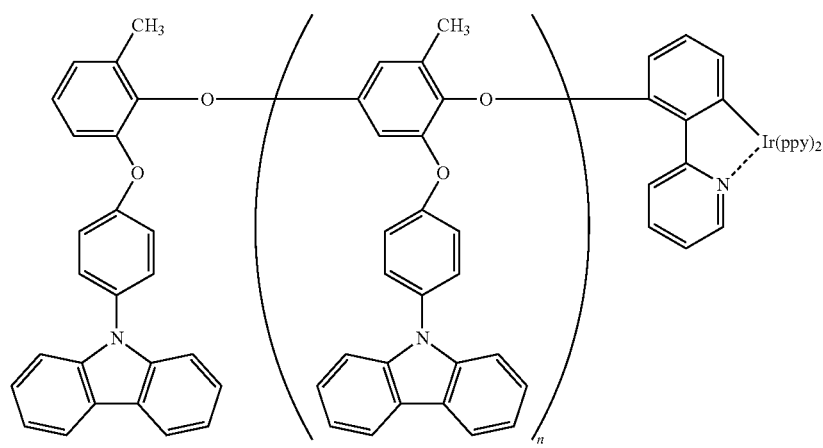

-continued
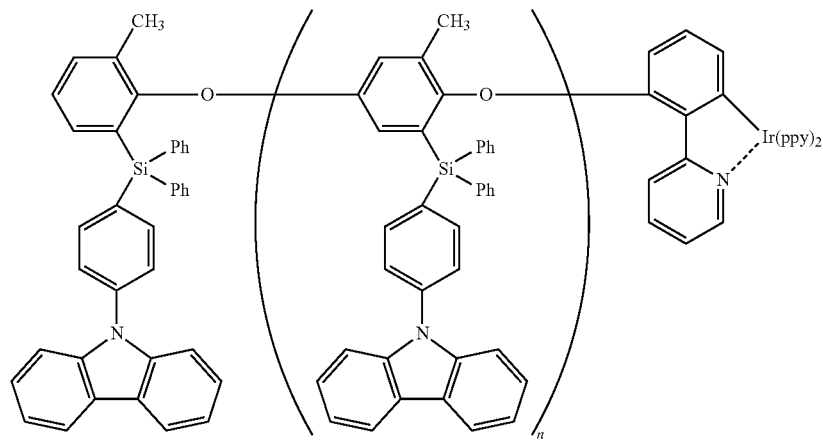
Poly-41
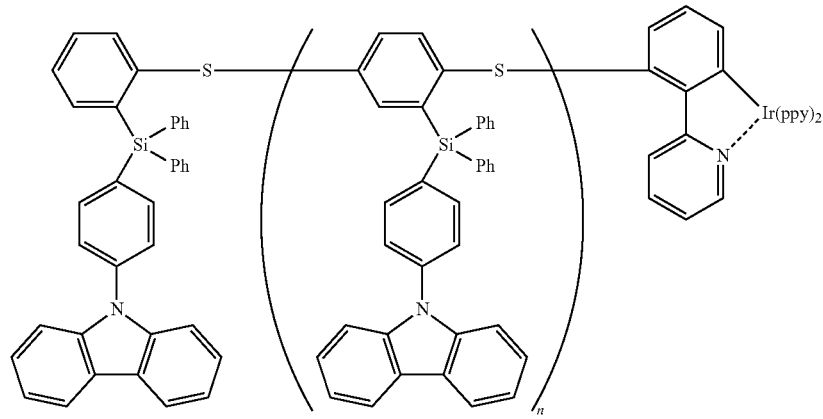
Poly-42
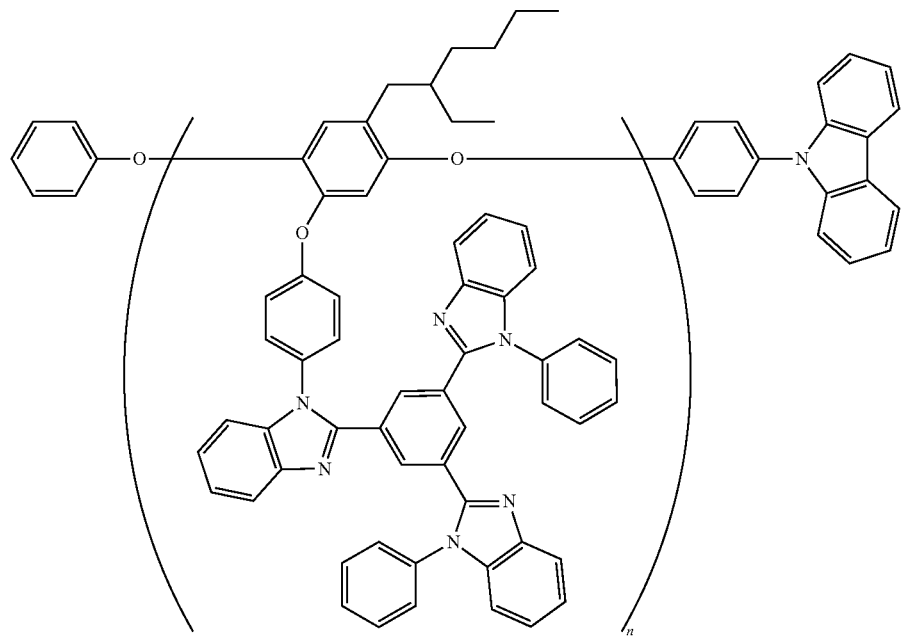
Poly-43

Poly-44
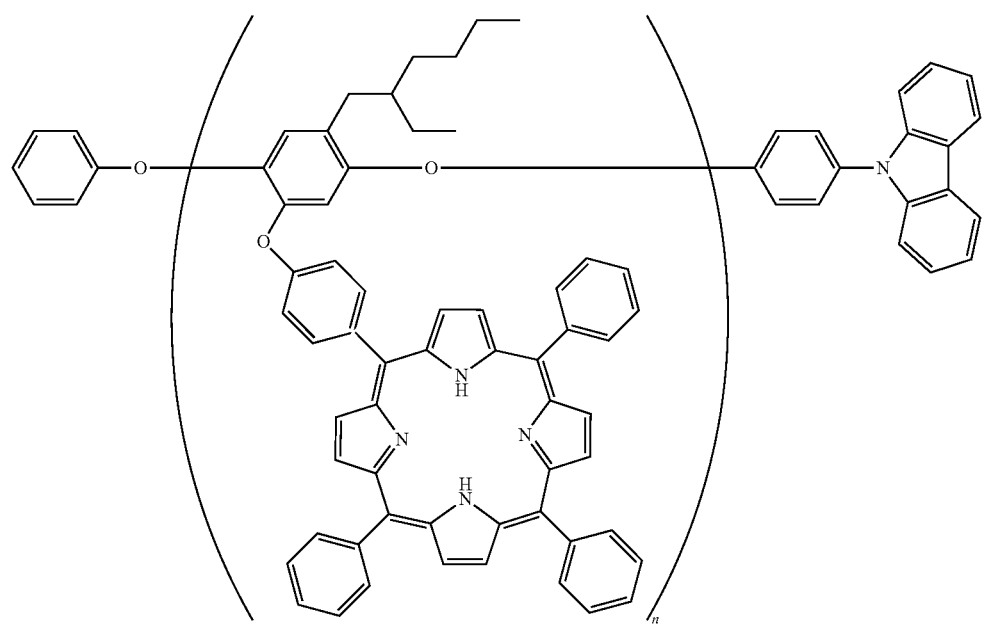
Poly-45
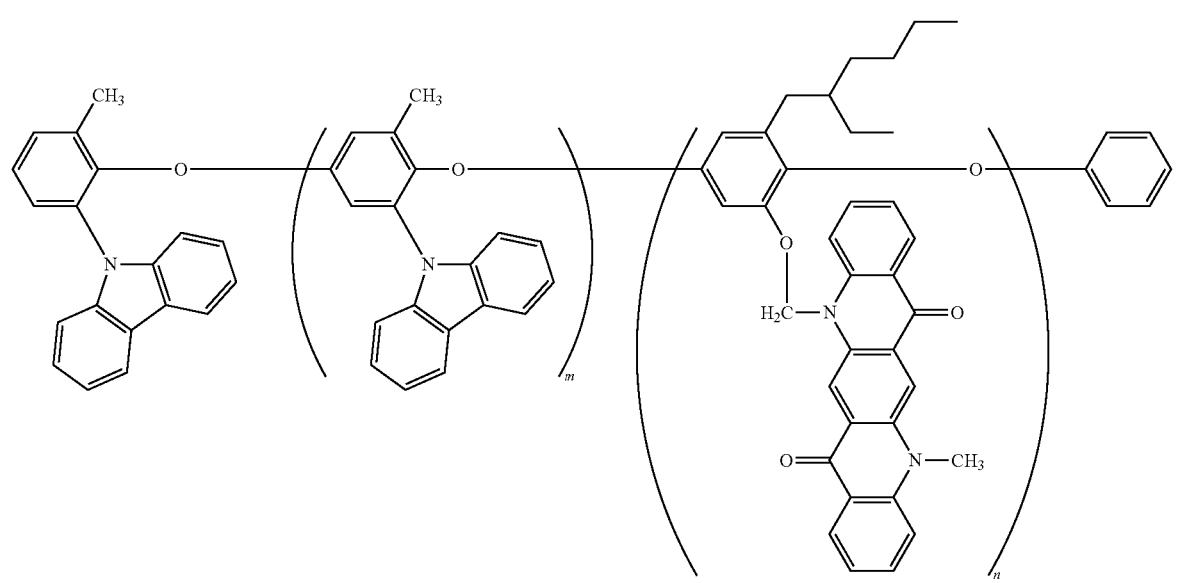

Poly-46
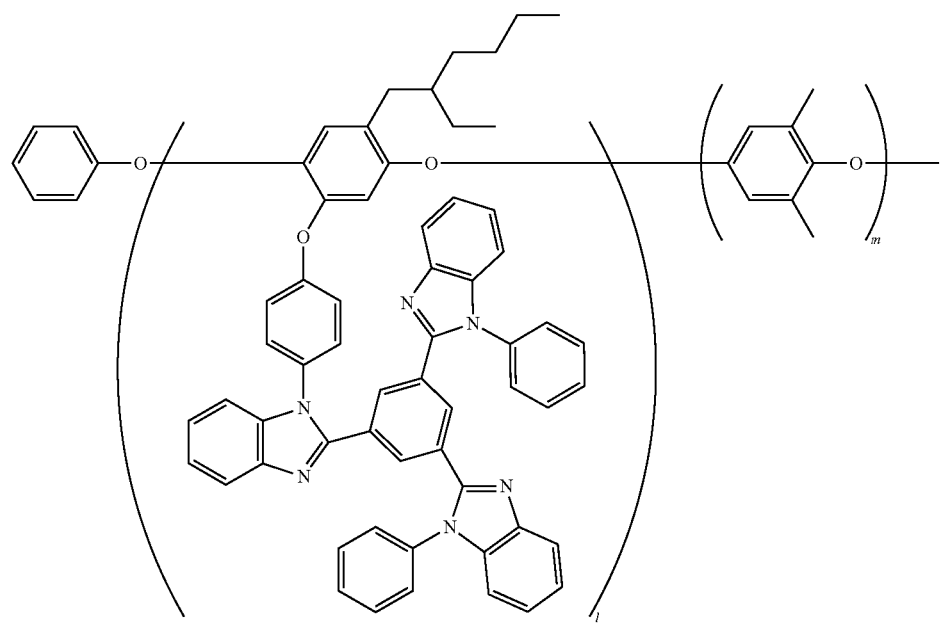
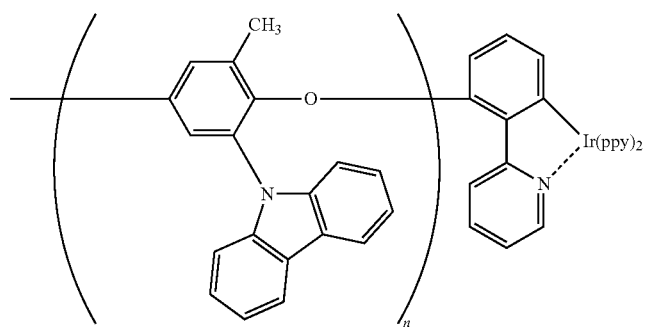
Poly-47
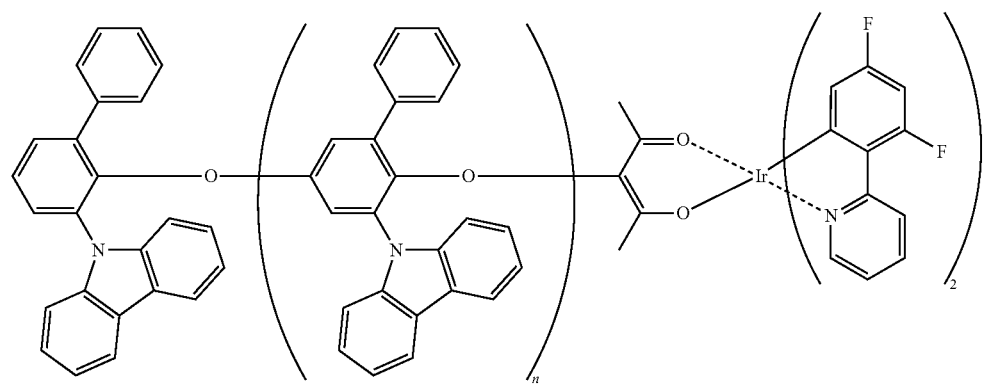

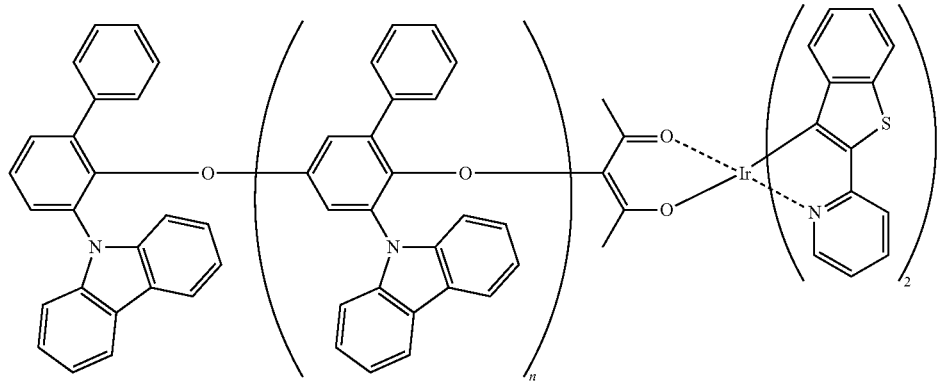

Poly-48

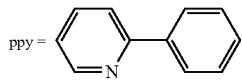

A polymer containing at least one of the repeating units represented by Formula (2) may be contained in any of the organic layers existing between the cathode and the anode, however, when X is a hole transport group, the polymer is preferably contained in the hole transport layer, the electron blocking layer or the light emitting layer, which will be described later, to acquire the effect of the present invention.

Alternatively, when X is an electron transport group, the polymer is preferably contained in the electron transport layer, the hole blocking layer or the light emitting layer, which will be described later, to acquire the effect of the present invention.

Moreover, when X is a fluorescent group or a phosphorescent group, the polymer is preferably contained in the light emitting layer to acquire the effect of the present invention.

Examples of a specifically preferable copolymer represented by Formula (22) are shown below, however, the present invention is not limited thereto:

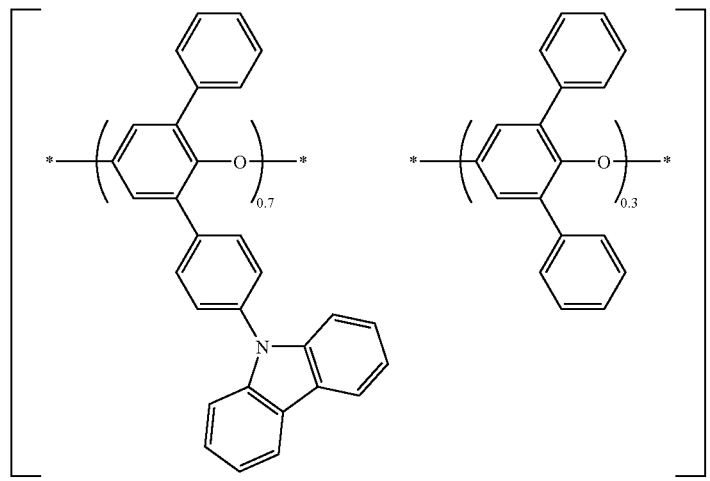

PO-18

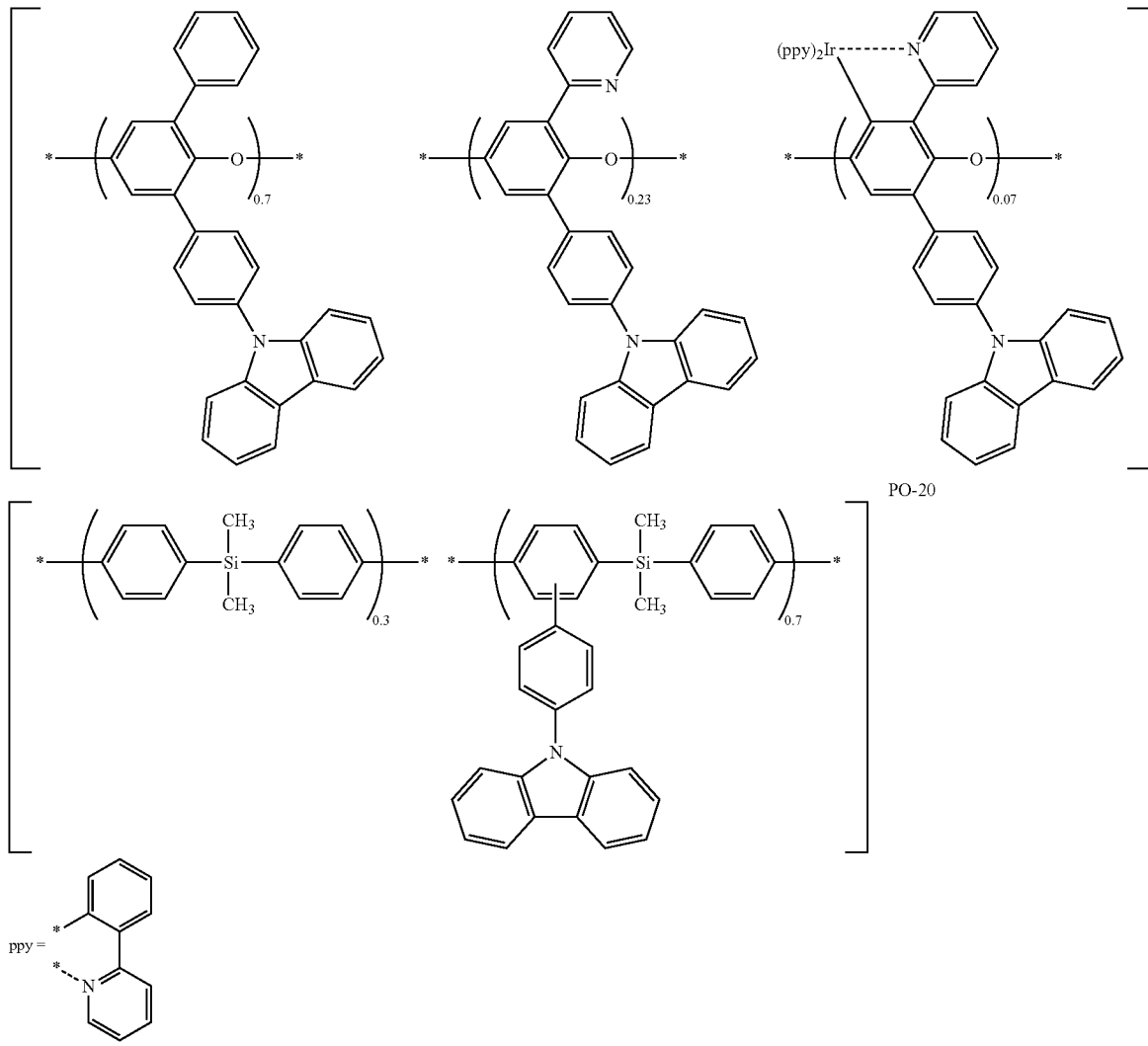

In Chemical Formule PO-18 to PO-20, each value beside the parentheses represents a molar ratio.

In the specification of the present invention, examples of a substituent include: alkyl groups (for example, a methyl group and an ethyl group, a propyl group, an isopropyl group, a tert-butyl group, a pentyl group, a hexyl group, an octyl group, a dodecyl group, a tridecyl group, a tetradecyl group and a pentadecyl group); cycloalkyl groups (for example, a cyclopentyl group and a cyclohexyl group); alkenyl groups (for example, a vinyl group and an allyl group); alkynyl groups (for example, an ethynyl group and a propargyl group); aryl groups including those having a heteroatom (for example, a phenyl group, a naphthyl group, a pyridyl group, a thienyl group, a furyl group and a imidazolyl group); heterocycle groups (for example, a pyrrolidyl group, an imidazolisyl group, a morpholyl group and an oxazolisyl group); alkoxy groups (for example, a methoxy group, an ethoxy group, a propyloxy group, a pentyloxy group, a hexyloxy group, an octyloxy group and a dodecyl oxygroup); cycloalkoxy groups (for example, a cyclopentyloxy group and a cyclohexyloxy group); aryloxy groups including those having a heteroatom (for example, a phenoxy group, a naphthyloxy group, a pyridyloxy group and a thienyloxy group, etc.); alkylthio groups (for example, a methylthio group and an ethylthio group, a propylthio group, a pentylthio group, a hexylthio group, an octylthio group and a dodecylthio group); cycloalkylthio groups (for example, a cyclopentylthio group and a cyclohexylthio group); arylthio groups including those having a heteroatom (for example, a phenylthio group, a naphthylthio group, a pyridylthio group and a thienylthio group); alkoxycarbonyl groups (for example, a methyloxycarbonyl group, an ethyloxycarbonyl group, a butyloxycarbonyl group, an octyloxycarbonyl group and a dodecyloxycarbonyl group); aryloxycarbonyl groups including those having a heteroatom (for example, a phenyloxycarbonyl group, a naphthyloxycarbonyl group, a pyridyloxycarbonyl group and a thienyloxycarbonyl group); amino groups (for example, an amino group, an ethylamino group, a dimethylamino group, a butylamino group, a cyclopentylamino group, a 2-ethylhexylamino group, a dodecylamino group, an anilino group, a naphthylamino group and a 2-pyridylamino group); a fluorine atom; a chlorine atom; fluorohydrocarbon groups (for example, a fluoromethyl group, a trifluoromethyl group, a pentafluoroethyl group and a pentafluorophenyl group); and a cyano group. A plurality of these substituents may further be combined to form a ring or these substituents may be further substituted with the above substituents.

The molecular weight of the polymer of the present invention is preferably 1000-100,000, and more preferably 2000-50,000. By controlling the molecular weight in the above range, solubility of the polymer into the solvent is attained and the viscosity of the solution is controlled to be suitable for forming an organic layer, while an organic layer is formed by a coating method, whereby formation of the organic layer becomes easier.

With respect to the polymer of the present invention, it is easy to obtain the monomer to prepare the polymer for a person skilled in the art using a known method, as well as, the polymerizing method to prepare the polymer of the present invention is common to a person skilled in the art by using a known method.

Synthetic methods of some of the typical examples of the polymers of the present invention will be shown below, however, the present invention is not limited thereto.

(1) Synthesis of PO-8

4-N-carbazolyl-2'-hydroxy-m-ter-phenyl: 410 mg (1.0 mmol) was dissolved in 10 ml of toluene, and vigorously agitated for 1 minute. Into the resulting solution, 800 mg (3.4 mmol) of silver oxide was added, and reacted for 12 hours at ambient temperature. The mixture was filtered to remove deposited silver and silver oxide, followed by reprecipitating in methanol to obtain intended compound of PO-8 with a yield of 81% (330 mg). The number average molecular weight determined by GPC was 38000 (polystyrene conversion).

(2) Synthesis of PO-19

4-N-carbazolyl-2'-hydroxy-m-ter-phenyl: 290 mg (0.7 mmol) and 2-(2-pyridyl)-6-(4'-carbazolyl)phenylphenol: 124 mg (0.3 mmol) were dissolved in 10 ml of toluene, and vigorously agitated for 1 minute. Into the resulting solution, 800 mg (3.4 mmol) of silver oxide was added, and reacted for 12 hours at ambient temperature. The mixture was filtered to remove deposited silver and silver oxide, followed by recrystallizing in methanol to obtain intended polymer precursor with a yield of 85% (350 mg). Bis(μ-chloro)tetrakis(2-phenylpyridine)diiridium(III) {[Ir(ppy)2Cl]2}: 21 mg (0.02 mmol) was dissolved in 4 ml of methylene chloride, and 88 mg (0.04 mmol) of silver trifluoroacetate dissolved in 2 ml of methanol was added, followed by agitating at ambient temperature for 10 minutes. Subsequently, into the resulting solution, the methylene chloride solution (2 ml) of 230 mg of the above-mentioned polymer precursors was added, and the mixture was agitated for 30 minutes. After the reaction was completed, insoluble matter was removed by filtering, followed by reprecipitating in methanol to obtain intended compound of PO-19 with a yield of 87% (200 mg). The number average molecular weight determined by GPC was 32000 (polystyrene conversion).

(3) Synthesis of Poly-13 (High-Molecular Weight) Precursor

N-(3-bromo-6-hydroxy)phenylcarbazole: 1.01 g (3.0 mmol) was dissolved in 5 ml of hexafluoroisopropanol (HFIP), and 5 ml of 6M aqueous sodium hydroxide solution agitated vigorously was added, which was further agitated vigorously for 1 minute. Into the resulting solution, tetrabutylammonium hydrosulfite: 0.047 g (0.14 mmol) was added, and reacted for 5 hours at ambient temperature. After a prescribed period was over, concentrated hydrochloric acid was added to neutralize the solution, and the organic phase was separated. The organic phase was well washed with distilled water, and the organic phase was separated again, followed by drying with anhydrous sodium sulfate. After drying was over, the solvent was removed under a reduced pressure, and the product was reprecipitated in methanol to obtain the intended polymer precursor with a yield of 81% (0.63 g). The number average molecular weight determined by GPC was 28000 (polystyrene conversion).

(4) Synthesis of Poly-13 (Low Molecular Weight) Precursor

N-(3-bromo-6-hydroxy)phenylcarbazole: 1.01 g (3.0 mmol) was dissolved in 5 ml of toluene and 5 ml of 6M aqueous sodium hydroxide solution agitated vigorously was added, which was further agitated vigorously for 1 minute. Into the resulting solution, tetrabutylammonium hydrosulfite: 0.047 g (0.14 mmol) was added, and reacted for 0.5 hour at ambient temperature. After a prescribed period was over, precipitate was separated by filtering, and well washed by acetone. The resulting precipitate was dissolved in HFIP, washed by 1N hydrochloric acid and water, and dried with anhydrous sodium sulfate. After drying was over, the solvent was removed under a reduced pressure, and the product was reprecipitated in methanol to obtain the intended polymer precursor with a yield of 20% (0.16 g). The number average molecular weight determined by GPC was 2500 (polystyrene conversion).

(5) Synthesis of Poly-14 and 27 Precursors

N-(2,5-dibromo)phenylcarbazole: 1.20 g (3.0 mmol) was dissolved in 50 ml of anhydrous tetrahydrofuran, and the air inside of the reactor was fully replaced with nitrogen. After the temperature was decreased to −20° C., 2.0 ml (2.9 mmol) of hexane solution of n-butyllithium was added slowly. After agitating for 10 more minutes, 96 mg (3.0 mmol) of sulfur powder was added, and agitated for 1 hour. After the reaction was over, the product was quenched by adding 10 ml of water, and the precipitate was separated by filtering. The resulting precipitate was well washed by acetone, and dissolved in HFIP. The solution was washed by 1N hydrochloric acid and water, and dried with anhydrous sodium sulfate. After drying was over, the solvent was removed under a reduced pressure, and the product was reprecipitated in methanol to obtain the intended polymer precursor with a yield of 20% (0.16 g). The number average molecular weight determined by GPC was 1600 (polystyrene conversion).

(6) Synthesis of Poly-12, 16, 26, and 35 Precursors

N-(2-hydroxy-3-methyl)phenylcarbazole: 1.64 g (6.0 mmol) was dissolved in 10 ml of toluene, and vigorously agitated for 1 minute. Into the resulting solution, 8.34 g (36.0 mmol) of silver oxide was added, and reacted for 12 hours at ambient temperature. The mixture was filtered to remove deposited silver and silver oxide, followed by reprecipitating in methanol to obtain intended polymer precursor with a yield of 91% (1.49 mg). The number average molecular weight determined by GPC was 22000 (polystyrene conversion).

(7) A Synthesis of Poly-18 Precursor

N-(3-bromo-6-hydroxy)phenylcarbazole: 1.01 g (3.0 mmol) and 2-bromo-5-hydroxyphenylpyridine: 75.0 mg (0.3 mmol) were dissolved in 5 ml of toluene, and 5 ml of 6M aqueous sodium hydroxide solution agitated vigorously was added, which was further agitated vigorously for 1 minute. Into the resulting solution, tetrabutylammonium hydrosulfite: 0.047 g (0.14 mmol) was added, and reacted for 5 hours at ambient temperature. After a prescribed period was over, concentrated hydrochloric acid was added to neutralize the solution, and the organic phase was separated. The organic phase was well washed with distilled water, and the organic phase was separated again, followed by drying with anhydrous sodium sulfate. After drying was over, the solvent was removed under a reduced pressure, and the product was reprecipitated in methanol to obtain the polymer with a yield of 83% (0.68 g). The number average molecular weight determined by GPC was 21000 (polystyrene conversion). Subsequently, 0.5 g of the above described copolymer which was heat dried at 80° C. for 8 hours under a reduced pressure, and 0.21 g (0.2 mmol) of Bis(µ-chloro)tetrakis(2-phenylpyridine) diiridium(III) {[Ir(ppy)2Cl]2} were dispersed in 50 ml of desiccation toluene, and 0.10 g (0.4 mmol)of silver (I) trifluoromethylsulfonate (AgCF3SO3) was added, under nitrogen gas flow, to initiate the reaction. After refluxing for 6 hours while heating, the resulting liquid was poured in 500 ml of methanol, and the precipitate was separated by filtering. The precipitate was washed with methylene chloride and then with acetone, and dried at 40° C. under a reduced pressure for 4 hours to obtain 0.5 g of intended polymer precursor.

Each of the polymer precursors obtained in above (3)-(7) is subjected to a treatment of terminal residues as shown below to obtain the polymer of the present invention. In the following (8)-(10), synthetic examples of Poly-12, 13 and 16 are shown.

(8) Treatment of Terminal Residues of the Precursor of Poly-13 (Alkylation)

The polymer precursor obtained in above (6): 0.5 g was dissolved in 50 ml of tetrahydrofuran (THF), followed by adding n-butyl lithium-hexane solution (1.6 M, 0.2 ml) at ambient temperature. After agitating for 10 minutes, methyl iodide (0.1 ml) was added, and further agitated for 30 minutes, followed by adding chilled water (20 ml) to stop the reaction. The organic phase was extracted using THF, and dried with anhydrous sodium sulfate. After drying was over, the solvent was removed under a reduced pressure, and the product was reprecipitated in methanol to obtain 0.45 g of Poly-12. The number average molecular weight determined by GPC was 22000 (polystyrene conversion), which did not exhibit a big difference from the molecular weight before the treatment of terminal residues. It was confirmed from an IR measurement and an elementary analysis that hydroxyl groups were lost from the compound. The treatments of terminal residues can be carried out in the same manner as above in the present invention.

(9) Treatment of Terminal Residues of the Precursor of Poly-13 (Arylation (Phenylation))

The polymer precursor obtained in above (6): 0.5 g was dissolved in 50 ml of HFIP, and 18 mg (0.1 mmol) of copper (II) acetate, 20 mg (0.2 mmol) of phenylboronic acid and 0.1 ml of pyridine were added under a nitrogen gas flow, followed by agitating for 24 hours at ambient temperature. The product was reprecipitated in methanol, separated by filtering, washed sequentially with acetone, water and then acetone, and dried under a reduced pressure to obtain 0.49 g of Poly-13. The number average molecular weight determined by GPC was 28000 (polystyrene conversion), which did not exhibit a big difference from the molecular weight before the treatment of terminal residues. It was confirmed from an IR measurement and an elementary analysis that hydroxyl groups and Br groups were lost from the compound. The treatments of terminal residues can be carried out in the same manner as above in the present invention.

(10) Treatment of Terminal Residues of the Precursor of Poly-16 (Capping with Phosphorescent Groups)

The polymer precursor obtained in above (6): 0.5 g and 3-bromophenylpyridine-bisphenylpyridine-iridium (III): 29 mg (0.04 mmol) were dissolved in 50 ml of pyridine, added with 20 mg of copper powder, and refluxed while heating for 12 hours. After the reaction, the product was filtered and the filtrate was poured in 500 ml of water. The polymer precipitate was separated by filtering, sequentially washed with chloroform and then with acetone, and dried at 60° C. for 4 hours under a reduced pressure to obtain 1.0 g of Poly-16. Capping with phosphorescent groups of the polymer terminals can be carried out in the same manner as above, in the present invention.

<<Constituting Layer of Organic EL Element>>

Constituting layer of the organic EL element of the present invention will now be described.

Preferred examples of the constituting layers of the organic EL element of the present invention will be shown below, however, the present invention is not limited thereto.

(1): Anode/Light emitting layer/Cathode
(2): Anode/Light emitting layer/Cathode buffer layer/Cathode
(3): Anode/Anode buffer layer/Light emitting layer/Cathode buffer layer/Cathode
(4): Anode/Hole transport layer/Light emitting layer/Cathode
(5): Anode/Hole transport layer/Light emitting layer/Electron transport layer/Cathode
(6): Anode/Hole transport layer/Light emitting layer/Hole blocking layer/Electron transport layer/Cathode
(7): Anode/Hole transport layer/Electron blocking layer/Light emitting layer/Electron transport layer/Cathode
(8): Anode/Hole transport layer/Electron blocking layer/Light emitting layer/Hole blocking layer/Electron transport layer/Cathode
(9): Anode/Anode buffer layer/Hole transport layer/Electron blocking layer/Light emitting layer/Hole blocking layer/Electron transport layer/Cathode buffer layer/Cathode <<Anode>>

For the anode of the organic EL element, a metal, an alloy, or an electroconductive compound each having a high working function (not less than 4 eV), and mixture thereof are preferably used as the electrode material. Specific examples of such an electrode material include a metal such as Au, CuI and a transparent electroconductive material such as indium tin oxide (ITO), $SnO_2$, or ZnO. A material capable of forming an amorphous and transparent conductive layer such as IDIXO ($In_2O_3$—ZnO) may also be used. The anode may be prepared by forming a thin layer of the electrode material according to a depositing or spattering method, and by forming the layer into a desired pattern according to a photolithographic method. When required precision of the pattern is not so high (not less than 100 µm), the pattern may be formed by depositing or spattering of the electrode material through a mask having a desired form. When light is emitted through the anode, the transmittance of the anode is preferably 10% or more, and the sheet resistance of the anode is preferably not more than several hundred Ω/□. The thickness of the layer is ordinarily within the range of from 10 nm to 1 µm, and preferably from 10 to 200 nm, although it may vary due to kinds of materials used.

<<Cathode>>

On the other hand, for the cathode, a metal (also referred to as an electron injecting metal), an alloy, and an electroconductive compound each having a low working function (not more than 4 eV), and a mixture thereof are used as the electrode material. Specific examples of such an electrode material include sodium, sodium-potassium alloy, magnesium, lithium, a magnesium/copper mixture, a magnesium/silver mixture, a magnesium/aluminum mixture, magnesium/indium mixture, an aluminum/aluminum oxide ($Al_2O_3$) mixture, indium, a lithium/aluminum mixture, and a rare-earth metal. Among them, a mixture of an electron injecting metal and a metal higher in the working function than that of the electron injecting metal, such as the magnesium/silver mixture, magnesium/aluminum mixture, magnesium/indium mixture, aluminum/aluminum oxide ($Al_2O_3$) mixture, lithium/aluminum mixture, or aluminum is suitable from the view point of the electron injecting ability and resistance to oxidation. The cathode can be prepared forming a thin layer of such an electrode material by a method such as a deposition or spattering method. The sheet resistance as the cathode is preferably not more than several hundred Ω/□, and the thickness of the layer is ordinarily from 10 to 1000 nm, and preferably from 50 to 200 nm. It is preferable in increasing the light emission efficiency that either the anode or the cathode of the organic EL element is transparent or semi-transparent. These layers may be provided between the anode and the light emitting layer or the hole transport layer, or between the cathode and the light emitting layer or the hole transport layer, as described above.

<<Buffer Layer: Cathode Buffer Layer, Anode Buffer Layer>>

As a buffer layer, included are a cathode buffer layer and an anode buffer layer, each of which is provided if necessary.

The buffer layer is a layer provided between the electrode and an organic layer in order to reduce the driving voltage or to improve luminance. As the buffer layer there are a hole injecting layer (an anode buffer layer) and an electron injecting layer (a cathode buffer layer), which are described in "Electrode Material" pages 123-166, Div. 2 Chapter 2 of "Organic EL element and its frontier of industrialization" (published by NTS Corporation, Nov. 30, 1998) in detail.

The anode buffer layer is described in, for example, JP-A Nos. 9-45479, 9-260062, and 8-288069, and its examples include a phthalocyanine buffer layer represented by a copper phthalocyanine layer, an oxide buffer layer represented by a vanadium oxide layer, an amorphous carbon buffer layer, a polymer buffer layer employing and an electroconductive polymer such as polyaniline (emeraldine) and polythiophene. Of these, preferable is a buffer layer employing polydioxythiophene, whereby an organic EL element exhibiting higher luminance, higher luminous efficiency, and longer emission life is obtained.

The cathode buffer layer is described in, for example, JP-A Nos. 6-325871, 9-17574, and 10-74586, in detail, and its examples include a metal buffer layer represented by a strontium layer or an aluminum layer, an alkali metal compound buffer layer represented by a lithium fluoride layer, an alkali earth metal compound buffer layer represented by a magnesium fluoride layer, and an oxide buffer layer represented by an aluminum oxide layer.

The above buffer layer is preferably very thin and has a thickness of preferably from 0.1 to 100 nm depending on kinds of the material used.

The blocking layer is a layer provided if necessary in addition to the fundamental component layers as described above, and is for example a hole blocking layer as described in JP-A Nos. 11-204258, and 11-204359, and on page 237 of "Organic EL element and its frontier of industrialization" (published by NTS Corporation, Nov. 30, 1998).

The cathode buffer layer and the anode buffer layer can be formed by preparing a thin layer using a known method, for example, a vacuum deposition method, a spin coating method, a casting method, an ink-jet method and a LB method.

<<Blocking Layer: Hole Blocking Layer, Electron Blocking Layer>>

The hole blocking layer is an electron transport layer in a broad sense, and is a material having an ability of transporting electrons, however, an extremely poor ability of transporting holes, which can increase a recombination probability of electrons and holes by transporting electrons while blocking holes.

A hole blocking layer is formed with a compound which has a role to block the positive holes migrated from the hole transport layer from reaching to the cathode and has a role to efficiently convey the electrons injected from the cathode to the light emitting layer. The properties desired for a material forming a hole blocking layer are: high mobility of electrons and low mobility of positive holes, as well as a larger ionization potential or a larger band gap than that of the compound contained in the light emitting layer, in order to efficiently trap positive holes in the light emitting layer. It is advantageous for attaining the effect of the present invention that at least one of the following compounds is employed as a hole blocking material, namely, a styryl compound, a triazole derivative, a phenanthroline derivative, an oxydiazole derivative and a boron derivative.

As other examples, the exemplified compounds disclosed in JP-A Nos. 2003-31367, 2003-31368, and Japanese Patent No. 2721441 are cited.

On the other hand, the electron blocking layer is an hole transport layer in a broad sense, and contains a material having an ability of transporting holes, however, an extremely poor ability of transporting electrons, which can increase a recombination probability of electrons and holes by transporting holes while blocking electrons.

The hole blocking layer and the electron blocking layer can be formed by preparing a thin layer using a known method, for example, a vacuum deposition method, a spin coating method, a casting method, an ink-jet method and a LB method.

<<Light Emitting Layer>>

The light emitting layer of the present invention is a layer where electrons and holes, injected from electrodes, an electron transport layer or a hole transport layer, are recombined to emit light. The portions where light emits may be in the light emitting layer or at the interface between the light emitting layer and the layer adjacent thereto.

Examples of a light emitting material used in the light emitting layer include fluorescent compound or phosphorescent compounds known in the art.

In the present invention, preferably usable is a polymer having at least one repeat unit represented by above mentioned Formula (2), wherein X represents a fluorescent group, whereby higher luminance, higher luminous efficiency, longer emission life and more reduced driving power consumption are attained.

In the present invention, a phosphorescent compound is preferably employed as a light emitting material, in order to attain the effect of the present invention. The phosphorescent compound is a compound which emits light from the excited triplet, which can emit phosphorescence at room temperature (25° C.), and exhibits a phosphorescent quantum yield at 25° C. of not less than 0.01. The phosphorescent quantum yield at 25° C. is preferably not less than 0.1.

The phosphorescent quantum yield can be measured according to a method described in the fourth edition "Jikken Kagaku Koza 7", Bunko II, page 398 (1992) published by Maruzen. The phosphorescent quantum yield can be measured in a solution employing various kinds of solvents. The phosphorescent compound used in the present invention is a compound, in which the phosphorescent quantum yield measured employing any one of the solvents falls within the above-described range.

The light emission of the phosphorescent compound is classified in two types in principle, one is an energy transfer type in which recombination of a carrier occurs on the host to which the carrier is transported to excite the host, the resulting energy is transferred to the phosphorescent compound, and light is emitted from the phosphorescent compound, and the other is a carrier trap type in which recombination of a carrier occurs on the phosphorescent compound which is a carrier trap material, and light is emitted from the phosphorescent compound. However, in each type, energy level of the phosphorescent compound in excited state is lower than that of the host in excited state.

The phosphorescent compound is suitably selected from those used in the light emitting layer of an organic EL element known in the prior art.

In the present invention, preferably usable is a polymer having at least one repeat unit represented by above mentioned Formula (2), wherein X represents a phosphorescent group, whereby higher luminance, higher luminous efficiency, longer emission life and more reduced driving power consumption are attained.

As other examples of a phosphorescent compound used in the present invention is preferably a metal complex containing a metal of Group 8 of the periodic table, and is more preferably an iridium compound, an osmium compound, a platinum compound (a platinum complex) or a rhodium compound a palladium compound and a rare earth compound, and most preferably an iridium compound.

Examples of the phosphorescent compound used in the present invention will be listed below, however, the present invention is not limited thereto. These compounds can be synthesized according to a method described in Inorg. Chem., 40, 1704-1711.

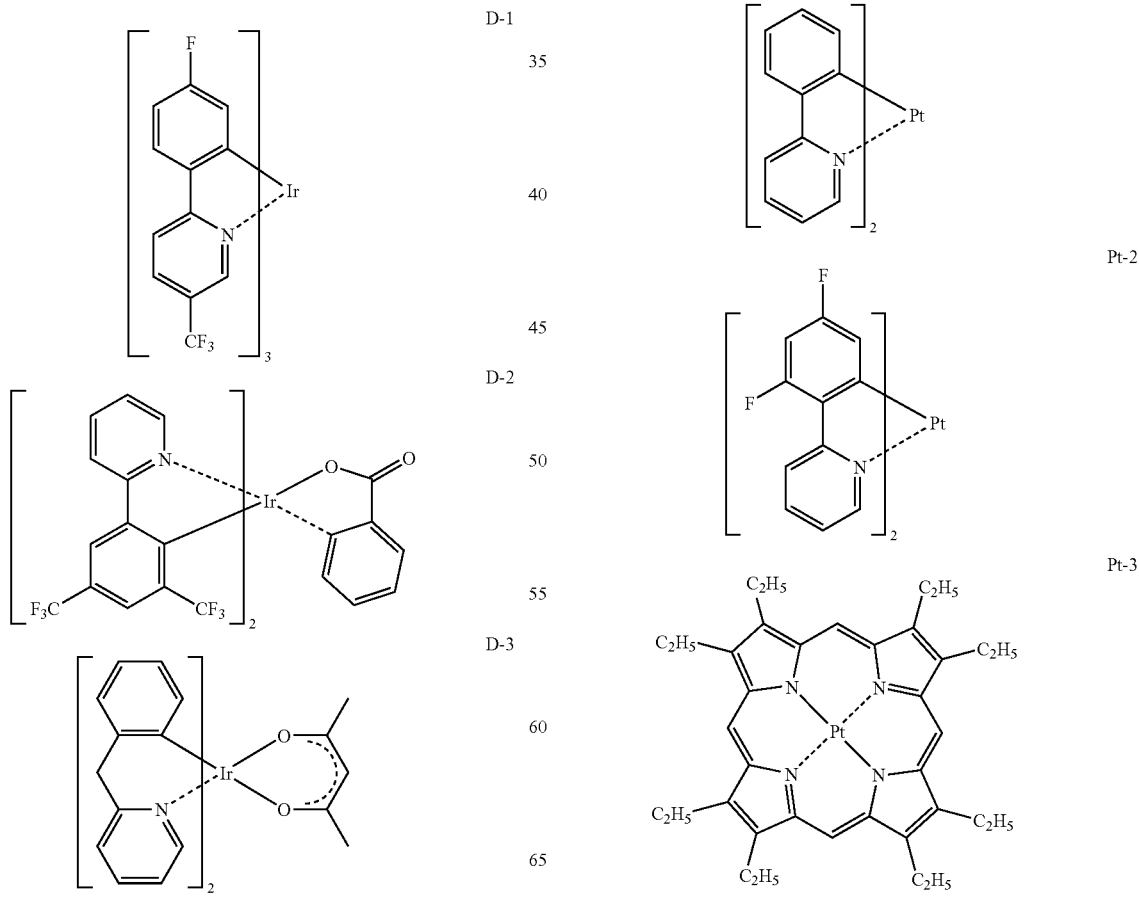

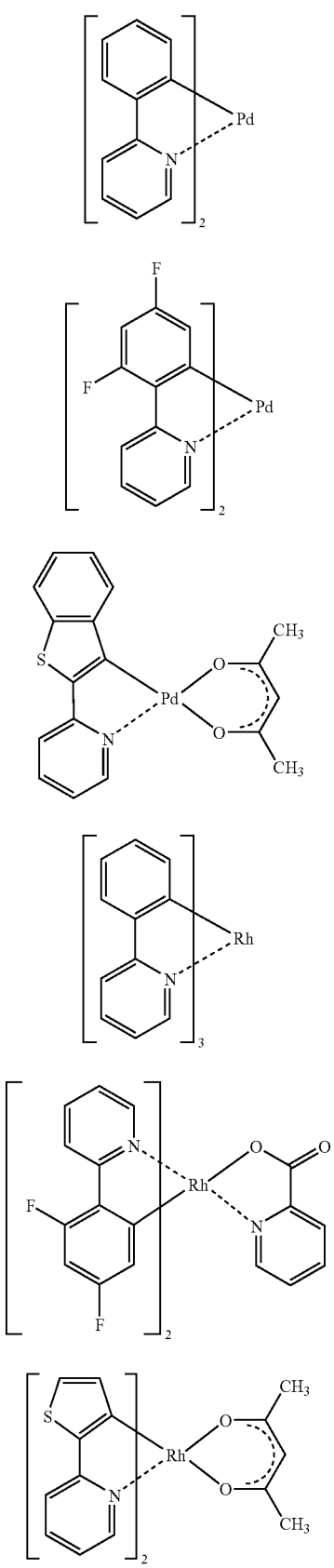
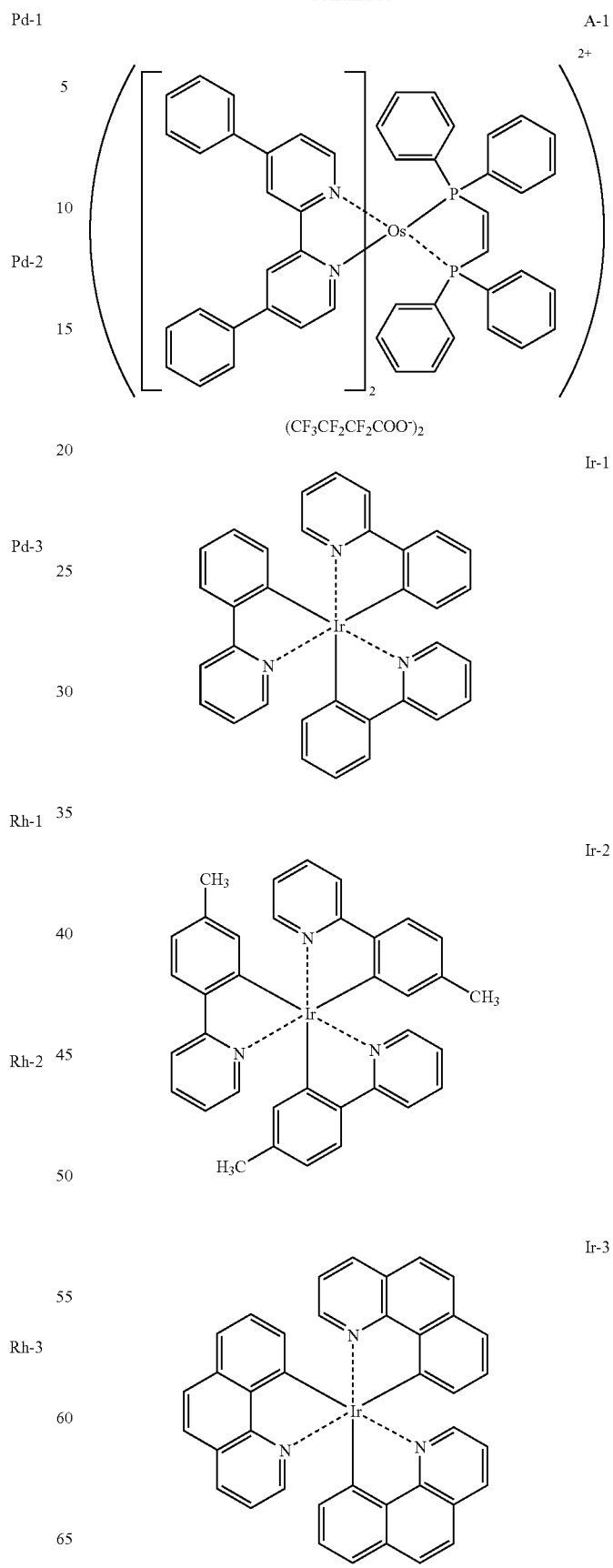

-continued

Ir-4
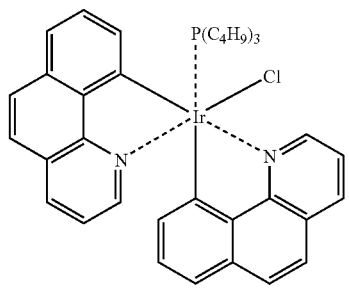

Ir-5
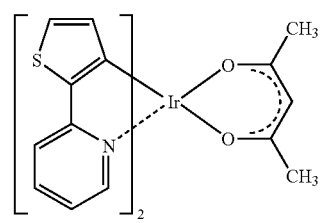

Ir-6
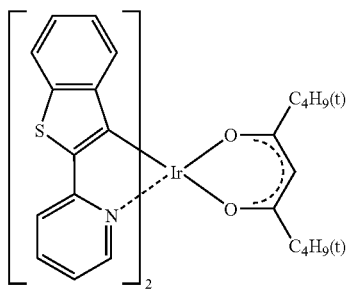

Ir-7
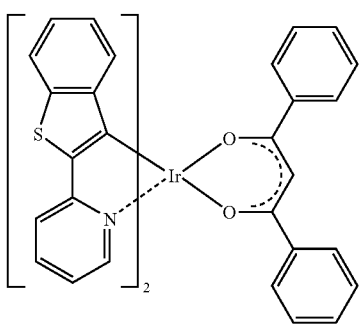

Ir-8
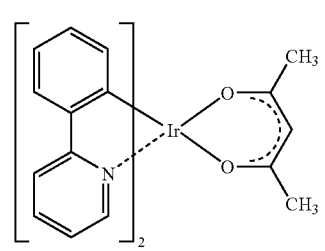

Ir-9
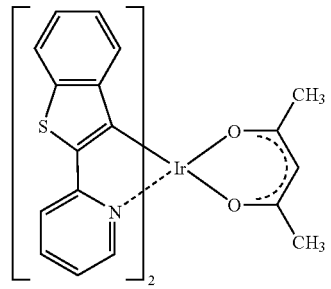

Ir-10
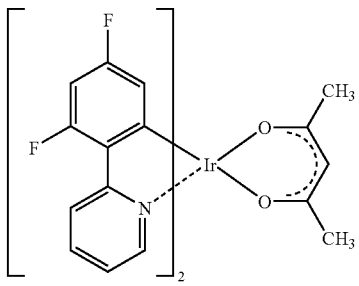

Ir-11
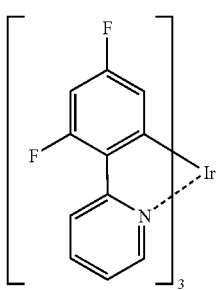

Ir-12
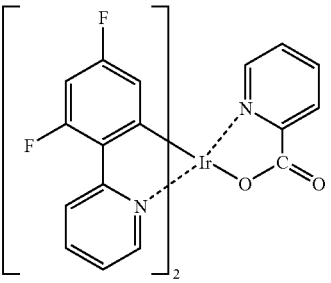

Ir-13
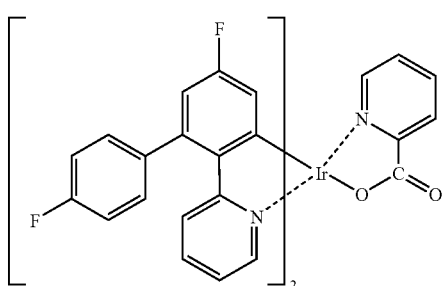

The light emitting layer may also contain a host compound. In the present invention, the host compound represents a compound among the compounds contained in the light emitting layer, which exhibits a phosphorescent quantum yield of less than 0.01.

In the present invention, a polymer having at least one of the repeat units represented by Formula (1) is preferably incorporated as a host compound, whereby higher luminance, higher luminous efficiency, longer emission life and more reduced driving power consumption are attained.

Also, in the present invention, a polymer having at least one of the repeat units represented by Formula (2), wherein X represents a hole transport group, is preferably incorporated as a host compound, whereby higher luminance, higher luminous efficiency, longer emission life and more reduced driving power consumption are attained.

Further, a plurality of host compounds known in the art may be employed, whereby mobility of electrons can be adjusted, resulting in obtaining an organic EL elements exhibiting high efficiency.

As the host compounds known in the art, preferable is a compound having a hole transport ability, an electron transport ability and a high Tg (a glass-transition temperature) value, while preventing elongation of light emission wavelength.

Specific examples of the known host compounds include the compounds disclosed in the following documents:

JP-A No. 2001-257076, No. 2002-308855, No. 2001-313179, No. 2002-319491, No. 2001-357977, No. 2002-334786, No. 2002-8860, No. 2002-334787, No. 2002-15871, No. 2002-334788, No. 2002-43056, No. 2002-334789, No. 2002-75645, No. 2002-338579, No. 2002-105445, No. 2002-343568, No. 2002-141173, No. 2002-352957, No. 2002-203683, No. 2002-363227, No. 2002-231453, No. 2003-3165, No. 2002-234888, No. 2003-27048, No. 2002-255934, No. 2002-260861, No. 2002-280183, No. 2002-299060, No. 2002-302516, No. 2002-305083, No. 2002-305084, No. 2002-308837.

The light emitting layer may contain a host compound having a fluorescence maximum wavelength as a host compound. In this case, by a energy transfer from other host compound or a phosphorescent compound to a fluorescent compound, light emission from a host compound having a fluorescence maximum wavelength is obtained as the result of electroluminescence of an organic EL element. The host compound having a fluorescence maximum wavelength preferably has a high fluorescence quantum yield in the form of solution. Herein, the fluorescence quantum yield is preferably not less than 10%, and more preferably not less than 30%. Examples of the a host compound having a wavelength providing a fluorescence maximum wavelength include: a coumarin dye, a cyanine dye, a chloconium dye, a squalenium dye, an oxobenzanthracene dye, a fluorescene dye, a rhodamine dye, a pyrylium dye, a perylene dye, a stilbene dye, and a polythiophene dye. The fluorescence quantum yield can be measured according to a method described in the fourth edition, Jikken Kagaku Koza 7, Bunko II, p. 362 (1992) published by Maruzen.

Figure 4:
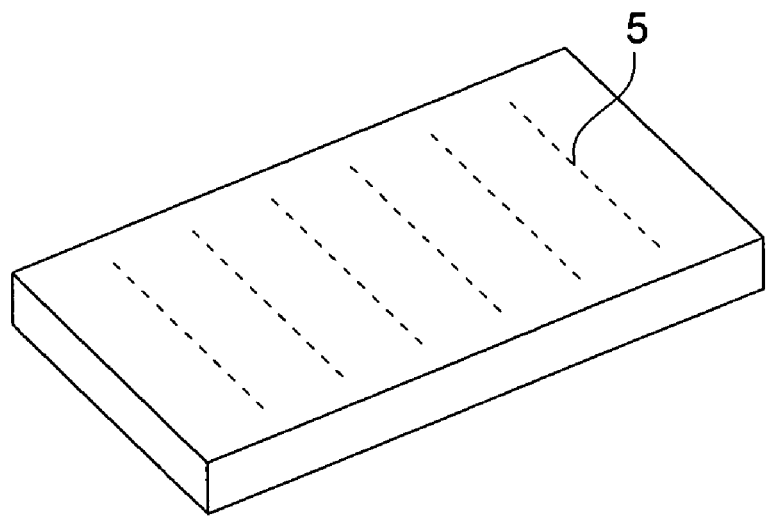
FIG. 4 is a schematic illustration of a passive matrix full color display.
Figure 4:
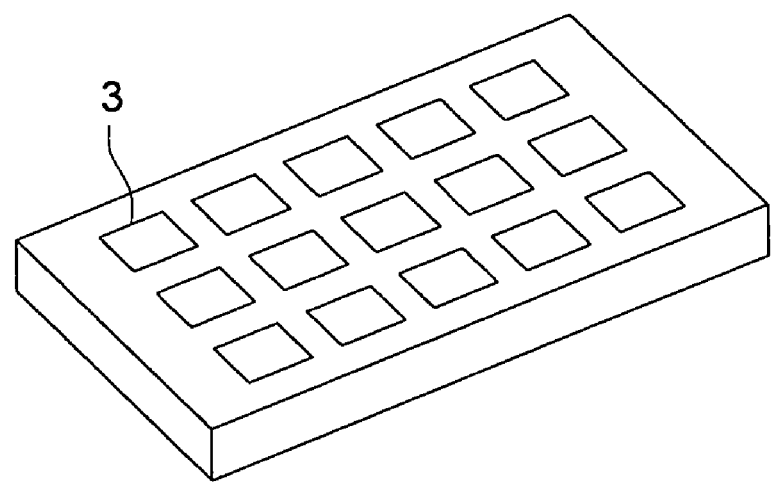
Figure 4:
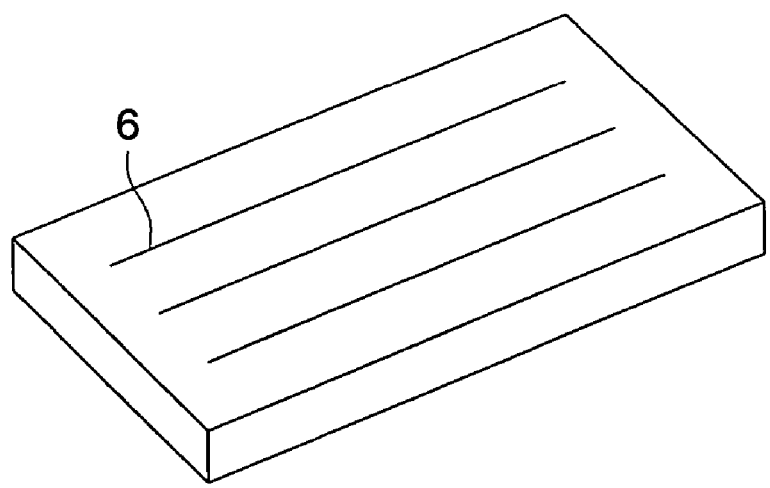

Color of light emitted from the organic EL element or the compound of the present invention is measured by a spectral light meter CS-1000, manufactured by Minolta Co., Ltd., and expressed according to CIE chromaticity diagram described in FIG. 4.16 on page 108 of "Shinpen Shikisai Kagaku Handbook" (Coloring Science Handbook, New Edition), edited by Nihon Shikisai Gakkai, published by Todai Shuppan Kai, 1985.

In the present invention, the wavelength of the phosphorescence maximum of the phosphorescent compound is not specifically limited. Theoretically, the phosphorescence wavelength can be varied by selecting a center metal, a ligand, or a substituent of the ligand. The phosphorescent compound preferably has a wavelength of the phosphorescence maximum in the wavelength region from 380 to 430 nm. Examples of an organic EL element emitting light of such an wavelength region include organic EL elements emitting blue light or white light.

By utilizing a plurality of phosphorescent compounds in a light emitting layer, mixing of different emission becomes possible, whereby any desired emitting color can be obtained. By adjusting the type and the doping amount of the phosphorescent compounds, emission of white color is possible, by which application of the organic EL element to an illuminator or to a backlight becomes possible.

The light emitting layer can be formed by using a film forming method known in the art, for example, a vacuum deposition method, a spin-coating method, a casting method, an LB method or an ink-jet method.

The light emitting layer is preferably formed by a coating method using the polymer of the present invention. Specifically, the polymer of the present invention is suitable for coating with a spin-coating method or an ink-jet coating method. These methods are preferable, because these makes the production process easier, specifically, makes the production process of a large screen organic EL device or a white light emitting organic EL element easier.

The thickness of the light emitting layer is not specifically limited, however, it is usually 5 nm to 5 μm, and preferably 5 nm to 200 nm.

<<Hole Transport Layer>>

The hole transport layer is constitute of a material having a function of transporting positive holes. In a broad sense, a hole injection layer and an electron blocking layer is included in the hole transport layer. The hole transport layer or an electron transport may be provided as a single layer or as a plurality of layers.

The hole transport material is not specifically limited, and employable are the materials arbitrarily selected from those including known materials in the art as: positive hole injecting-transporting materials among photo conductive materials and materials used as a hole injecting layer or a hole transport layer in EL elements In the present invention, as a hole transport material, preferable is a polymer containing at least one of the repeat units represented by Formula (2), wherein X represents a hole transport group, whereby higher luminance, higher luminous efficiency, longer emission life and more reduced driving power consumption are attained.

Other examples of a hole transport material include: a triazole derivative, an oxadiazole derivative, an imidazole derivative, a polyarylalkane derivative, a pyrazoline derivative and a pyrazolone derivative, a phenylenediamine derivative, an arylamine derivative, an amino substituted chalcone derivative, an oxazole derivative, a styryl anthracene derivative, a fluorenone derivative, a hydrazone derivative, a stilbene derivative, a silazane derivative, an aniline copolymer, and an oligomer of as electroconductive polymer, and specifically a thiophene oligomer.

As the hole transport material, those described above are used, however, a porphyrin compound, an aromatic tertiary amine compound or a styrylamine compound is preferably used, and, specifically, an aromatic tertiary amine compound is more preferably used.

Typical examples of the aromatic tertiary amine compound and styrylamine compound include: N,N,N',N'-tetraphenyl-4,4'-diaminophenyl; N,N'-diphenyl-N,N'-bis(3-methylphenyl)-[1,1'-biphenyl]-4,4'-diamine (TPD); 2,2-bis(4-di-p-tolylaminophenyl)propane; 1,1-bis(4-di-p-tolylaminophenyl)cyclohexane; N,N,N',N'-tetra-p-tolyl-4,4'-diaminobiphenyl; 1,1-bis(4-di-p-tolylaminophenyl)-4-phenylcyclohexane; bis(4-dimethylamino-2-methylphenyl)

phenylmethane; bis(4-di-p-tolylaminophenyl)phenylmethane; N,N'-diphenyl-N,N'-di(4-methoxyphenyl)-4,4'-diaminobiphenyl; N,N,N',N'-tetraphenyl-4,4'-diaminodiphenylether; 4,4'-bis(diphenylamino)quardriphenyl; N,N,N-tri(p-tolyl)amine; 4-(di-p-tolylamino)-4'-[4-(di-p-tolylamino) styryl]stilbene; 4-N,N-diphenylamino-(2-diphenylvinyl) benzene; 3-methoxy-4'-N,N-diphenylaminostylbene; N-phenylcarbazole; compounds described in U.S. Pat. No. 5,061,569 which have two condensed aromatic rings in the molecule thereof such as 4,4'-bis[N-(1-naphthyl)-N-phenylamino]biphenyl (NPD); and compounds described in JP-A No. 4-308688 such as 4,4',4"-tris[N-(3-methylphenyl)-N-phenylamino]-triphenylamine (MTDATA) in which three triphenylamine units are bonded in a starburst form.

A polymer in which the material mentioned above is introduced in the polymer chain or a polymer having the material as the polymer main chain can be also used.

As the hole injecting material or the hole transport material, inorganic compounds such as p-Si and p-SiC are also usable.

In the present invention, the hole transport material in the hole transport layer preferably has a phosphorescent maximum wavelength of 415 nm or less, namely the hole transport material is preferably a material which prevents elongation of the wavelength of emitting light and has a higher Tg, while having a hole transport ability.

The hole transport layer can be formed by preparing a thin layer of the hole transport material using a known method such as a vacuum deposition method, a spin coat method, a casting method, an ink jet-method, and an LB method. The thickness of the hole transport layer is not specifically limited, however, it is ordinarily from 5 to 5000 nm. The hole transport layer may be composed of a single layer structure containing one or more of the materials mentioned above.

<<Electron Transport Layer>>

The electron transport layer contains a material having an electron transporting ability, and in a broad sense an electron injecting layer or a hole blocking layer are included in an electron transport layer. The electron transport layer can be provided as a single layer or plural layers.

An electron transport material used in a single electron transport layer or in an electron transport layer provided adjacent to the light emitting layer on the cathode side surface when used in a plural layer construction, can be optionally selected from known compounds used in an electron transport layer.

In the present invention, as an electron transport material, preferable is a polymer containing at least one of the repeat units represented by Formula (2), wherein X represents an electron transport group, whereby higher luminance, higher luminous efficiency, longer emission life and more reduced driving power consumption are attained.

Other examples of a material used in the electron transport layer include a nitro-substituted fluorene derivative, a diphenylquinone derivative, a thiopyran dioxide derivative, carbodiimide, a fluolenylidenemethane derivative, anthraquinodimethane, an anthrone derivative, and an oxadiazole derivative. Further usable as the electron transport material are: a thiadiazole derivative which is formed by substituting the oxygen atom in the oxadiazole ring of the foregoing oxadiazole derivative with a sulfur atom, and a quinoxaline derivative having a quinoxaline ring known as an electron withdrawing group. These electron transport materials are also preferably usable as an electron transport group described above to obtain the effect of the present invention.

An electron transport layer is usable while it has a function to transport electrons injected from the cathode to the light emitting layer, materials of which can be optionally selected from the compounds known in the art.

A polymer in which the material mentioned above is introduced in the polymer chain or a polymer having the material as the polymer main chain can be also used.

A metal complex of an 8-quinolynol derivative such as aluminum tris(8-quinolynol) (Alq), aluminum tris(5,7-dichloro-8-quinolynol), aluminum tris(5,7-dibromo-8-quinolynol), aluminum tris(2-methyl-8-quinolynol), aluminum tris(5-methyl-8-quinolynol), or zinc bis(8-quinolynol) (Znq), and a metal complex formed by replacing the central metal of the foregoing complexes with another metal atom such as In, Mg, Cu, Ca, Sn, Ga or Pb, can be used as the electron transport material. Furthermore, a metal free or metal-containing phthalocyanine, and a derivative thereof, in which the molecular terminal is replaced by a substituent such as an alkyl group or a sulfonic acid group, are also preferably used as the electron transport material. The distyrylpyrazine derivative exemplified as a material for the light emitting layer may preferably be employed as the electron transport material. An inorganic semiconductor such as n-Si and n-SiC may also be used as the electron transport material in a similar way as in the hole injecting layer or in the hole transport layer.

In the present invention, the electron transport material in the electron transport layer preferably has a phosphorescent maximum wavelength of 415 nm or less, namely the hole transport material is preferably a material which prevents elongation of the wavelength of emitting light and has a higher Tg, while having an electron transport ability.

The electron transport layer can be formed by preparing a thin layer of the above described electron transport material using a known method such as a vacuum deposition method, a spin coat method, a casting method, a printing method including an ink-jet method or an LB method. The thickness of the electron transport layer is not specifically limited, however, it is ordinarily from 5 to 5000 nm. The electron transport layer may be composed of a single layer containing one or more of the electron transport material.

<<Substrate (Also Referred to as Base Plate, Base or Support)>>

The substrate employed for the organic electroluminescent element of the present invention is not specifically limited such as to glasses or plastics, and there is no limitation provided that it is transparent. Examples of the substrate preferably used include: glass, quartz and light transmissible resin film. Specifically preferred is a resin film capable of providing flexibility to the organic EL element.

Examples of the resin film include films of, for example, polyethylene terephthalate (PET), polyethylene naphthalate (PEN), polyethersulfone (PES), polyetherimide, polyeretherketone, polyphenylene sulfide, polyarylate, polyimide, polycarbonate (PC), cellulose triacetate (TAC) or cellulose acetate propionate (CAP).

The surface of the resin film may have a layer of an inorganic or organic compound or a hybrid layer of both compounds.

The external light emission efficiency of the organic electroluminescent element of the present invention is preferably not less than 1%, and more preferably not less than 2% at room temperature. Herein, external quantum yield (%) is represented by the following formula:

External quantum yield (%) =

{(the number of photons emitted to the exterior of the organic electroluminescent element) / (the number of electrons supplied to the organic electroluminescent element)} × 100

A hue improving filter such as a color filter may be used in combination.

The multi-color display of the present invention contains at least two organic EL elements exhibiting different emission maximum wavelengths. Preferable examples of preparation methods of an organic EL elements will now be explained.

<<Preparation of Organic EL Element>>

For one example, the preparation of the organic EL element, which has the following constitution will be described: Anode/Anode buffer layer/Hole transport layer/Light emitting layer/Electron transport layer/Cathode buffer layer/Cathode.

A thin layer of a desired material for an electrode such as a material of the anode is formed on a suitable substrate by a deposition or sputtering method to prepare the anode, so that the thickness of the layer is not more than 1 µm, and preferably within the range of from 10 to 200 nm. Then the anode buffer layer, the hole transport layer, the light emitting layer, the electron transport layer and the cathode buffer layer, which constitute the organic EL element, are formed on the resulting anode in that order as organic compound thin layers.

As methods for formation of the thin layers, as the same as described above, there are a spin coat method, a casting method, an ink jet method, a vacuum deposition method, a printing method and a spray method, however, a vacuum deposition method, a spin coating method, an ink jet method and a spray method are specifically preferably used, since a uniform layer without a pinhole can be formed. Different methods may be used for formation of different layers. When the vacuum deposition method is used for the thin layer formation method, although conditions of the vacuum deposition differs due to kinds of materials used, the condition of vacuum deposition is preferably selected in the following ranges: a boat temperature of from 50 to 450° C., a degree of vacuum of from $10^{-6}$ to $10^{-2}$ Pa, a deposition speed of from 0.01 to 50 nm/second, a substrate temperature of from −50 to 300° C. and a layer thickness of from 0.1 nm to 5 µm.

After these layers has been formed, a thin layer of a material for a cathode is formed thereon to prepare the cathode, employing, for example, a vacuum deposition method or sputtering method to give a thickness of not more than 1 µm, and preferably from 50 to 200 nm. Thus, a desired organic EL element is obtained. It is preferred that the layers from the hole injecting layer to the cathode are continuously formed under one time of vacuuming to obtain an organic EL element. However, on the way of the layer formation under vacuum, a different layer formation method by taking the layer out of the vacuum chamber may be inserted. When the different method is used, the process is required to be carried out under a dry inert gas atmosphere.

In the multicolor display of the present invention, the light emitting layer only is formed using a shadow mask, and the other layers, besides the light emitting layer, are formed all over the substrate employing a vacuum deposition method, a casting method, a spin coat method, an ink-jet method or a printing method, in which patterning employing the shadow mask is not required.

When patterning is carried out only for the light emitting layer, the method is not limited, however, preferable are a vacuum deposition method, an ink-jet method and a printing method. When a vacuum deposition method is used, the pattering is preferably carried out using a shadow mask.

Further, the organic EL element can be prepared in the reverse order, in which the cathode, the cathode buffer layer, the electron transport layer, the light emitting layer, the hole transport layer, the anode buffer, and the anode are formed in that order.

When a direct current voltage, a voltage of 2 to 40 V is applied to thus obtained multicolor display, setting the anode as a + polarity and the cathode as a − polarity, light emission occurs. When the voltage is applied with the reverse polarity, no current flow occurs and no light emission is observed. When an alternating current is applied, light emission is observed only when + polarity is applied to the anode and − polarity is applied to the cathode. Arbitrary wave shape of alternating current may be used.

The display of the present invention, containing the organic EL element of the present invention, can be used as a display device, a display, or various light emission sources. The display device or the display, which employs three kinds of organic EL elements emitting a blue light, a red light and a green light can present a full color image.

Examples of the display device or the display include a television, a personal computer, a mobile device, an AV device, a display for text broadcasting, and an information display used in a car. The display device may be used as specifically a display for reproducing a still image or a moving image. When the display device is used as a display for reproducing a moving image, the driving method may be either a simple matrix (passive matrix) method or an active matrix method.

The illuminator of the present invention, containing the organic EL element of the present invention, can emit white light by selecting phosphorescent compounds. Examples of an illuminator include a home lamp, a room lamp in a car, a backlight for a watch or a liquid crystal, a light source for boarding advertisement, a signal device, a light source for a photo memory medium, a light source for an electrophotographic copier, a light source for an optical communication instrument, and a light source for an optical sensor, however, are not limited thereto.

The organic EL element of the present invention may be an organic EL element having a resonator structure.

The organic EL element having a resonator structure is applied to a light source for a photo-memory medium, a light source for an electrophotographic copier, a light source for an optical communication instrument, or a light source for a photo-sensor, however, its application is not limited thereto. In the above application, a laser oscillation may be carried out.

The organic EL element of the present invention can be applied as a lamp, for example, an illuminator or a developing light, as described above, or as a projection device which projects an image, or a display device by which a still image or a moving image is directly visible. When the display device is used as a display for reproducing a moving image, the driving method may be either a simple matrix (passive matrix) method or an active matrix method. A full color display device can be prepared by using three or more kinds of organic EL elements of the present invention having different emitting colors, or by changing the color of one kind of emission, for example white emission, using color filters to form RGB colors. When the color of an organic EL element is changed into different colors using color filters to obtain a full color image, λmax of the organic EL element is preferably 480 nm or less.

One example of the display containing the organic EL element of the present invention will be explained below employing Figures.

FIG. 1 is a schematic drawing of one example of a display containing an organic EL element. FIG. 1 is a display such as that of a cellular phone, displaying image information due to light emission from the organic EL.

A display 1 contains a display section A having plural pixels and a control section B carrying out image scanning based on image information to display an image in the display section A.

The control section B is electrically connected to the display section A, transmits a scanning signal and an image data signal to each of the plural pixels based on image information from the exterior, and conducts image scanning which emits light from each pixel due to the scanning signal according to the image data signal, whereby an image is displayed on the display section A.

Figure 2:
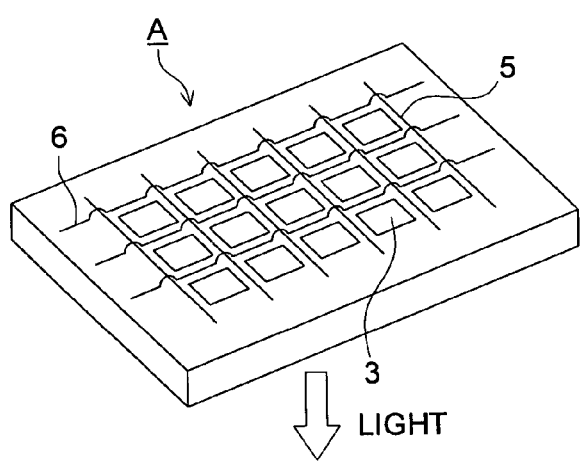
FIG. 2 is a schematic illustration of a display section.

FIG. 2 is a schematic drawing of a display section A.

The display section A contains, on a substrate, plural pixels 3, and a wiring section containing plural scanning lines 5 and plural data lines 6. The main members of the display section A will be explained below. In FIG. 2, light emitted from pixels 3 to the direction of the arrow (downward) is illustrated.

The plural scanning lines 5 and plural data lines 6 of the wiring section each are composed of an electroconductive material, the lines 5 and the lines 6 being crossed with each other at a right angle, and connected with the pixels 3 at the crossed points (not illustrated).

The plural pixels 3, when the scanning signal is applied from the scanning lines 5, receive the data signal from the data lines 6, and emit light corresponding to the image data received. Provision of red light emitting pixels, green light emitting pixels, and blue light emitting pixels side by side on the same substrate makes it possible to display a full color image.

Next, an emission process of pixels will be explained.

Figure 3:
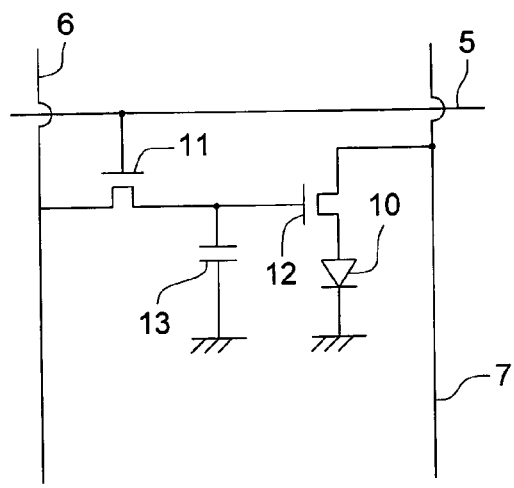
FIG. 3 is a schematic illustration of pixels.

FIG. 3 is a schematic drawing of a pixel.

The pixel contains an organic EL element 10, a switching transistor 11, a driving transistor 12, and a capacitor 13. When a pixel with a red light emitting organic EL element, a pixel with a green light emitting organic EL element, and a pixel with a blue light emitting organic EL element are provided side by side on the same substrate, a full color image can be displayed.

In FIG. 3, an image signal from the control section B is applied to the drain of a switching transistor 11 through a data line 6, and a scanning signal from the control section B is applied to the gate of the switching transistor 11, then the switching transistor 11 is turned on and the image data applied to the drain of the switching transistor 11 is transmitted to the capacitor 13 and the gate of the driving transistor 12.

The capacitor 13 is charged according to the electric potential of the image data signal transmitted, and the driving transistor 12 is switched on. In the driving transistor 12, the drain is connected to an electric source line 7, and the source to an organic EL element 10. Current is supplied from the electric source line 7 to the organic EL element 10 according to the electric potential of the image data signal applied to the gate.

The scanning signal is transmitted to the next scanning line 5 according to the successive scanning of the control section B, the switching transistor 11 is switched off. Even if the switching transistor 11 is switched off, the driving transistor 12 is turned on since the capacitor 13 maintains a charged potential of image data signal, and light emission from the organic EL element 10 continues until the next scanning signal is applied. When the next scanning signal is applied according the successive scanning, the driving transistor 12 works according to an electric potential of the next image data signal synchronized with the scanning signal, and light is emitted from the organic EL element 10.

Namely, light is emitted from the organic EL element 10 in each of the plural pixels 3 due to the switching transistor 11 as an active element and the driving transistor 12 each being provided in the organic EL element 10 of each of the plural pixels 3. This emission process is called an active matrix process.

Herein, light emission from the organic EL element 10 may be emission with plural gradations according to image signal data of multiple value having plural gradation potentials, or emission due to on-off according to a binary value of the image data signals.

The electric potential of the capacitor 13 may maintain till the next application of the scanning signal, or may be discharged immediately before the next scanning signal is applied.

In the present invention, light emission may be carried out employing a passive matrix method as well as the active matrix method as described above.

FIG. 4 is a schematic drawing of a display employing a passive matrix method. In FIG. 4, pixels 3 are provided between the scanning lines 5 and the data lines 6, crossing with each other.

When a scanning signal is applied to scanning line 5 according to successive scanning, pixel 3 connecting the scanning line 5 emits light according to the image data signal. The passive matrix method has no active element in the pixel 3, which reduces manufacturing cost of a display.

EXAMPLES

In the following, the present invention is explained in detail using examples, however, the present invention is not limited thereto.

Example 1

Preparation of Organic EL Elements 1-1-1 to 1-1-6 and 1-2-1 to 1-2-4

A pattern was formed on a substrate (100 mm×100 mm×1.1 mm) composed of a glass plate and a 100 nm ITO (indium tin oxide) layer (NA45 manufactured by NH Technoglass Co., Ltd.) as an anode. Then the resulting transparent substrate having the ITO transparent electrode was subjected to ultrasonic washing in i-propyl alcohol and dried by a dry nitrogen gas and subjected to UV-ozone cleaning for 5 minutes. Thus obtained transparent substrate was fixed on a substrate holder of a vacuum deposition apparatus available on the market. Further, 200 mg of NPD was placed in a first resistive heating molybdenum boat, 200 mg of CBP was put in a second resistive heating molybdenum boat, 100 mg of Ir-1 was placed in a third resistive heating molybdenum boat, and 200 mg of bathocuproine (BCP) was placed in a fourth resistive heating molybdenum boat. The resulting boats were set in the vacuum deposition apparatus.

The pressure in the vacuum tank was reduced to $4 \times 10^{-4}$ Pa. Then, the boat carrying NPD was heated by supplying an electric current to the boat, NPD was deposited onto the transparent substrate at a depositing rate of 0.1 nm/sec to form a hole transporting layer of which thickness is 45 nm.

After that, the boat carrying CBP and the boat carrying Ir-1 being were heated by supplying an electric current to both boats, CBP at a depositing rate of 0.1 nm/sec and Ir-1 at a depositing rate of 0.006 nm/sec were co-deposited onto the resulting hole transporting layer to form a light emitting layer of which the thickness was 30 nm.

Further, Subsequently, the boat carrying BCP was heated by supplying an electric current to the boat, and BCP was deposited onto the resulting light emitting layer at a depositing rate of 0.1 nm/sec to form an electron tansport layer with a thickness of 30 nm. The temperature of the substrate at the time of the deposition was room temperature.

Further, a 0.5 nm thick lithium fluoride layer as a cathode buffer layer and a 110 nm thick aluminum layer as the cathode were deposited. Thus, Organic EL Element No. 1-1-1 was prepared.

Organic EL Elements 1-1-2 to 1-1-6 and 1-2-1 to 1-2-4 were prepared in the same manner as Organic EL Element No. 1-1-1, except that the materials used in the electron transport layer, light emitting layer and hole transport layer were changed to the compounds shown in Tables 1 and 2.

TABLE 1

| Organic EL Element | Hole transport layer | Light emitting layer | Electro transport layer | Remarks |
|---|---|---|---|---|
| 1-1-1 | NPD | CBP Ir-1 | BCP | Comparative |
| 1-1-2 | Poly-33 | poly-33 | BCP | Inventive |
| 1-1-3 | Poly-5 | poly-5 | BCP | Inventive |
| 1-1-4 | Poly-10 | poly-10 | BCP | Inventive |
| 1-1-5 | Poly-13 | poly-13 | BCP | Inventive |
| 1-1-6 | Poly-16 | poly-16 | PCP | Inventive |

TABLE 2

| Organic EL Element | Hole transport layer | Light emitting layer | Electro transport layer | Remarks |
|---|---|---|---|---|
| 1-2-1 | NPD | CBP E-5 | BCP | Comparative |
| 1-2-2 | Poly-12 | Poly-12 E-5 | BCP | Inventive |
| 1-2-3 | Poly-14 | Poly-14 E-5 | BCP | Inventive |
| 1-2-4 | NPD | Poly-1 | BCP | Inventive |

<Evaluation of Organic EL Elements 1-1-1 to 1-1-6 and 1-2-1 to 1-2-4>

On obtained organic EL elements 1-1-1 to 1-1-6 and 1-2-1 to 1-2-4, the following evaluation was carried out.

(External Quantum Efficiency)

Electric current of 2.5 mA/cm$^2$ was supplied to each sample at 23° C. in an atmosphere of a dry nitrogen gas, and the external quantum efficiency (%) of each sample was measured. The external quantum efficiency (%) was calculated from the date obtained by being measured through a spectral radiance meter CS-1000 produced by Konica Minolta Sensing Inc.

(Emission Life)

Electric current of 2.5 mA/cm$^2$ was supplied to each sample at 23° C. in an atmosphere of a dry nitrogen gas, and measured was the duration in which the luminance of each sample decreased to half of the initial luminance, which was designated as the half life of emission ($\tau 0.5$) and used as an index of emission life. The measurement was carried out using a spectral radiance meter CS-1000 produced by Konica Minolta Sensing Inc.

(Driving Voltage)

The voltage at which emission started was measured at 23° C. in an atmosphere of a dry nitrogen gas. The voltage at which emission started was determined by measuring the voltage at which the luminance increased to 50 cd/m$^2$. The measurement of luminance was carried out using a spectral radiance meter CS-1000 produced by Konica Minolta Sensing Inc.

The values of external quantum efficiency, emission life, and driving voltages for organic EL elements 1-1-1 to 1-1-6 were listed in Table 3 as relative values when each value of organic EL element 1-1-1 was set to 100. Also, the values of external quantum efficiency, emission life, and driving voltages for organic EL elements 1-2-1 to 1-2-4 were listed in Table 4 as relative values when each value of organic EL element 1-2-1 was set to 100.

TABLE 3

| Organic EL element | External quantum efficiency (Relative value) | Emission Life (Relative value) | Driving voltage (Relative value) | Remarks |
|---|---|---|---|---|
| 1-1-1 | 100 | 100 | 100 | Comparative |
| 1-1-2 | 225 | 275 | 89 | Inventive |
| 1-1-3 | 180 | 149 | 87 | Inventive |
| 1-1-4 | 197 | 512 | 79 | Inventive |
| 1-1-5 | 112 | 136 | 92 | Inventive |
| 1-1-6 | 160 | 654 | 90 | Inventive |

TABLE 4

| Organic EL element | External quantum efficiency (Relative value) | Emission Life (Relative value) | Driving voltage (Relative value) | Remarks |
|---|---|---|---|---|
| 1-2-1 | 100 | 100 | 100 | Comparative |
| 1-2-2 | 191 | 378 | 91 | Inventive |
| 1-2-3 | 201 | 149 | 74 | Inventive |
| 1-2-4 | 121 | 507 | 90 | Inventive |

As shown in Tables 3 and 4, the organic EL elements of the present invention exhibit higher luminance, higher luminous efficiency, longer emission life and reduced driving power.

Example 2

Preparation of Organic EL Elements 2-1-1 to 2-1-16 and 2-2-1 to 2-2-5

A pattern was formed on a substrate (100 mm×100 mm×1.1 mm) composed of a glass plate and a 100 nm ITO (indium tin oxide) layer (NA45 manufactured by NH Technoglass Co., Ltd.) as an anode. Then the resulting transparent substrate having the ITO transparent electrode was subjected to ultrasonic washing in i-propyl alcohol and dried by a dry nitrogen gas and subjected to UV-ozone cleaning for 5 minutes. 30 mg of polyvinylcarbazole (PVC) and 1.8 mg of Ir-1 were dissolved in 1 ml of dichlorobenzene and spin coated on thus obtained transparent substrate at 1000 rpm for 5 seconds (thickness: around 100 nm), followed by vacuum drying at 60° C. for 1 hour to form a light emitting layer.

The substrate was fixed in a vacuum deposition apparatus and the pressure in the vacuum tank was reduced to $4 \times 10^{-4}$ Pa. Then, a 0.5 nm thick lithium fluoride layer as a cathode buffer layer and a 110 nm thick aluminum layer as the cathode were deposited, followed by sealing with glass. Organic EL element No. 2-1-1 was thus prepared.

Organic EL elements 2-1-2 to 2-1-16 and 2-2-1 to 2-2-5 were prepared in the same manner as organic EL element No. 2-1-1, except that PVK and Ir-1 used in the light emitting layer were changed to the compounds listed in Tables 5 and 6.

TABLE 5

| Organic EL Element | Light emitting layer | Remarks |
| --- | --- | --- |
| 2-1-1 | PVK/Ir-1 | Comparative |
| 2-1-2 | poly-12/Ir-1 | Inventive |
| 2-1-3 | poly-15/Ir-1 | Inventive |
| 2-1-4 | poly-18 | Inventive |
| 2-1-5 | poly-19 | Inventive |
| 2-1-6 | poly-8 | Inventive |
| 2-1-7 | poly-13 | Inventive |
| 2-1-8 | poly-27 | Inventive |
| 2-1-9 | poly-28 | Inventive |
| 2-1-10 | poly-46 | Inventive |
| 2-1-11 | poly-39 | Inventive |
| 2-1-12 | PO-8/Ir-1 | Inventive |
| 2-1-13 | PO-1/PO-8/Ir-1 | Inventive |
| 2-1-14 | PO-11/Ir-1 | Inventive |
| 2-1-15 | PO-12/Ir-1 | Inventive |
| 2-1-16 | PO-19 | Inventive |

TABLE 6

| Organic EL Element | Light emitting layer | Remarks |
| --- | --- | --- |
| 2-2-1 | PVK E-5 | Comparative |
| 2-2-2 | Poly-12 E-5 | Inventive |
| 2-2-3 | Poly-34 | Inventive |
| 2-2-4 | Poly-36 | Inventive |
| 2-2-5 | Poly-38 | Inventive |

<Evaluation of Organic EL Elements 2-1-1 to 2-1-16 and 2-2-1 to 2-2-5>

The same evaluation was carried out on obtained organic EL elements 2-1-1 to 2-1-16 and 2-2-1 to 2-2-5.

The values of external quantum efficiency, emission life, and driving voltages for organic EL elements 2-1-1 to 2-1-16 were listed in Table 7 as relative values when each value of organic EL element 2-1-1 was set to 100. Also, the values of external quantum efficiency, emission life, and driving voltages for organic EL elements 2-2-1 to 2-2-5 were listed in Table 8 as relative values when each value of organic EL element 2-2-1 was set to 100.

TABLE 7

| Organic EL element | External quantum efficiency (Relative value) | Emission Life (Relative value) | Driving voltage (Relative value) | Remarks |
| --- | --- | --- | --- | --- |
| 2-1-1 | 100 | 100 | 100 | Comparative |
| 2-1-2 | 152 | 341 | 91 | Inventive |
| 2-1-3 | 163 | 297 | 85 | Inventive |
| 2-1-4 | 156 | 310 | 78 | Inventive |
| 2-1-5 | 136 | 720 | 76 | Inventive |
| 2-1-6 | 200 | 300 | 71 | Inventive |

TABLE 7-continued

| Organic EL element | External quantum efficiency (Relative value) | Emission Life (Relative value) | Driving voltage (Relative value) | Remarks |
| --- | --- | --- | --- | --- |
| 2-1-7 | 120 | 168 | 91 | Inventive |
| 2-1-8 | 191 | 410 | 80 | Inventive |
| 2-1-9 | 176 | 612 | 74 | Inventive |
| 2-1-10 | 223 | 554 | 69 | Inventive |
| 2-1-11 | 235 | 688 | 68 | Inventive |
| 2-1-12 | 250 | 711 | 75 | Inventive |
| 2-1-13 | 255 | 703 | 73 | Inventive |
| 2-1-14 | 231 | 662 | 76 | Inventive |
| 2-1-15 | 237 | 901 | 79 | Inventive |
| 2-1-16 | 251 | 876 | 80 | Inventive |

TABLE 8

| Organic EL element | External quantum efficiency (Relative value) | Emission Life (Relative value) | Driving voltage (Relative value) | Remarks |
| --- | --- | --- | --- | --- |
| 2-2-1 | 100 | 100 | 100 | Comparative |
| 2-2-2 | 167 | 327 | 87 | Inventive |
| 2-2-3 | 208 | 288 | 78 | Inventive |
| 2-2-4 | 231 | 178 | 71 | Inventive |
| 2-2-5 | 190 | 400 | 74 | Inventive |

As shown in Tables 7 and 8, the organic EL elements of the present invention exhibit higher luminance, higher luminous efficiency, longer emission life and reduced driving power.

Example 3

Full Color Display (Organic EL Element Emitting Blue Light)
Organic EL element 2-1-5B was used, which was prepared in the same manner as organic EL element 2-1-5 except that Poly-19 used in organic EL element 2-1-5 was replaced with Poly-47.
(Organic EL Element Emitting Green Light)
Organic EL element 2-1-5 prepared in example 2 was used.
(Organic EL Element Emitting Red Light)
Organic EL element 2-1-5R was used, which was prepared in the same manner as organic EL element 2-1-5 except that Poly-19 used in organic EL element 2-1-5 was replaced with Poly-48.

The above described organic EL elements emitting red light, green light and blue light were arrayed side by side on the same substrate to fabricate a full color display device driven by an active matrix method, as shown in FIG. 1. In FIG. 2, only a schematic figure the display section A of thus prepared display device was illustrated. Namely, on the same substrate, a wiring section containing plural scanning lines 5 and plural data lines 6 and plural pixels 3 arrayed side by side were placed. The scanning lines 5 and data lines 6 of the wiring section each were composed of an electroconductive material, the lines 5 and the lines 6 being crossed with each other at a right angle, and connected with the pixels 3 at the crossed points (not illustrated). The plural pixels 3 were driven by an active matrix method in which each pixel contained an organic EL element emitting one of the colors, a switching transistor and a driving transistor both of which are active elements, and when the scanning signal is applied from the scanning lines 5, the data signal from the data lines 6 was received, and light corresponding to the image data was emitted. A full color display device was prepared by providing red light emitting pixels, green light emitting pixels, and blue light emitting pixels side by side on the same substrate.

By driving the above described full color display device, the display device was confirmed to exhibit higher luminance, higher luminous efficiency, longer emission life and reduced power consumption.

Example 4

Figure 5:
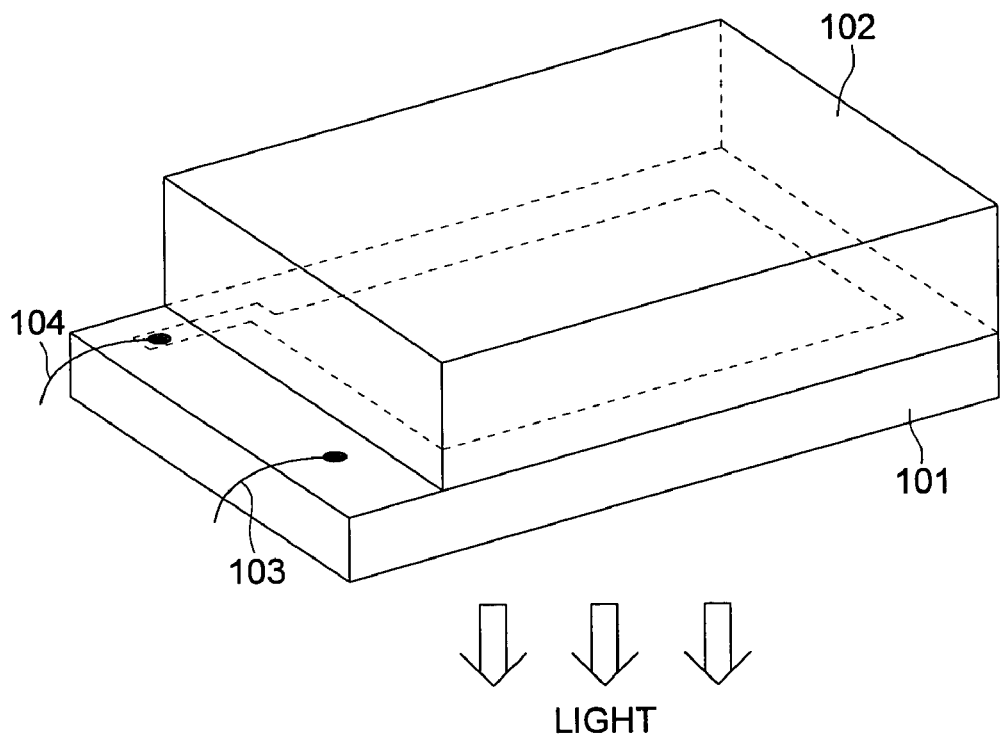
FIG. 5 is a schematic illustration of an illuminator.
Figure 6:
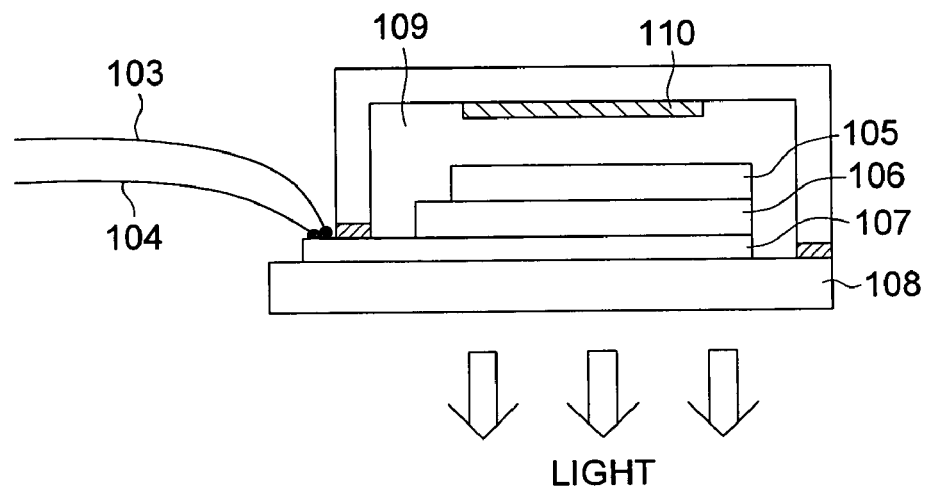
FIG. 6 is a cross-sectional view of an illuminator.

Organic EL element 2-1-5W was used, which was prepared in the same manner as organic EL element 2-1-5 except that Poly-19 used in organic EL element 2-1-5 was replaced with a mixture of Poly-19, Poly-47 and Poly-48. The non-emitting surface of the organic EL element was covered with a glass case to form an illuminator. The illuminator served as a thin type illuminator exhibiting higher luminance, higher luminous efficiency, longer emission life and reduced power consumption. FIG. 5 is a schematic illustration of an illuminator, and FIG. 6 illustrates a cross-section of the illuminator. The organic EL element 101 was covered by the glass cover 102, and an electric wire 103 (for anode) and an electric wire 104 (for cathode) are connected. 105 represents the anode and 106 represents the organic EL layer. 107 represents a glass substrate having thereon a transparent electrode and 108 represents a sealing substrate. The inside of the glass cover 102 was filled with nitrogen gas 109 and a dehydrating agent 110.

POSSIBILITY FOR INDUSTRIAL APPLICATION

According to the present invention, an organic EL element exhibiting higher luminance, higher luminous efficiency, longer emission life and reduced power consumption can be obtained, as well as a display device and an illuminator using the same can be obtained.

What is claimed is:

1. An organic electroluminescent element comprising a cathode and an anode having therebetween at least one organic compound layer,
wherein one of the organic compound layer comprises a polymer having one of repeat units represented by Formula (2):

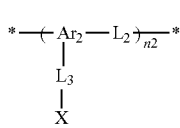

Formula (2)

wherein $Ar_2$ represents a phenylene group which may have a substituent or a biphenylene group which may have a substituent;
$L_2$ represents a linkage group selected from Group 2; and $L_3$ represents a single bond or a linkage group selected from Group 3; X represents a group represented by Formula (3) or (9); and $n_2$ represents an integer of not less than two:

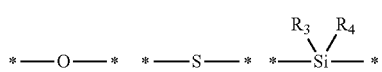

Group 2

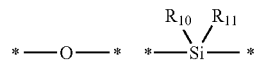

Group 3 wherein $R_3$, $R_4$, $R_{10}$ and $R_{11}$ each represent a phenyl group,

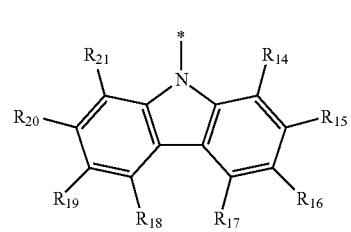

Formula (3)

wherein $R_{14}$-$R_{21}$ each independently represent a hydrogen atom, an alkyl group or a cycloalkyl group, provided that adjacent groups of $R_{14}$-$R_{21}$ may be joined to form a ring,

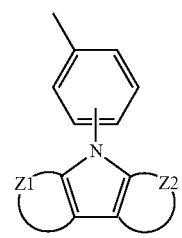

Formula (9)

wherein $Z_1$ and $Z_2$ each represent a 6-membered aromatic ring comprising a group of atoms selected from the group of carbon, hydrogen and nitrogen, provided that $Z_1$ and $Z_2$ may be different.

2. The organic electroluminescent element of claim 1, wherein the organic electroluminescent element emits white light.

3. A display equipped with the organic electroluminescent element of claim 1.

4. An illuminator equipped with the organic electroluminescent element of claim 1.

5. A display equipped with the illuminator of claim 4 and a liquid crystal cell as a display means.

6. The organic electroluminescent element of claim 1, wherein the polymer comprises a repeating unit selected from the group consisting of PO-11, PO-12 and PO-13:

PO-11

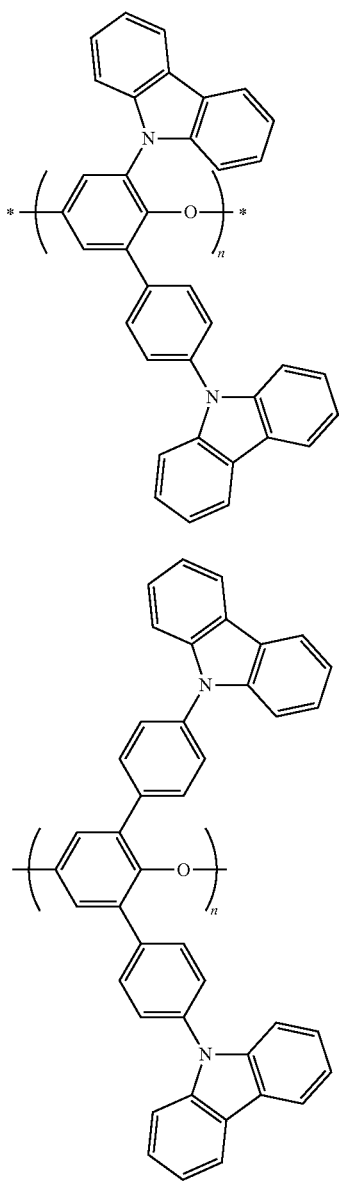

PO-12

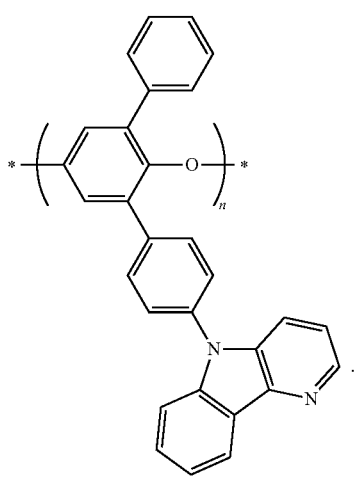

PO-13

7. The organic electroluminescent element of claim 6, wherein the repeating unit is PO-11.

8. The organic electroluminescent element of claim 6, wherein the repeating unit is PO-12.

9. The organic electroluminescent element of claim 6, wherein the repeating unit is PO-13.

10. An organic electroluminescent element comprising a cathode and an anode having therebetween at least one organic compound layer, wherein one of the organic compound layer comprises a copolymer represented by Formula (22):

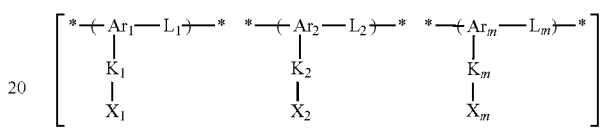

Formula (22)

wherein $Ar_1$ to $Ar_m$ each represent a phenylene group which may have a substituent or a biphenylene group which may have a substituent; m represents an integer of not less than two; $Ar_1$ to $Ar_m$ may be the same or may be different; $L_1$ to $L_m$ each represent a linkage group selected from Group 2; $K_1$ to $K_m$ each represent a single bond or a linkage group selected from Group 3; and $X_1$ to $X_m$ each represent a group represented by Formula (3) or (9):

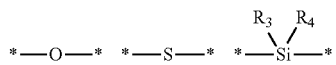

Group 2

Group 3 wherein $R_3$, $R_4$, $R_{10}$ and $R_{11}$ each represent a phenyl group,

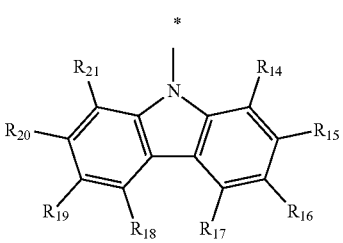

Formula (3)

wherein $R_{14}$-$R_{21}$ each independently represent a hydrogen atom, an alkyl group or a cycloalkyl group, provided that adjacent groups of $R_{14}$-$R_{21}$ may be joined to form a ring,

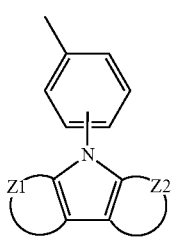

Formula (9)

wherein $Z_1$ and $Z_2$ each represent a 6-membered aromatic ring comprising a group of atoms selected from the group of carbon, hydrogen and nitrogen, provided that $Z_1$ and $Z_2$ may be different.

11. The organic electroluminescent element of claim 10, wherein the organic electroluminescent element emits white light.

12. A display equipped with the organic electroluminescent element of claim 10.

13. An illuminator equipped with the organic electroluminescent element of claim 10.

14. A display equipped with the illuminator of claim 13 and a liquid crystal cell as a display means.

15. An organic electroluminescent element comprising a cathode and an anode having therebetween at least one organic compound layer,
wherein one of the organic compound layer comprises a mixture of two or more polymers each represented by Formulas (1), (2), or (22),
wherein the mixture comprises at least one polymer represented by Formula (2):

Formula (1)

wherein $Ar_1$ represents a phenylene group which may have a substituent or a biphenylene group which may have a substituent; and $L_1$ represents a linkage group selected from Group 1; and $n_1$ represents an integer of not less than two:

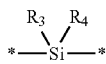

Group 1 wherein $R_3$ and $R_4$ each represent a phenyl group,

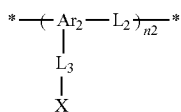

Formula (2)

wherein $Ar_2$ represents a phenylene group which may have a substituent or a biphenylene group which may have a substituent;
$L_2$ represents a linkage group selected from Group 2; and $L_3$ represents a single bond or a linkage group selected from Group 3; X represents a group represented by Formula (3) or (9); and $n_2$ represents an integer of not less than two:

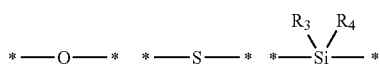

Group 2

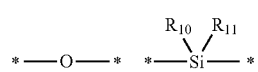

Group 3 wherein $R_3$, $R_4$, $R_{10}$ and $R_{11}$ each represent a phenyl group,

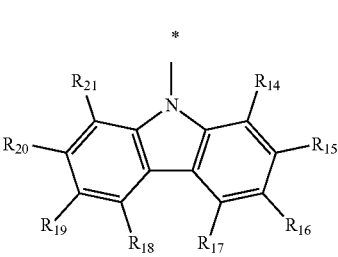

Formula (3)

wherein $R_{14}$-$R_{21}$ each independently represent a hydrogen atom, an alkyl group or a cycloalkyl group, provided that adjacent groups of $R_{14}$-$R_{21}$ may be joined to form a ring,

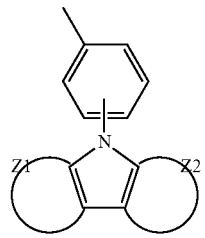

Formula (9)

wherein $Z_1$ and $Z_2$ each represent a 6-membered aromatic ring comprising a group of atoms selected from the group of carbon, hydrogen and nitrogen, provided that $Z_1$ and $Z_2$ may be different, and

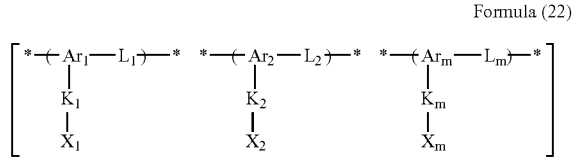

Formula (22)

wherein $Ar_1$ to $Ar_m$ each represent a phenylene group which may have a substituent or a biphenylene group which may have a substituent; m represents an integer of not less than two; $Ar_1$ to $Ar_m$ may be the same or may be different; $L_1$ to $L_m$ each represent a linkage group selected from above Group 2; $K_1$ to $K_m$ each represent a single bond or a linkage group selected from above Group 3; and $X_1$ to $X_m$ each represent a group represented by above Formula (3) or (9).

16. The organic electroluminescent element of claim 15, wherein the organic electroluminescent element emits white light.

17. A display equipped with the organic electroluminescent element of claim 15.

18. An illuminator equipped with the organic electroluminescent element of claim 9.

19. A display equipped with the illuminator of claim 18 and a liquid crystal cell as a display means.

* * * * *